(12) United States Patent
Mok et al.

(10) Patent No.: US 10,972,938 B2
(45) Date of Patent: Apr. 6, 2021

(54) METHOD AND DEVICE FOR TRANSMITTING DATA PACKET IN WIRELESS COMMUNICATION SYSTEM

(71) Applicant: Samsung Electronics Co., Ltd., Suwon-si (KR)

(72) Inventors: Youngjoong Mok, Suwon-si (KR); Sangkyu Baek, Yongin-si (KR); June Hwang, Incheon (KR); Hyunjeong Kang, Seoul (KR); Sangwook Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,677

(22) PCT Filed: Jan. 15, 2018

(86) PCT No.: PCT/KR2018/000696
§ 371 (c)(1),
(2) Date: Jul. 9, 2019

(87) PCT Pub. No.: WO2018/131975
PCT Pub. Date: Jul. 19, 2018

(65) Prior Publication Data
US 2019/0327641 A1     Oct. 24, 2019

(30) Foreign Application Priority Data

Jan. 13, 2017  (KR) ........................ 10-2017-0006438
Feb. 2, 2017  (KR) ........................ 10-2017-0015187

(51) Int. Cl.
*H04W 28/06* (2009.01)
*H04L 1/00* (2006.01)
(Continued)

(52) U.S. Cl.
CPC ........... *H04W 28/06* (2013.01); *H04L 1/0026* (2013.01); *H04W 4/40* (2018.02); *H04W 24/10* (2013.01); *H04W 36/08* (2013.01); *H04W 76/27* (2018.02)

(58) Field of Classification Search
CPC ....... H04W 28/06; H04W 4/40; H04W 36/08; H04W 76/27; H04W 24/10; H04L 1/0026
(Continued)

(56) References Cited

U.S. PATENT DOCUMENTS

| 2012/0057560 | A1 | 3/2012 | Park et al. |
| 2013/0010759 | A1 | 1/2013 | Niemela et al. |

(Continued)

FOREIGN PATENT DOCUMENTS

| EP | 3 536 021 A1 | 9/2019 |
| EP | 3 606 253 A1 | 2/2020 |

(Continued)

OTHER PUBLICATIONS

Packet duplication for URLLC in DC and CA deployment; 3GPP R2-1700336 Washington, USA, Jan. 17-19, 2017.*
(Continued)

*Primary Examiner* — Faisal Choudhury
(74) *Attorney, Agent, or Firm* — Jefferson IP Law, LLP

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. According to one embodiment of the present invention,
(Continued)

RRC-connected mode      RRC-idle mode provided is a method for a terminal transmitting a data packet in a wireless communication system. The method comprises the steps of: generating a data packet; determining whether to perform duplicate transmission for the data packet; and if it is determined to perform duplicate transmission for the data packet, generating at least two duplicate packets by duplicating the data packet, and transmitting the respective at least two duplicate packets to at least two base stations.

12 Claims, 54 Drawing Sheets

(51) Int. Cl.
    *H04W 4/40* (2018.01)
    *H04W 76/27* (2018.01)
    *H04W 24/10* (2009.01)
    *H04W 36/08* (2009.01)

(58) Field of Classification Search
    USPC .......................................................... 370/329
    See application file for complete search history.

(56) References Cited

U.S. PATENT DOCUMENTS

| | | | | |
|---|---|---|---|---|
| 2016/0044735 | A1* | 2/2016 | Ohta | H04W 76/15 |
| | | | | 455/422.1 |
| 2016/0057770 | A1 | 2/2016 | Yerramalli et al. | |
| 2016/0345377 | A1* | 11/2016 | Lindoff | H04W 76/27 |
| 2018/0098250 | A1* | 4/2018 | Vrzic | H04W 36/18 |
| 2018/0279262 | A1* | 9/2018 | Babaei | H04W 72/04 |
| 2018/0309660 | A1 | 10/2018 | Loehr et al. | |
| 2018/0310202 | A1 | 10/2018 | Löhr et al. | |
| 2019/0098628 | A1 | 3/2019 | Yerramalli et al. | |
| 2019/0098682 | A1 | 3/2019 | Park et al. | |
| 2019/0327607 | A1* | 10/2019 | Xiao | H04W 76/15 |
| 2020/0052826 | A1 | 2/2020 | Han et al. | |
| 2020/0178048 | A1* | 6/2020 | Kim | H04W 8/005 |
| 2020/0196195 | A1 | 6/2020 | Tang | |
| 2020/0275303 | A1 | 8/2020 | Mok et al. | |

FOREIGN PATENT DOCUMENTS

| | | |
|---|---|---|
| EP | 3 616 439 A1 | 3/2020 |
| EP | 3 616 440 A1 | 3/2020 |
| EP | 3 637 658 A1 | 4/2020 |
| EP | 3 672 318 A1 | 6/2020 |
| WO | 2010/131850 A2 | 11/2010 |

OTHER PUBLICATIONS

Catt, "NR latency analysis"; 3GPP TSG-RAN WG2 Meeting #95bis; Kaohsiung; Oct. 10-14, 2016; R2-166115.

Catt, Alcatel-Lucent Shanghai Bell, Nokia; "Packet duplication across legs"; 3GPP TSG-RAN WG2 Meeting #96; Reno, USA, Nov. 14-18, 2016; R2-167947.

Ericsson, "Upper layer aggregation (DC like) for multi-connectivity", 3GPP Draft, R2-1700437, vol. RAN WG2, Spokane, USA, XP051203806, Jan. 6, 2017.

Extended European Search Report dated Jul. 13, 2020, issued in European Patent Application No. 18739024.0.

European Office Action dated Feb. 11, 2021, issued in European Application No. 18 739 024.0.

* cited by examiner

FIG. 22

V2X channel state report MAC CE

| Resource ID | Channel busy ratio |
|---|---|
| Resource ID | Channel busy ratio |

FIG. 23

V2X MAC subheader

| V | R | L |
|---|---|---|
| Resource ID | | Channel busy ratio |
| Resource ID | | Channel busy ratio |

METHOD AND DEVICE FOR TRANSMITTING DATA PACKET IN WIRELESS COMMUNICATION SYSTEM

TECHNICAL FIELD

The disclosure relates to a resource situation reporting scheme in an idle mode for supporting vehicle to everything (V2X) reliability transmission. Specifically, the disclosure relates to a method for a vehicle UE to report a resource situation being used in an idle mode, in order to guarantee reliability of the data transmission of the vehicle UE when a UE performing vehicle communication (e.g., a connected car or V2X) enters an idle mode in order to reduce power consumption in a wireless communication system. In the disclosure, an example of the idle mode, reference may be made to radio resource control (RRC)-idle or RRC-inactive defined in 3GPP.

Furthermore, the disclosure relates to the transmission and reception of a communication device in a communication system.

Furthermore, the disclosure relates to an event and time to trigger (TTT) operation method for UE handover for overcoming link instability.

BACKGROUND ART

In order to satisfy a wireless data traffic demand that tends to increases after the $4^{th}$-generation (4G) communication system commercialization, efforts to develop an improved 5 (5G) communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of things (IoT) in which information is exchanged and process between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine and MTC, are implemented by schemes, such as beamforming, MIMO, and an array antenna. The application of a cloud wireless access network (cloud RAN) as the aforementioned big data processing technology may be said to be an example of convergence between the 5G technology and the IoT technology.

In the 5G system, the support of various services is taken into consideration compared to the existing 4G system. For example, the most representative services may include an enhanced mobile broad band (eMBB), ultra-reliable and low latency communication (URLLC), massive machine type communication (mMTC), evolved multimedia broadcast/multicast service (eMBMS), etc. Furthermore, a system providing URLLC service may be called a URLLC system, and a system providing eMBB service may be called an eMBB system. Furthermore, a service and a system may be interchangeably used.

DISCLOSURE OF INVENTION

Technical Problem

The disclosure provides a method and apparatus for measuring the status of a resource being used in an idle mode when a vehicle UE enters the idle mode in a vehicle communication system and reporting the status of the measured resource.

Furthermore, the disclosure defines a condition or configuration method for duplication transmission and defines a procedure for preventing unnecessary duplication transmission.

Furthermore, the disclosure proposes a handover method capable of reducing a handover failure and handover ping-pong in a system that requires high reliability.

Solution to Problem

According to an embodiment of the disclosure, a vehicle UE (or a UE mounted within a vehicle) measures the status of a resource being used in an idle mode when the UE enters the idle mode, and reports the measured status to a base station. The base station readjusts resource allocation based on the status of resources being used by vehicle UEs in an idle mode.

According to another embodiment of the disclosure, there is provided a method for a UE to transmit a data packet in a wireless communication system. The method includes generating a data packet, identifying whether to perform duplication transmission on the data packet, generating at least two duplicated packets by duplicating the data packet based on the duplication transmission determined to be performed on the data packet, and transmitting the at least two duplicated packets to at least two base stations, respectively.

According to yet another embodiment of the disclosure, there is provided a terminal in a wireless communication system. The UE includes a transceiver transmitting and receiving signals and a controller configured to generate a data packet, identify whether to perform duplication transmission on the data packet, generate at least two duplicated packets by duplicating the data packet based on the duplication transmission determined to be performed on the data packet, and control the transceiver to transmit the at least two duplicated packets to at least two base stations, respectively.

Advantageous Effects of Invention

In accordance with an embodiment of the disclosure, there can be obtained an effect in that reliability is improved upon data transmission between vehicles. Furthermore, there can be obtained an effect in that battery consumption of a UE is reduced because the time taken for UEs in an idle mode or connected mode (RRC-connected mode) to wait in order to obtain a resource due to resource busy or a resource collision is reduced through the adjustment of resource allocation being used in an idle mode (RRC-idle or RRC-inactive).

Furthermore, according to an embodiment of the disclosure, efficient duplication transmission is possible in a communication environment having several links.

Furthermore, according to an embodiment of the disclosure, handover latency time can be reduced, and the drop of a link attributable to sudden signal intensity degradation can be prepared. Accordingly, a handover method having high reliability can be provided. Furthermore, signaling overhead can be reduced by preventing unnecessary handover.

BRIEF DESCRIPTION OF DRAWINGS

FIG. 22 shows an example of a MAC CE configuration between a UE_1 and a UE_2 for being used in the embodiment of FIG. 21.

FIG. 23 shows an example of a MAC sub-header configuration for being used in the embodiment of FIG. 21.

MODE FOR THE INVENTION

Figure 1:
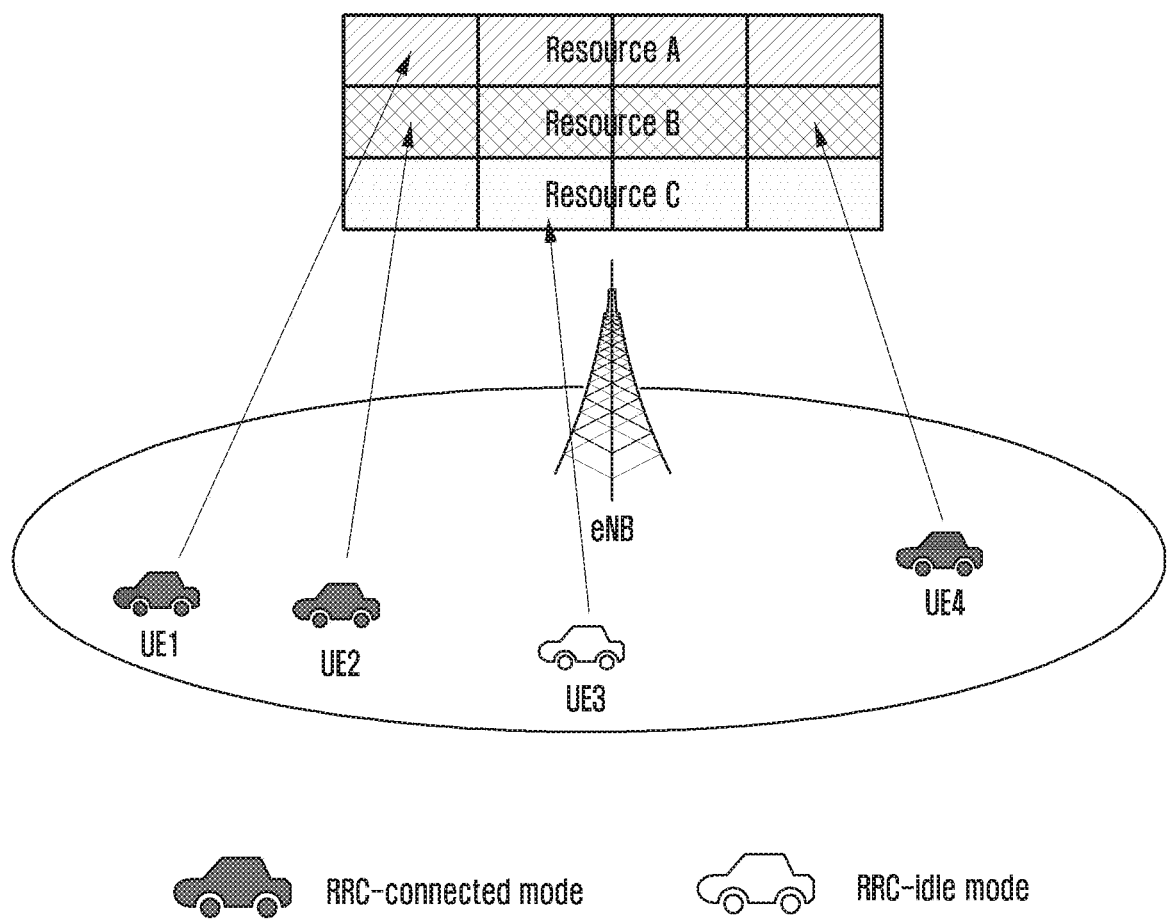
FIG. 1 is a diagram showing an example of a method for a vehicle UE to use a resource under the control of a base station.

Hereinafter, embodiments of the disclosure are described in detail with reference to the accompanying drawings.

In describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in one embodiment, "unit" may include one or more processors.

Embodiment 1

Hereinafter, operations of a base station and a UE managing an idle mode resource congestion are described with reference to various embodiments.

An idle mode UE may mean a UE operating in a radio resource control (RRC)-idle mode or an RRC-inactive mode, and a connected mode UE may mean a UE operating in an RRC-connected mode. In the disclosure, reference is made to a UE operating in the RRC-idle mode, as an example of an idle mode UE, but an idle mode UE according to an embodiment of the disclosure may include a UE operating in the RRC-inactive mode. Furthermore, the disclosure is described by taking a vehicle UE as an example, but an embodiment of the disclosure may be applied to a pedestrian UE or a road side unit (RSU) UE supporting the vehicle to everything (V2X) function.

FIG. 1 is a diagram showing an example of a method for a vehicle UE to use a resource under the control of a base station.

Referring to FIG. 1, UEs is in an RRC-connected mode or RRC-idle mode depending on a connection situation with a base station, under the control of the base station. Furthermore, the base station may allocate resources through which V2X data may be transmitted to UEs (UE1 to UE4) under the control of the base station.

For example, a resource A may be a dedicated resource allocated to a UE1 by a base station (e.g., eNB) so that the UE1 can transmit V2X data in an RRC-connected state. In this case, the UE1 may use the resource A in the RRC-connected mode.

A resource B may be a common resource available for both a UE2 and a UE4, allocated to the UE2 and the UE4 by a base station (e.g., eNB) so that the UE2 and the UE4 can transmit V2X data in the RRC-connected state. If there is V2X data to be transmitted in the RRC-connected state, the UE2 and the UE4 may use the resource B through contention.

A resource C may be a common resource through which a UE of the RRC-idle state transmits V2X data, which is allocated by a base station (e.g., eNB). If there is V2X data to be transmitted in the RRC-idle state, a UE3 may use the resource C.

Figure 2:
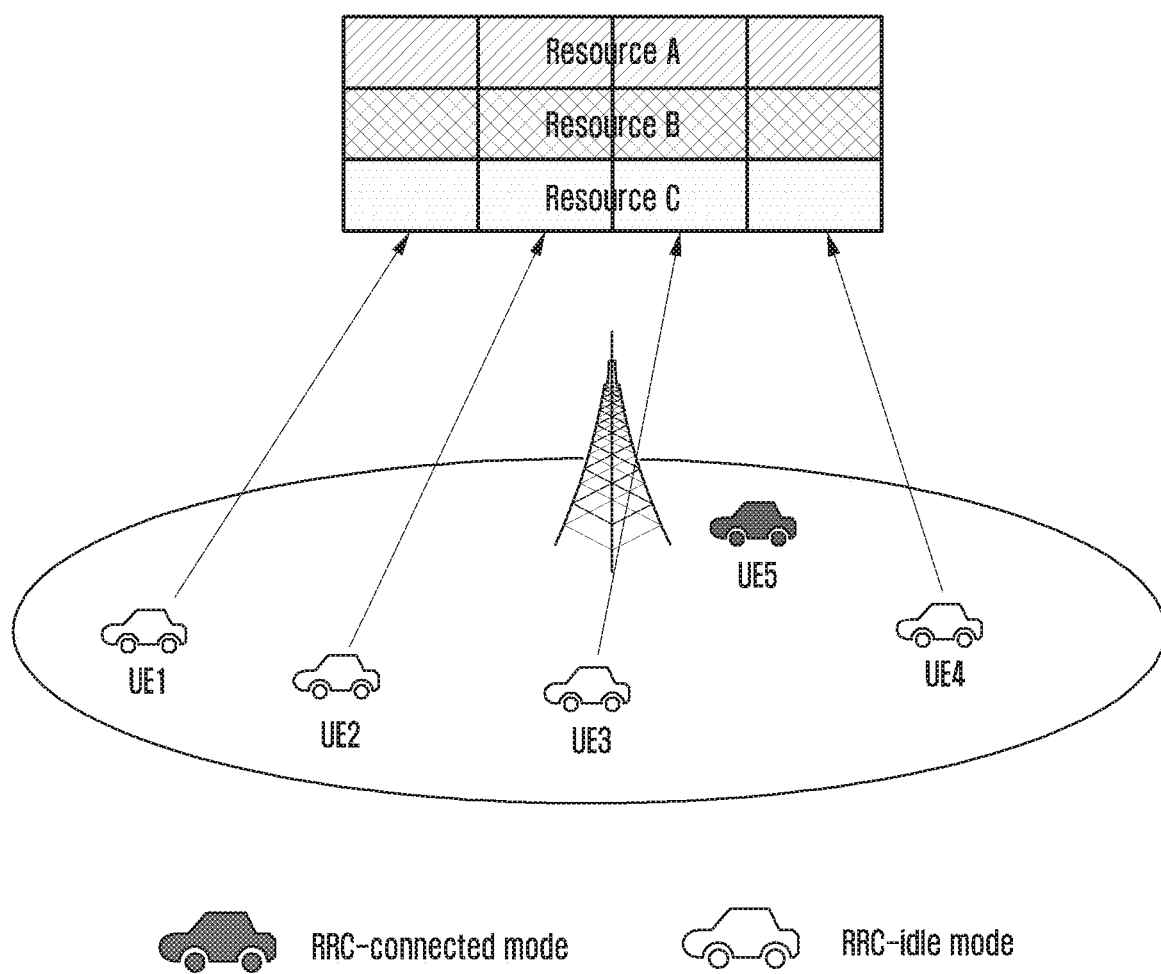
FIG. 2 is a diagram showing an example of a method for vehicle UEs to use resources when they enter an idle mode under the control of a base station.

FIG. 2 is a diagram showing an example of a method for vehicle UEs to use resources when they enter an idle mode under the control of a base station.

Referring to FIG. 2, the UEs may shift from an RRC-connected mode to an RRC-idle mode in order to reduce power consumption under the control of a base station. Furthermore, the base station may allocate resources through which V2X data may be transmitted to the UEs (UE1 to the UE5) under the control of the base station.

For example, a resource A may be a dedicated resource allocated to the UE1 by a base station (e.g., eNB) so that the UE1 may transmit V2X data in the RRC-connected state. In this case, the resource A is available only in the RRC-connected state.

A resource B may be a common resource available for all the UE1 to the UE5, which is allocated by a base station (e.g., eNB) and through which all the UE1 to the UE5 may transmit V2X data in the RRC-connected state. If there is V2X data to be transmitted in the RRC-connected state, the UEs may use the resource B through contention.

A resource C may be a common resource available for all the UE1 to the UE4, which is allocated by a base station (e.g., eNB) and through which a UE in the RRC-idle state may transmit V2X data. If there is V2X data to be transmitted in the RRC-idle state, the UE1 to the UE4 may use the resource C.

As RRC idle UEs increase, UEs attempting to use the resource C increase. Accordingly, a collision possibility is higher when the resource C is used.

Figure 3:
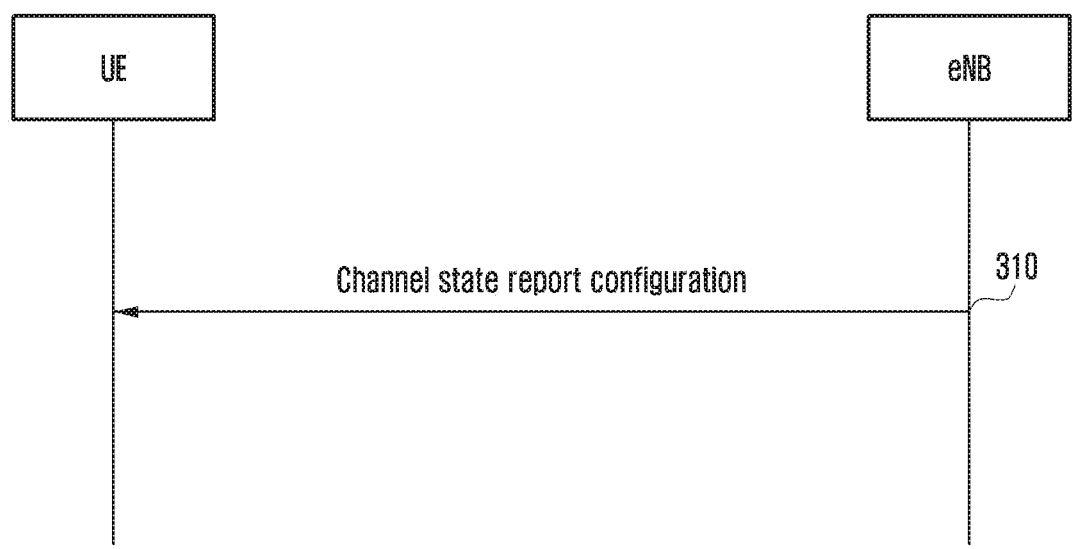
FIG. 3 is a diagram showing a method for a base station to configure channel state measurement and reporting by a UE.

FIG. 3 is a diagram showing a method for a base station to configure channel state measurement and reporting by a UE.

Referring to FIG. 3, an eNB may transmit a channel state reporting configuration message for indicating a method of measuring a channel (resource) state or a method of reporting a channel state to a UE (310).

In order to indicate the method of measuring and reporting a channel (resource) state with respect to the UE, the eNB may include resource pool information (e.g., resource pool ID or a zone ID) in the channel state reporting configuration message.

Furthermore, the channel state reporting configuration message may include information (e.g., support-resource pool channel state report) indicating whether the UE needs to report channel (resource) state information on a corresponding resource pool.

Furthermore, the channel state reporting configuration message may include information on a threshold, that is, a reference for reporting after the UE measures a channel (resource) state. For example, the threshold may be represented in an energy value (dB) unit. Furthermore, the threshold may have one or a plurality of values.

Furthermore, the channel state reporting configuration message may include information on timing for measuring a channel (resource). The timing may be periodic timing or event-based timing. For example, when an eNB configures measurement timing in a UE, the eNB may configure that the UE should periodically measure a channel based on a paging period or a discontinuous reception (DRX) period using a channel state reporting configuration message. Alternatively, the eNB may include information for selectively measuring, by the UE, a channel based on a paging period or a DRX period in the channel state reporting configuration message. In another embodiment, the event-based timing may be configured a case where a channel (resource) state energy value is a threshold or more or a case where a channel (resource) state energy value is a threshold or less.

Furthermore, the channel state reporting configuration message may include information on timing for reporting a measured channel (resource) state. For example, an eNB may include type information, indicating that a UE periodically reports a channel (resource) state based on paging timing or a UE should selectively report a channel (resource) state if there is data to be received at paging timing, in the channel state reporting configuration message, as information on the channel measurement reporting period (or timing) of the UE. If a channel (resource) state is periodically reported based on paging timing, the period may be a paging period or a positive number times the paging period.

Furthermore, the eNB may notify the UE of duration for which a channel (resource) should be measured at timing for measuring the channel (resource). For example, if duration is set as 100 ms, the UE may measure a channel (resource) for 100 ms at corresponding timing.

Alternatively, the eNB may indicate timing in which the channel (resource) should be measured or timing in which the measurement of the channel (resource) should be ended using the channel state reporting configuration message.

Figure 4:
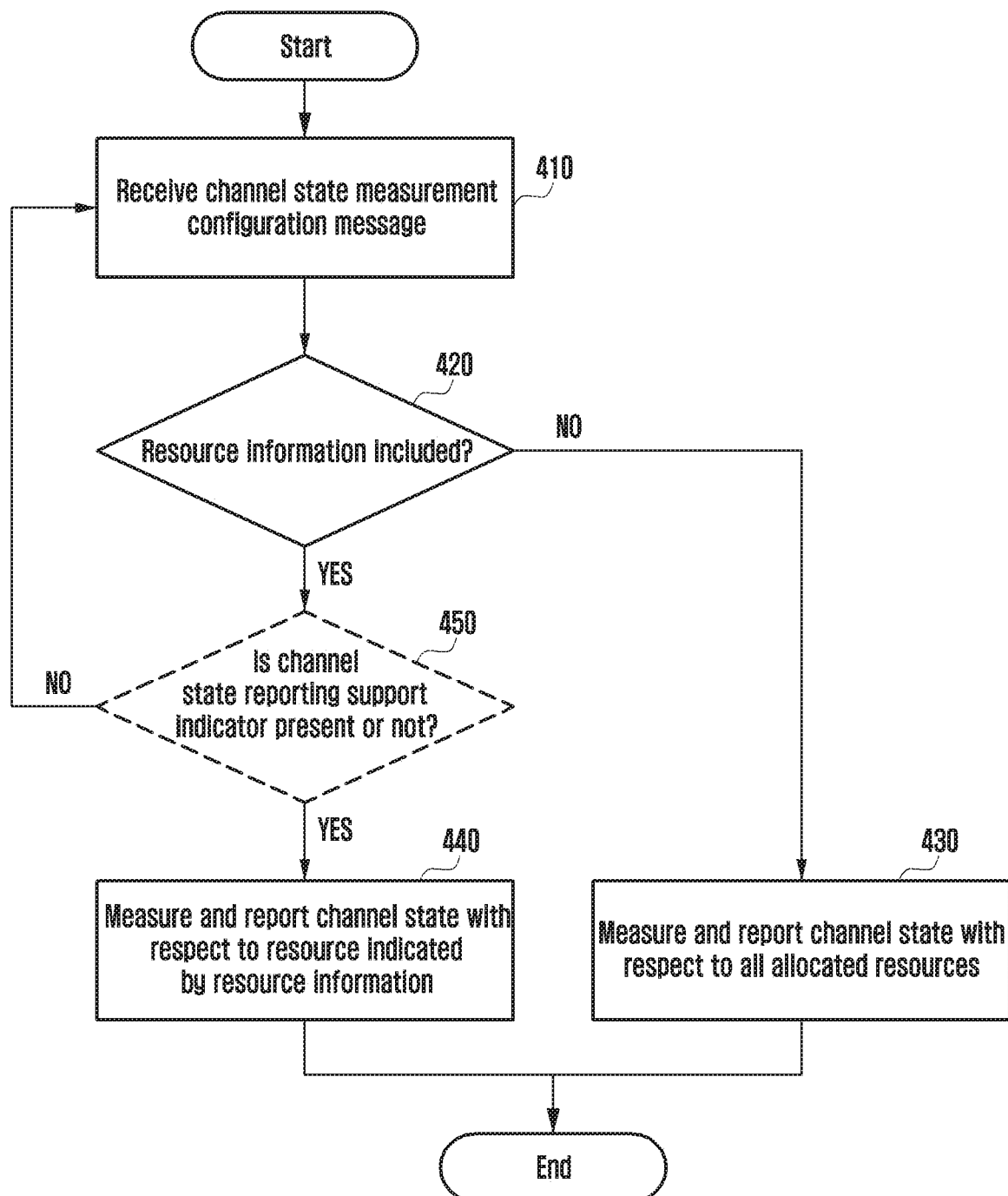
FIG. 4 is a diagram showing a method for a UE to determine channel measurement and operate after receiving a channel state measurement configuration message.

FIG. 4 is a diagram showing a method for a UE to determine channel measurement and operate after receiving a channel state measurement configuration message.

Referring to FIG. 4, after receiving a channel state measurement configuration message, the UE may identify a channel (resource) to be measured based on information included in the channel state measurement configuration message.

For example, when a UE receives a channel state measurement configuration message from a base station (410), the UE identifies whether resource information (e.g., resource pool information, resource ID) is included in the channel state measurement configuration message (420). When resource information is not present, the UE measures and reports a channel (resource) state with respect to all V2X resources allocated by the base station (430). When resource information is included, the UE may measure and report a channel (resource) state with respect to only a resource indicated by the resource information (440).

When resource information is included in the channel state measurement configuration message and information (e.g., channel state reporting support indicator) indicating whether a corresponding resource situation should be measured and reported is also included, the UE identifies whether it has to report a resource state (450), and then measures and reports a channel (resource) state for a corresponding resource.

In another embodiment, a case where resource information is not included in the channel state measurement configuration message and a channel state reporting support indicator is present may be taken into consideration.

Figure 5:
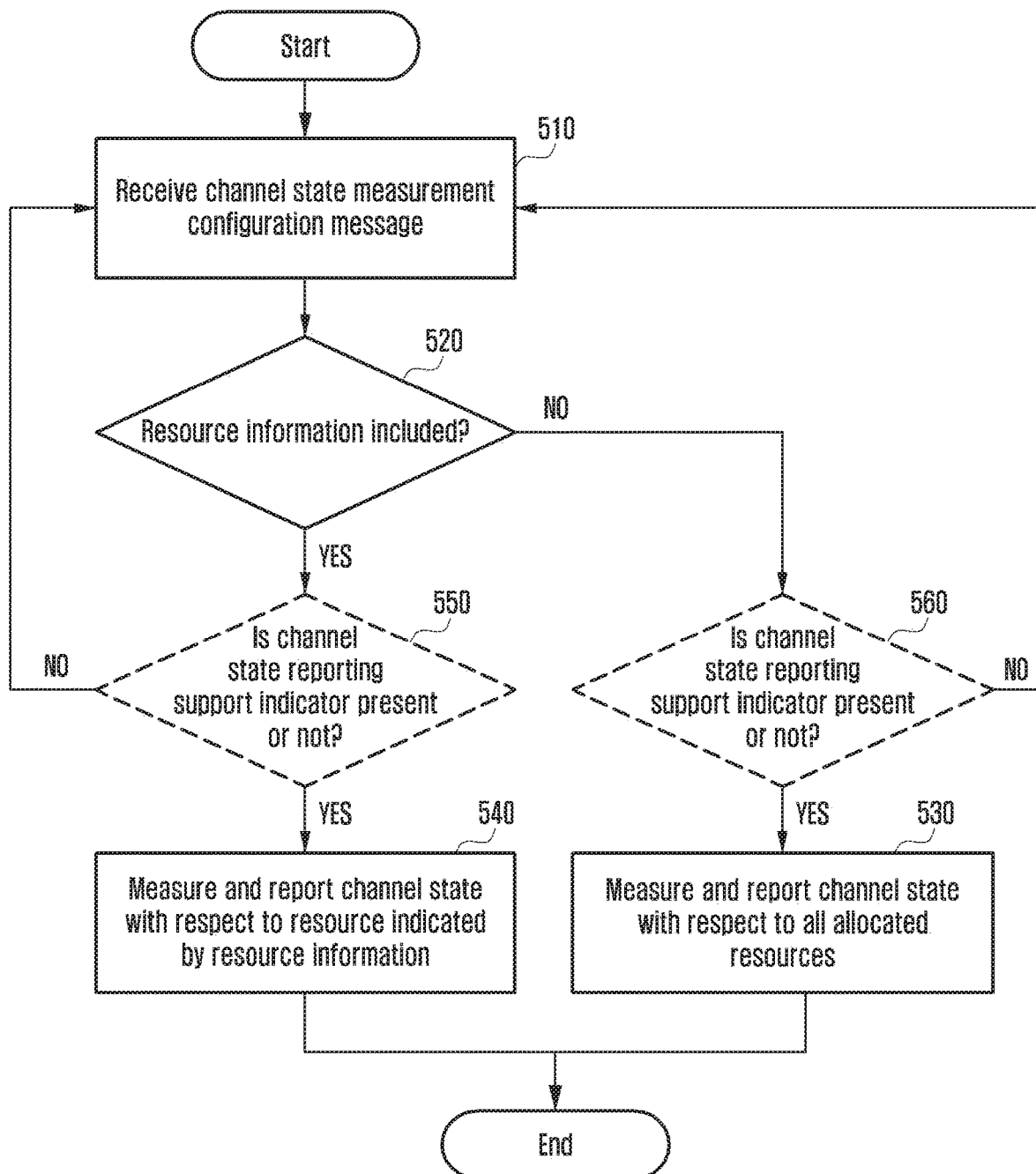
FIG. 5 is a diagram showing another example of a method for a UE to determine channel measurement and operate after receiving a channel state measurement configuration message.

FIG. 5 is a diagram showing another example of a method for a UE to determine channel measurement and operate after receiving a channel state measurement configuration message.

Referring to FIG. 5, when resource information is included in a channel state measurement configuration message, a UE may additionally determine the presence or absence of a channel state reporting support indicator (550). When a channel state reporting support indicator is configured, the UE measures a channel state for a resource indicated by resource information of the channel state measurement configuration message, and performs channel reporting (540).

When resource information is not present in the channel state measurement configuration message, the UE may additionally determine the presence or absence of a channel state reporting support indicator (560). When a channel state reporting support indicator is configured, the UE measures a channel state for all or given resource and perform channel reporting (530).

Figure 6:
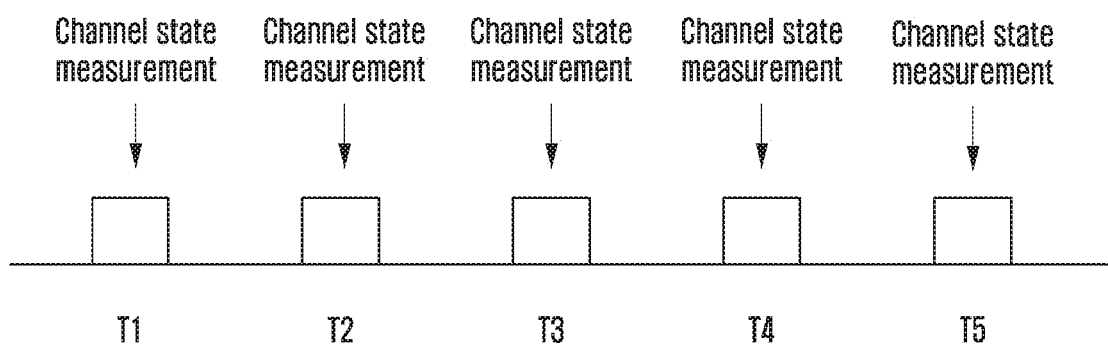
FIG. 6 shows a method for a UE to periodically measure a channel.

FIG. 6 shows a method for a UE to periodically measure a channel.

If a UE receives timing information in which channel (resource) state measurement should be performed through the channel state reporting configuration message of FIG. 3 or information on measurement timing is not received from a base station, the disclosure proposes that the UE autonomously determines measurement timing and measures a channel (resource) state.

In the example of FIG. 6, a UE may periodically measure a channel (resource) state. For example, the UE may measure a channel (resource) state every piece of timing from T1 to T5.

T1 to T5 may be periodic timing determined based on paging or DRX included in channel measurement configuration information (or the channel state reporting configuration message) received from a base station. If the UE autonomously determines measurement timing, the measurement timing may be timing determined based on a paging period or DRX period from system information received from a base station.

Furthermore, if paging or DRX used to determine measurement timing, the measurement timing may be a contiguous paging or DRX period. For example, the UE may measure a channel state at the T1, T2, T3, T4 and T5 timing.

In another embodiment, if paging or DRX is used to determine measurement timing, the measurement timing is not contiguous and may be a positive number times the paging or DRX period. For example, if a channel state is measured in a period twice the paging or DRX period, the UE may measure a channel state at the T1, T3 and T5 timing.

Figure 7:
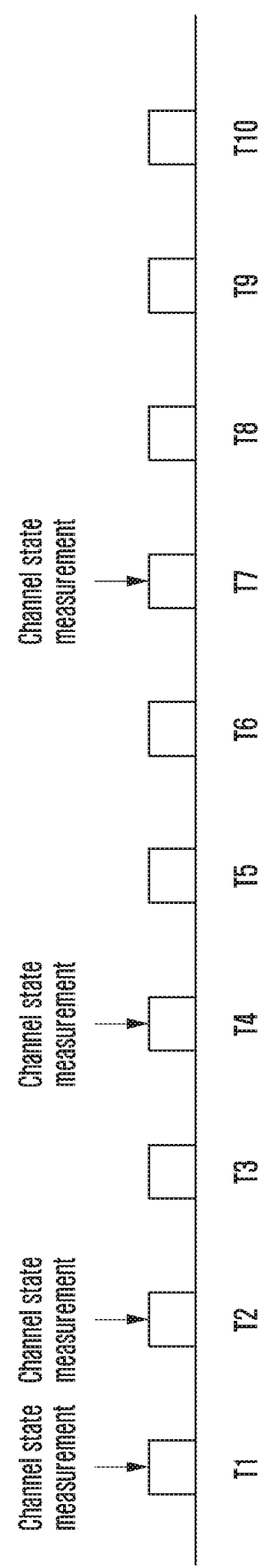
FIG. 7 shows a method of changing a measurement period before a given event occurs in a method for a UE to periodically measure a channel.

FIG. 7 shows a method of changing a measurement period before a given event occurs in a method for a UE to periodically measure a channel.

The disclosure proposes that a UE autonomously determines timing for channel (resource) state measurement and measures a channel (resource) state when the UE receives information on timing in which a channel (resource) state should be measured or when timing information is not received from a base station, in the channel state reporting configuration message shown in FIG. 3.

In the example of FIG. 7, the UE may selectively measure a channel (resource) state. For example, if a change in a measured channel state is not great when the UE measures a channel (resource) in T1 and T2 or when an event for reporting channel (resource) state measurement (e.g., when a channel busy state is greater than a given threshold Th1 or smaller than a given threshold Th2) does not occur, the UE does not measure a channel (resource) state in T3, but may measure a channel (resource) state in T4.

Furthermore, if a change in the measured channel state is not great compared to a channel state measured in the T1 and T2 when channel (resource) state is measured in the T4, or when an event for reporting channel (resource) state measurement does not occur, the UE does not measure a channel (resource) state in T5 and T6, and may measure a channel (resource) state in T7. In this manner, when a given event does not occur with respect to a channel (resource) state, the UE may increase a measurement period. Timing in which the UE does not perform measurement may be increased only up to given timing(n). Information on the given timing (n) may be received from the eNB, or the UE may previously store the given timing(n). For example, if given timing(n) is 3, the UE may not perform channel measurement up to No. 3 based on paging timing. Thereafter, the UE needs to measure a channel.

Figure 8:
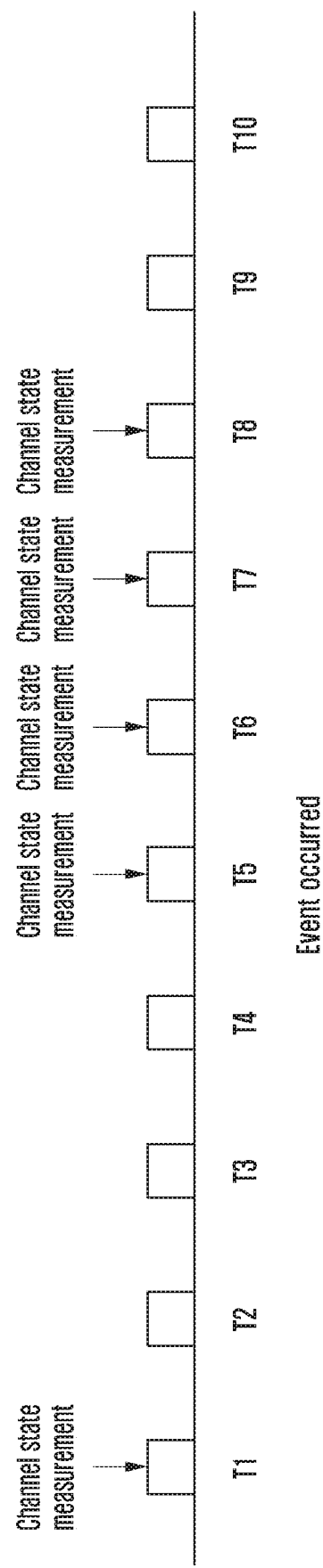
FIG. 8 shows a method of changing a measurement period when a given event occurs in a method for a UE to periodically measure a channel.

FIG. 8 shows a method of changing a measurement period when a given event occurs in a method for a UE to periodically measure a channel.

The disclosure proposes that a UE autonomously determines timing for channel (resource) state measurement and measures a channel (resource) state when the UE receives information on timing in which channel (resource) state measurement should be performed or when timing information is not received from the eNB, in the channel state reporting configuration message shown in FIG. 3.

In the example of FIG. 8, the UE may selectively measure a channel (resource) state.

For example, referring to the method of FIG. 8, if a difference in a channel (resource) measurement state is not great when a channel is measured in T1 or when an event for reporting channel (resource) state measurement does not occur, the UE does not measure a channel (resource) state in T2, T3 and T4, and may measure a channel (resource) state in T5. After the UE measures a channel (resource) state in the T5, when an event that channel (resource) state measurement should be reported occurs (e.g., when a channel busy state is greater than a given threshold Th1 or more or a given threshold Th2 or less), the UE may periodically perform measurement during nD timing after the T5. For example, if nD is 3, the UE may periodically measure a channel (resource) state in T6, T7 and T8.

Information on given timing nD may be received from the eNB or the UE may previously store the information.

Furthermore, optionally, information (e.g., measurement timing T, a period nD in which measurement should be performed after given timing) necessary for channel (resource) state measurement may be configured by a base station or a UE may have previously stored the corresponding information.

Figure 9:
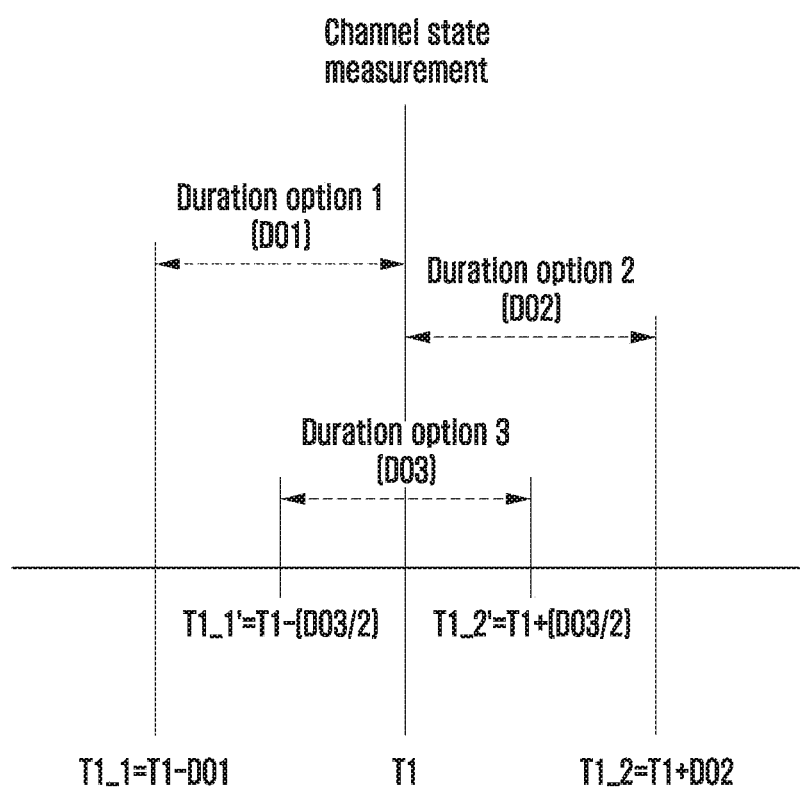
FIG. 9 shows options for operating a measurement interval in a method for a UE to measure a channel state.

FIG. 9 shows options for operating measurement duration in a method for a UE to measure a channel state.

A UE may receive information on channel state measurement reference timing and/or a channel state measurement duration from an eNB. For example, an eNB may indicate T1 (e.g., timing synchronized with a paging occasion, timing synchronized with a DRX cycle, timing synchronized with a paging cycle) as channel measurement reference timing with respect to a UE, and may indicate 100 ms as a channel state measurement duration.

The UE may identify channel state measurement start timing and channel state measurement end timing using the channel state measurement reference timing and the channel state measurement duration.

Embodiments of the channel state measurement start timing and the channel state measurement end timing are as follows. In FIG. 9, Option 1 is a case where a UE measures a channel state during previous duration from channel state measurement reference timing. In this case, channel measurement start timing T1_1 in which duration is taken into consideration may be obtained based on a difference between channel state measurement reference timing T1 and duration option 1 (DO1). For example, the channel state measurement start timing T1_1 may be T1-D01. Furthermore, channel state measurement end timing T1_2 may be T1.

In FIG. 9, Option 2 is a case where the UE measures a channel state during subsequent duration from the channel state measurement reference timing. In this case, the channel measurement start timing T1_1 may be the channel state measurement reference timing T1. Furthermore, the channel measurement end timing T1_2 in which duration is taken into consideration may be obtained through the sum of the channel measurement state reference timing T1 and duration option 2 (DO2). For example, the channel state measurement end timing T1_2 may be T1+D02.

In FIG. 9, Option 3 is a case where a channel state is measured by taking into consideration duration before and after channel state measurement reference timing. In this case, channel state measurement start timing T1_1' in which duration is taken into consideration may be obtained through a difference using the channel state measurement reference timing T1 and duration option 3 (DO3). For example, the channel state measurement start timing T1_1' may be T1-(DO3/2). Furthermore, channel state measurement end timing T1_2' in which duration is taken into consideration may be obtained through the sum using the channel state measurement reference timing T1 and the duration option 3 (DO3). For example, the channel measurement status end timing T1_2' may be T1+(DO3/2).

The duration option 1, the duration option 2, and the interval option 3 may be indicated by an eNB with respect to a UE or may be determined by a UE based on channel state measurement reference timing information and duration information.

Figure 10:
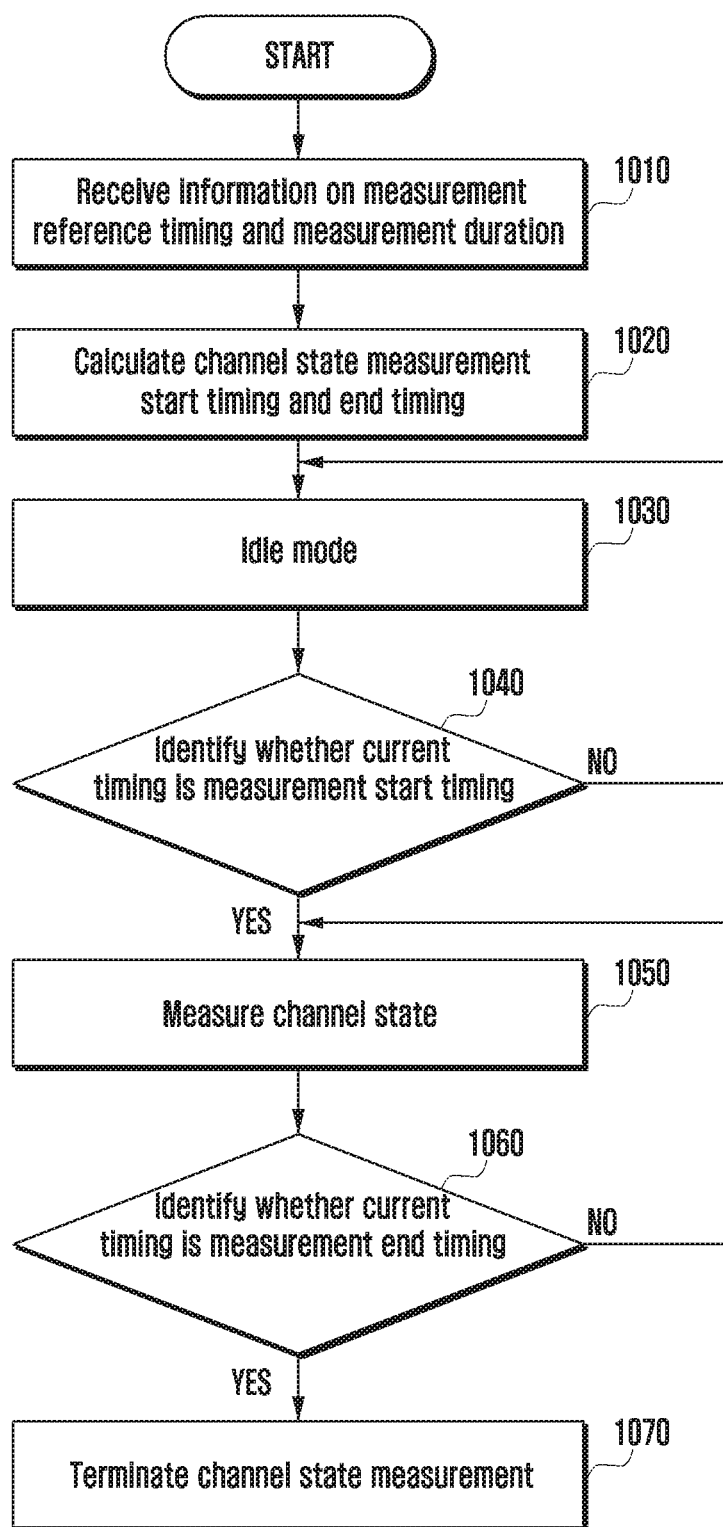
FIG. 10 shows an operation of a UE in the embodiment of FIG. 9 according to the disclosure.

FIG. 10 shows an operation of a UE in the embodiment of FIG. 9 according to the disclosure.

The UE may receive information on channel state measurement reference timing (e.g., paging timing) and information on measurement duration through the UE configuration method (e.g., in the channel state configuration message) of FIG. 3 (1010). The UE may identify timing in which the UE should start channel state measurement and the UE should end the channel state measurement in the embodiment of FIG. 9 based on at least one of channel state measurement reference timing information, information on measurement duration or a duration option (1020).

A duration option for calculating the timing in which the UE should start channel state measurement and the timing in which the UE should end the channel state measurement (1020) may be received from an eNB or the UE may have previously stored the interval option.

After calculating the channel state measurement start timing and the channel state measurement end timing (1020), the UE operates in an idle mode (1030). The UE in the idle mode identifies whether current timing is the channel state measurement start timing identified in step 1020 (1040). If the current timing is the channel state measurement start timing, the UE starts channel state measurement (1050). If the current timing is not the channel state measurement start timing, the UE continues to operate in the idle mode (1030). After the UE starts the channel state measurement (1050), the UE identifies whether current timing is the channel state measurement end timing identified in step 1020 (1060). If the current timing is the channel state measurement end timing, the UE ends the channel state measurement (1070). If the current timing is not the channel state measurement end timing, the UE continues to perform the channel state measurement (1050).

Figure 11:
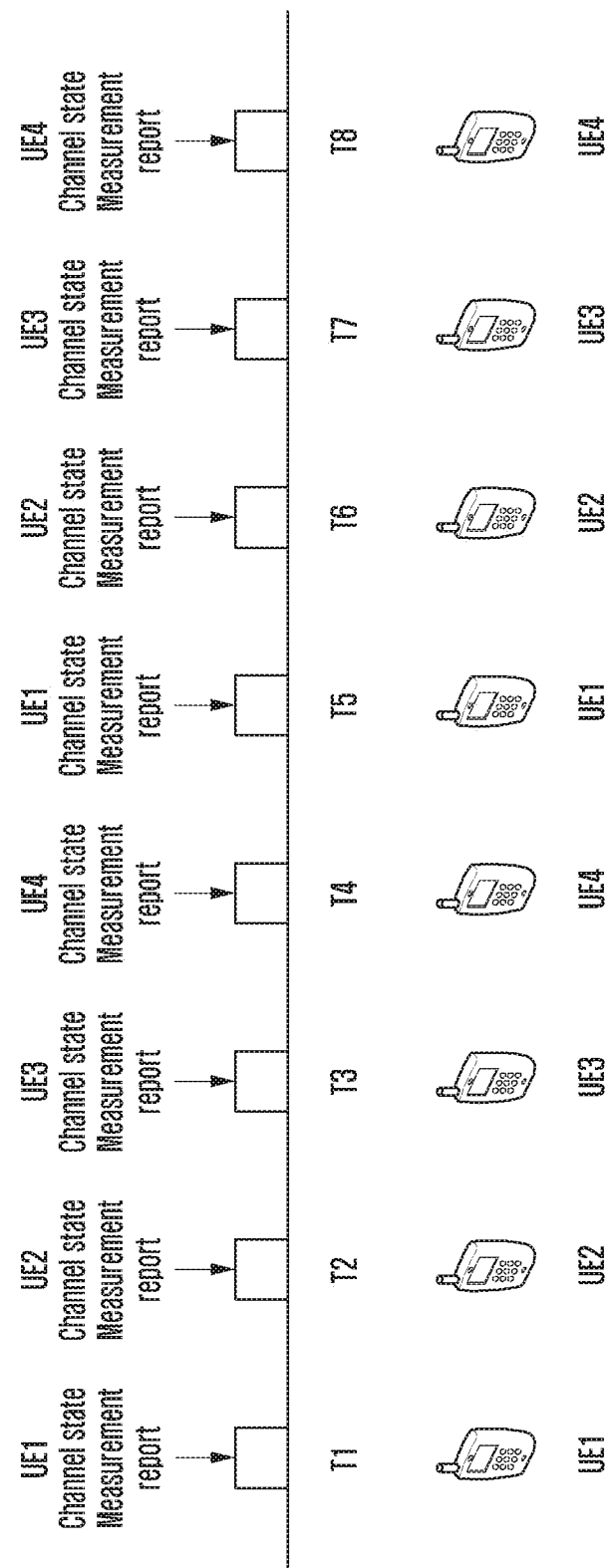
FIG. 11 shows a method for a base station to operate a channel state reporting transmission period for each UE.

FIG. 11 shows a method for an eNB to operate a channel state reporting transmission period for each UE.

Referring to the channel state reporting configuration method of FIG. 3 proposed by the disclosure, an eNB may configure that a UE should report a channel state periodically or based on an event. Furthermore, referring to the embodiment of FIG. 11, the eNB provides information so that each UE has a different channel state reporting period and event timing. The UEs may report the channel state at different timing.

The UEs transmit channel state reporting at different timing, and thus the eNB may receive channel state reporting at contiguous timing.

For example, if a UE1 is configured to transmit channel state reporting to an eNB in T1 and T5, a UE2 is configured to transmit channel state reporting to the eNB in T2 and T6, a UE3 is configured to transmit channel state reporting to the eNB in T3 and T7, and a UE4 is configured to transmit channel state reporting to the eNB in T4 and T8 through channel measurement configuration information, the eNB may contiguously receive channel state reporting from the T1 to the T8.

A paging period or a DRX period may be determined as reporting timing so that the eNB may contiguously receive channel state reporting because the UEs report the channel state at different timing.

Furthermore, in order for UEs to report channel state at different timing for each group, a group of UEs may be designated based on a resource and channel state reporting timing may be determined or a group of UEs may be designated for each zone within the eNB and channel state reporting timing may be determined.

Furthermore, the channel state reporting timing may be configured based on a dedicated message or system information.

Figure 12:
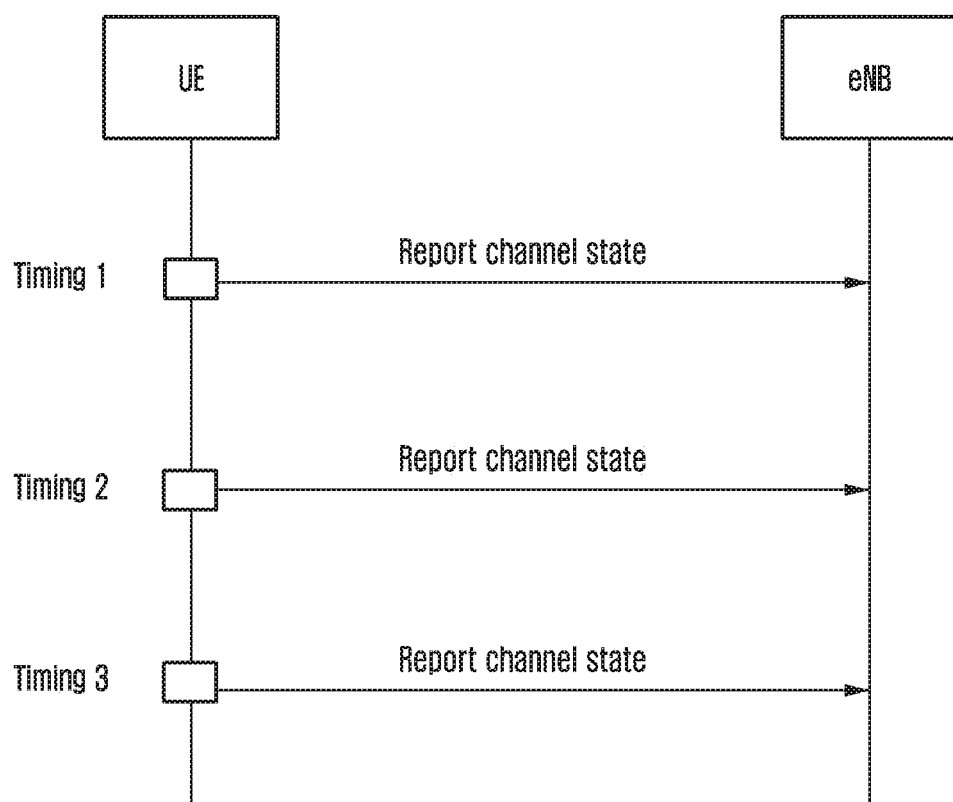
FIG. 12 shows a method for a UE to periodically report a channel state after the UE measures the channel state.

FIG. 12 shows a method for a UE to periodically report a channel state after the UE measures the channel state.

As shown in FIGS. 5 to 9, the UE may measure a channel (resource) state and transmit the measurement result to an eNB.

When the UE receives a configuration type that channel state reporting should be periodically transmitted in the channel state reporting configuration message of FIG. 3, the UE may periodically transmit channel state measurement results based on configuration information.

For example, if an eNB has configured that channel state measurement should be periodically reported with respect to a UE, a channel state measurement reporting method of the UE is as follows. If channel measurement reporting timing of the UE has been configured as a paging timing period, timing 1 of FIG. 12 becomes the paging timing period. The UE may report channel state results, measured in the timing 1, to the eNB. Alternatively, the UE may report results, measured in a given interval prior to the timing 1, to the eNB.

The channel state reporting may include information, such as a measured resource pool ID, a channel situation (e.g., busy, not busy, or a channel occupancy status (70%)).

Figure 13:
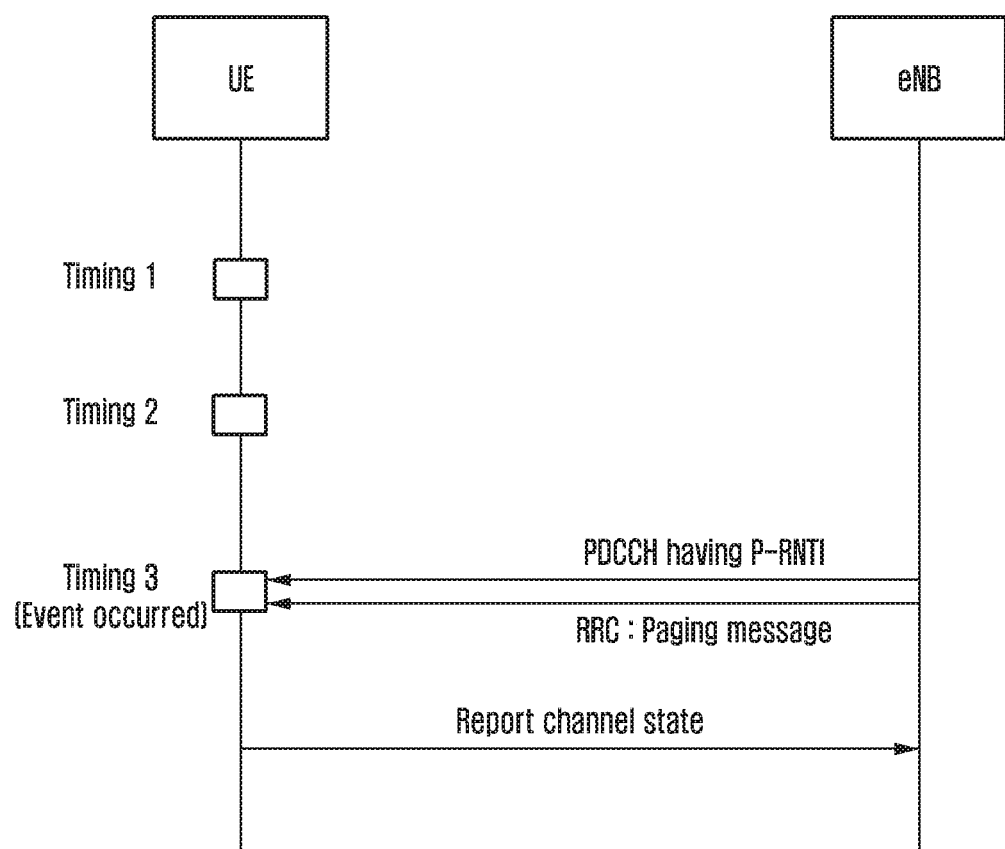
FIG. 13 shows a method for a UE to report a channel state when an event occurs after the UE measures the channel state.

FIG. 13 shows a method for a UE to report a channel state when an event occurs after the UE measures the channel state.

As shown in FIGS. 5 to 9, the UE may measure a channel (resource) state and transmit results (channel state report) to an eNB.

When the UE receives a configuration type that channel state reporting should be transmitted selectively (based on an event) in the channel state reporting configuration message of FIG. 3, the UE may selectively transmit channel state reporting based on channel state reporting configuration information provided by the eNB.

For example, in the embodiment of FIG. 13, if timing 1, timing 2 and timing 3 correspond to paging periods and an eNB configures channel state measurement timing based on a paging period, a UE may measure a channel (resource) state in the timing 1, timing 2 and timing 3.

The UE may identify whether there is data to be received from the eNB in the timing 3 (e.g., the UE identifies whether it will receive data by identifying a physical downlink control channel (PDCCH) and a radio resource control (RRC) message), and may transmit a measured channel (resource) result to the eNB in the timing 3 after receiving paging.

The channel state reporting may include information, such as a measured resource pool ID, a channel situation (e.g., busy, not busy, or channel occupancy status (70%)).

Figure 14:
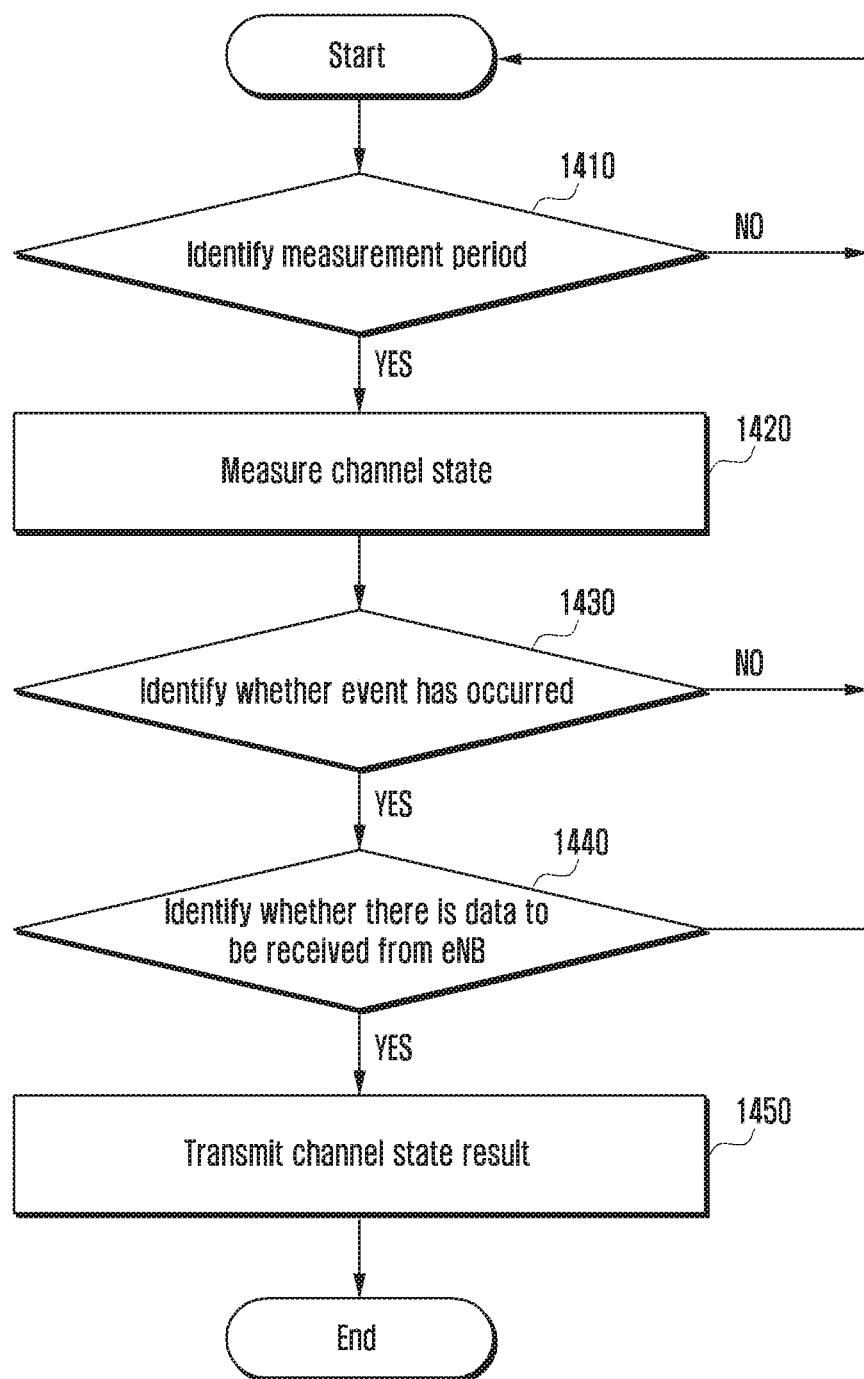
FIG. 14 shows an operation of a UE for reporting a channel state selectively (when an event occurs) after the UE measures the channel state.

FIG. 14 shows an operation of a UE for reporting a channel state selectively (when an event occurs) after the UE measures the channel state.

The UE may identify a measurement period in the channel state reporting configuration message of FIG. 3 (1410). For example, the measurement period may be a paging timing-based period or may be a DRX period. If current timing is measurement period timing, the UE may measure a channel (resource) state (1420). After the UE measures the channel (resource) state (1420), the UE may identify whether an event that a channel (resource) state should be reported occurs (1430).

For example, channel state measurement configuration information received from the eNB may include a given threshold (Th1, Th2). When the channel measurement result is greater than a given threshold Th1 or smaller than a given threshold Th2 or when the channel measurement result is greater than a given threshold Th1 and smaller than a given threshold Th2, the UE may determine that an event that the channel measurement result should be reported has occurred.

If an event that a channel measurement result should be reported has occurred (1430) and the UE has checked that there is data to be received from the eNB (1440), for example, if the UE has checked that there is data to be received by identifying a PDCCH indicative of a paging signal and an RRC message including a paging signal, the UE may transmit a channel state measurement result to the eNB (1450).

Figure 15:
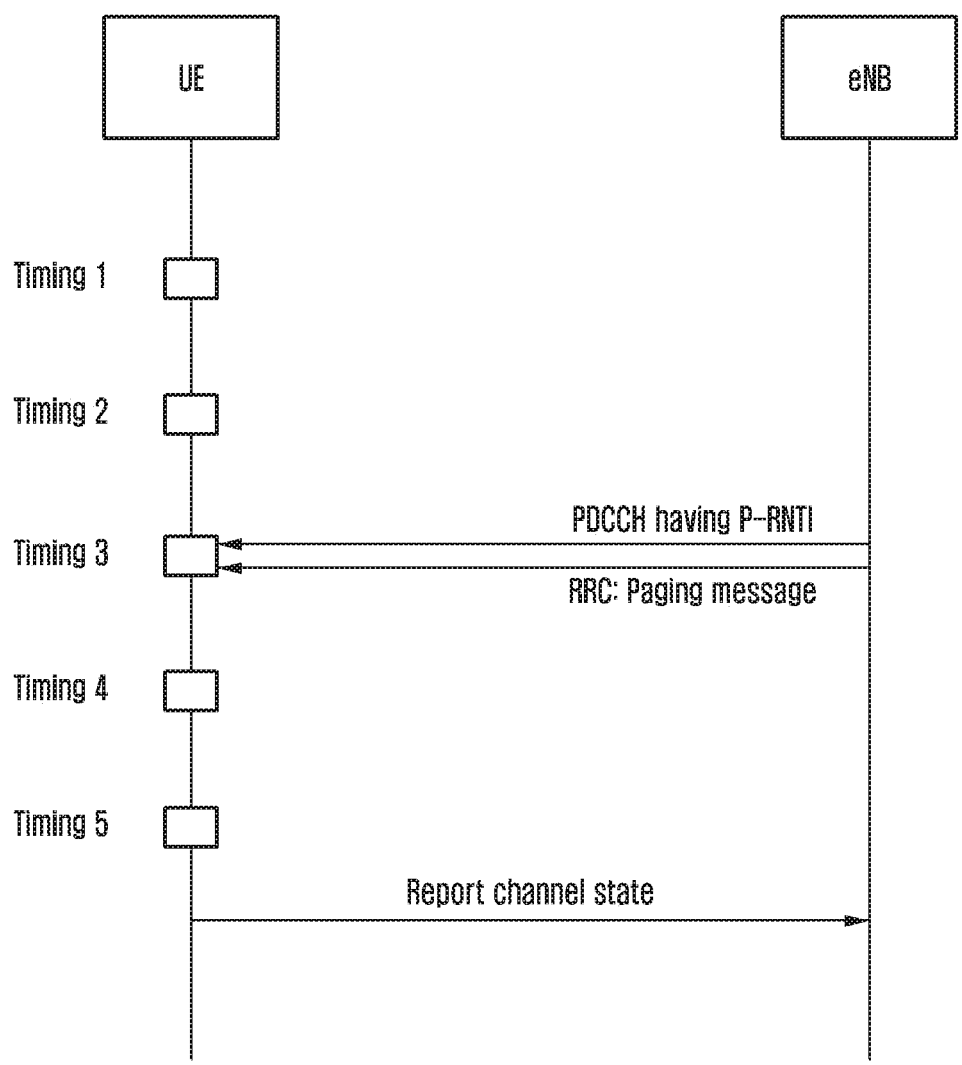
FIG. 15 shows a method for a UE to report a channel state after given timing if the UE reports the channel state when an event occurs after the UE measures the channel state.

FIG. 15 shows a method for a UE to report a channel state after given timing if the UE reports the channel state when an event occurs after the UE measures the channel state.

As shown in FIGS. 5 to 9, after measuring a channel (resource) state, the UE may transmit a result (channel state report) to the eNB.

If the UE receives a configuration type that channel state reporting should be transmitted selectively (based on an event) in the channel state reporting configuration message of FIG. 3, the UE may selectively transmit channel state reporting based on channel state reporting configuration information provided by the eNB.

For example, in the embodiment of FIG. 15, if timing 1, timing 2 and timing 3 correspond to paging periods and an eNB configures channel state measurement timing based on the paging periods, a UE may measure a channel (resource) state in the timing 1, timing 2 and timing 3. The UE may identify whether there is data to be received from the eNB in the timing 3 (paging timing) (e.g., the UE identifies whether there is data to be received by identifying a PDCCH and an RRC message), and may transmit a channel (resource) measurement result (channel state report) during given nd (e.g., when nd is 2, in timing 4 and 5) to the eNB after the timing 3. In another embodiment, after the timing 3, the UE may transmit a channel (resource) measurement result during a corresponding period to the eNB after given nd (e.g., when nd is 2 m in the timing 5).

The channel state reporting may include information, such as a measured resource pool ID, a channel situation (e.g., busy, not busy, or channel occupancy status (70%)).

Figure 16:
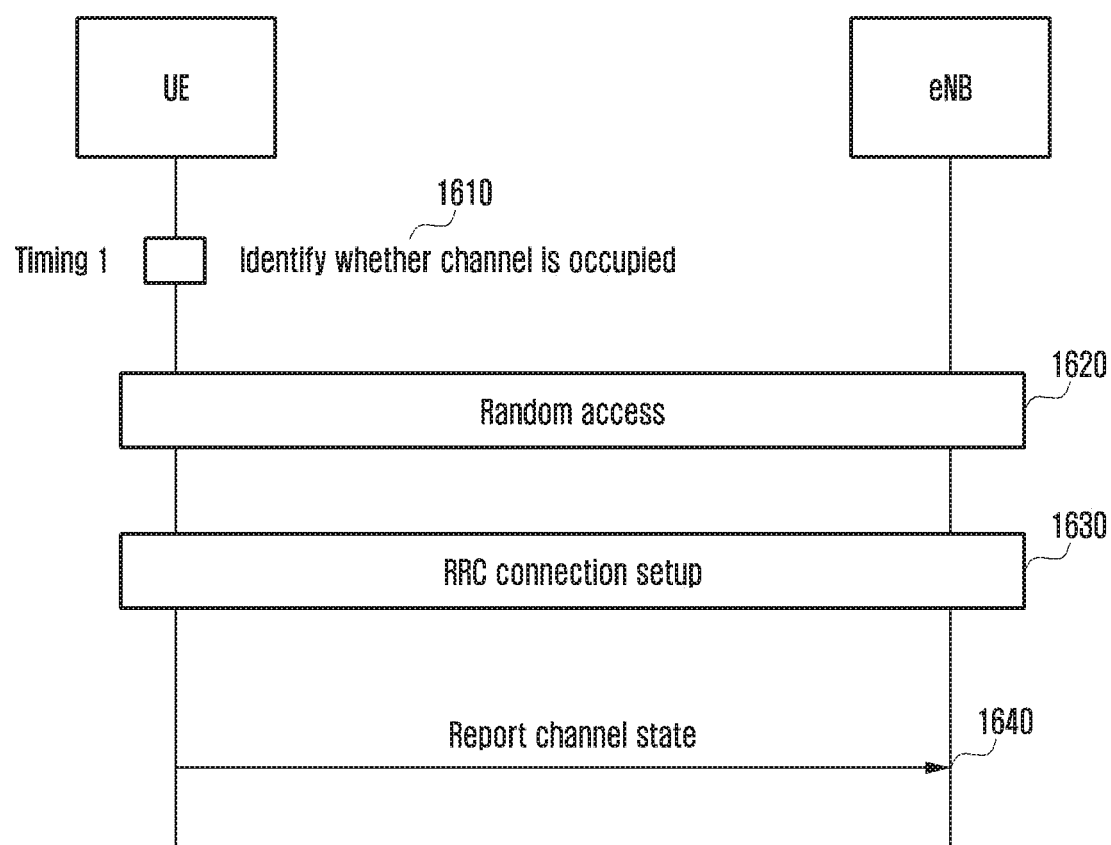
FIG. 16 shows a method for a UE to report a measurement result after a radio resource connection is set up between a base station and the UE if the UE reports the measurement result after the UE measures the channel state.

FIG. 16 shows a method for a UE to report a measurement result after a radio resource connection is set up between an eNB and the UE if the UE reports the measurement result after the UE measures the channel state.

As shown in FIGS. 3 to 15, the UE may report a measurement result to the eNB after measuring a channel state. In order to report the measurement result, the UE shifts from the idle mode to a connected mode, and the UE has a resource allocated thereto.

Specifically, referring to FIG. 16, the UE identifies whether a channel has been occupied (1610). The UE in the idle state may start a random access operation for a connection with an eNB (1620). The UE performs uplink sync with the eNB by performing a random access operation (1620), and shifts to an RRC-connected mode through an RRC connection setup process (1630). Thereafter, the UE receives an uplink resource for channel result reporting, allocated by the eNB, and may report a channel state (1640).

Furthermore, the channel state reporting may be transmitted through a measurement report message, that is, one of RRC messages, or may be transmitted as a separate RRC message or a separate MAC control element (CE) message.

Figure 17:
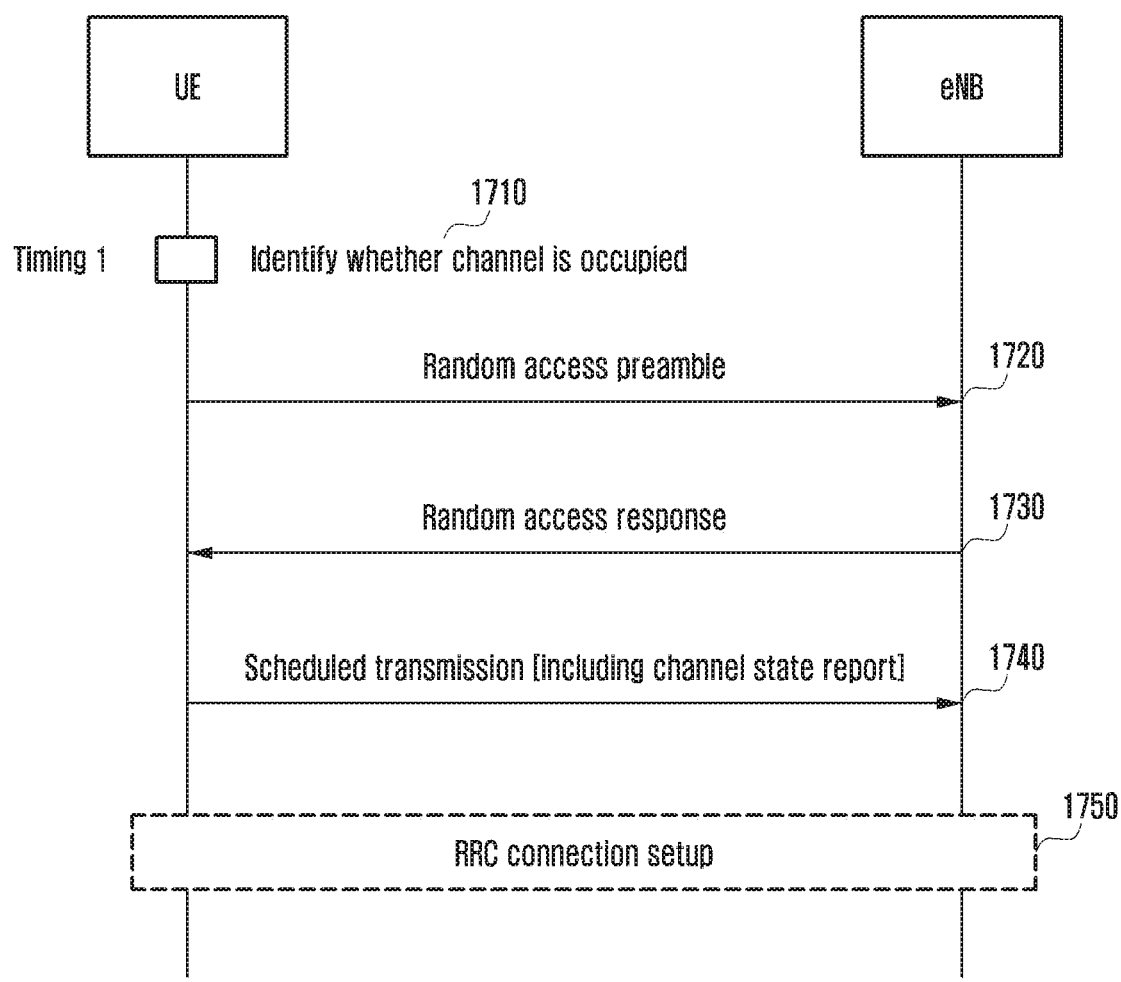
FIG. 17 shows a method for a UE to report a channel state before a radio resource connection is set up between a base station and the UE if the UE reports a measurement result after the UE measures the channel state.

FIG. 17 shows a method for a UE to report a channel state before a radio resource connection is set up between an eNB and the UE if the UE reports a measurement result after the UE measures the channel state.

As shown in FIGS. 3 to 15, after the UE measures a channel state, the UE may transmit a measurement result to the eNB. In order to report the measurement result, the UE shifts from the idle mode to a connected mode, and the UE has a resource allocated thereto.

Specifically, referring to FIG. 17, a UE identifies whether a channel has been occupied (1710). The UE in an idle state may transmit channel state reporting through some of a connection setup process for a connection with an eNB. Some of the connection setup process may include the step of transmitting an uplink resource during a random access process. For example, the UE may transmit a random access preamble to the eNB (1720). The eNB may identify uplink timing using the random access preamble, and may notify the UE of an allocated uplink resource through a random access response by allocating the uplink resource available for the UE (1730).

After receiving the random access response, the UE may transmit a channel (resource) state measurement result to the eNB through the allocated uplink resource (1740).

Thereafter, the UE may perform an RRC connection setup process with the eNB (1750).

Figure 18:
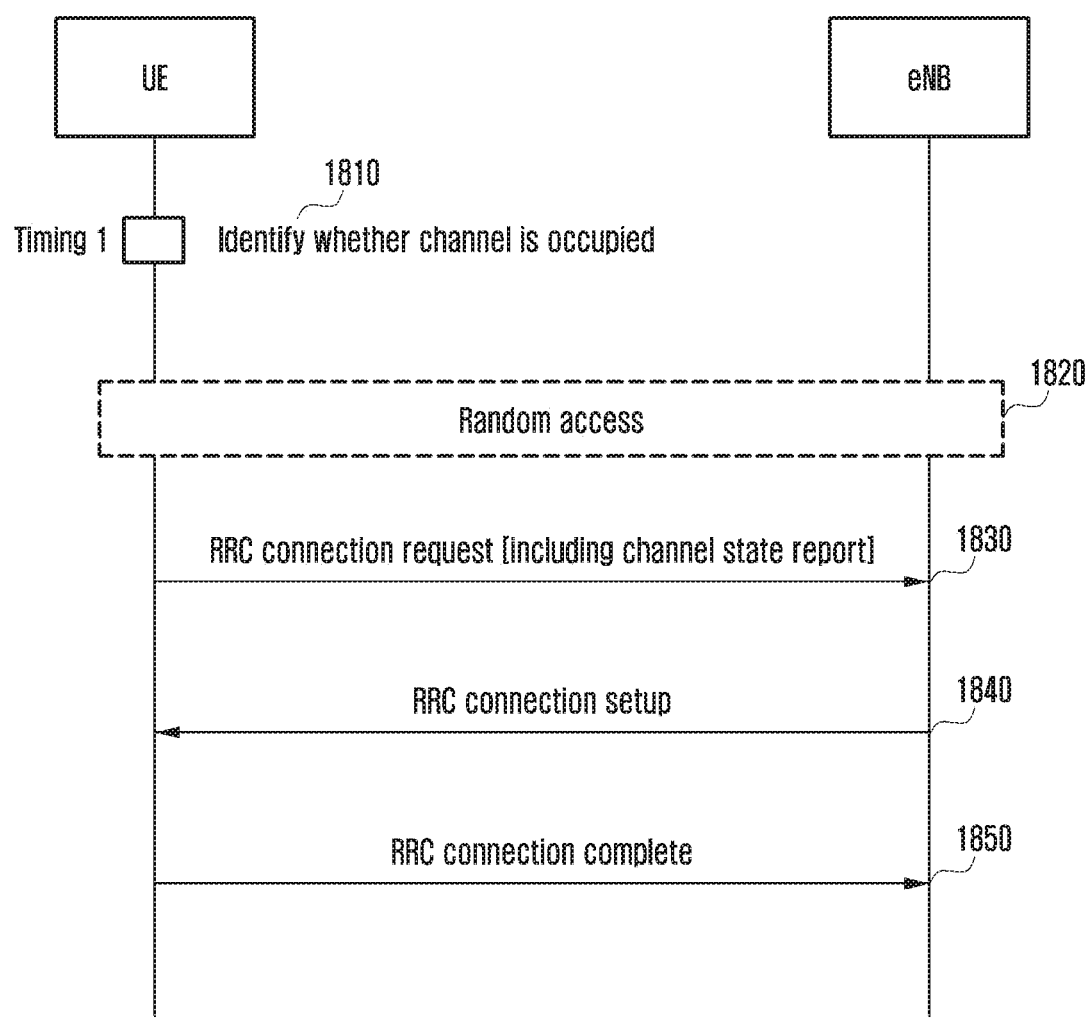
FIG. 18 shows a method for a UE to report a channel state using a configuration request message in a process of setting up a radio resource connection between a base station and the UE if the UE reports a measurement result after the UE measures the channel state.

FIG. 18 shows a method for a UE to report a channel state using a configuration request message in a process of setting up a radio resource connection between an eNB and the UE if the UE reports a measurement result after the UE measures the channel state.

As shown in FIGS. 3 to 15, after the UE measures a channel state, it may report a measurement result to the eNB. In order to report the measurement result, the UE shifts from the idle mode to a connected mode, and the UE has a resource allocated thereto.

Specifically, referring to FIG. 18, a UE identifies whether a channel has been occupied (1810). The UE in the idle state may start a random access operation for a connection with an eNB (1820). The UE may perform uplink sync with the eNB by performing a random access operation (1820), and then may shift to an RRC-connected mode through an RRC connection setup process (1830 to 1850). For example, the UE transmits an RRC connection request message to the eNB (1830). In response thereto, the eNB transmits an RRC connection setup message to the UE (1840). Finally, the UE transmits an RRC connection complete message to the eNB (1850).

In the embodiment of FIG. 18, the UE may transmit channel (resource) measurement result reporting to the eNB through the RRC connection request message in the RRC connection setup process (1830 to 1850) (1830).

Figure 19:
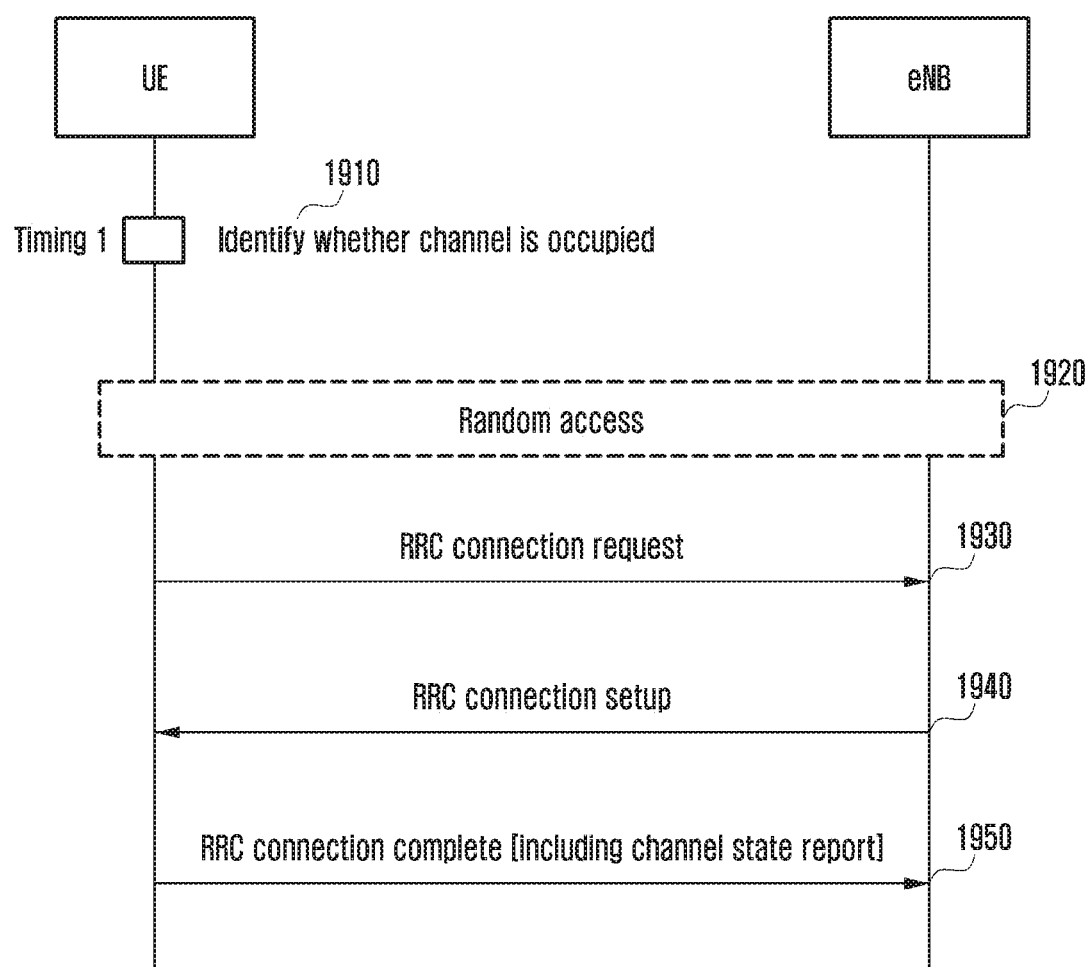
FIG. 19 shows a method for a UE to report a channel state using a configuration complete message in a process of setting up a radio resource connection between a base station and the UE if the UE reports a measurement result after the UE measures the channel state.

FIG. 19 shows a method for a UE to report a channel state using a configuration complete message in a process of setting up a radio resource connection between an eNB and the UE if the UE reports a measurement result after the UE measures the channel state.

As shown in FIGS. 3 to 15, after the UE measures a channel state, it may report a measurement result to the eNB. In order to report the measurement result, the UE shifts from the idle mode to a connected mode, and the UE has a resource allocated thereto.

Specifically, referring to FIG. 19, a UE identifies whether a channel has been occupied (1910). The UE in the idle state may start a random access operation for a connection with an eNB (1920). After the UE performs uplink sync with the eNB by performing the random access operation (1920), it may shift to an RRC-connected mode through an RRC connection setup process (1930 to 1950). For example, the UE transmits an RRC connection request message to the eNB (1930). In response thereto, the eNB transmits an RRC connection setup message to the UE (1940). Finally, the UE transmits an RRC connection complete message to the eNB (1950).

In the embodiment of FIG. 19, the UE may transmit channel (resource) measurement result reporting to the eNB through the RRC connection complete message in the RRC connection setup process (1930 to 1950) (1950).

Figure 20:
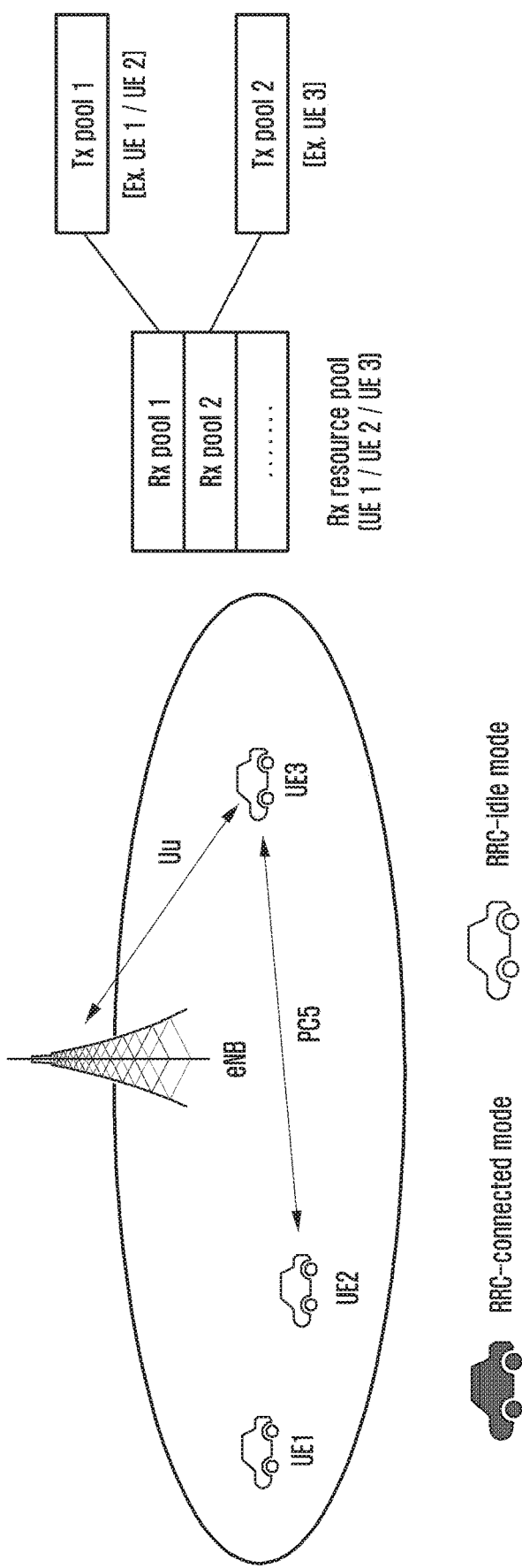
FIG. 20 shows an example of the use of a resource according to the status of each UE under the control of a base station.

FIG. 20 shows an example of the use of a resource according to the status of each UE under the control of an eNB.

The embodiment of FIG. 20 shows the status of resources being used in current V2X. For example, referring to FIG. 20, V2X UEs UE1 and UE2 in an RRC-idle state are present, and a V2X UE UE3 in an RRC-connected state is present. The UE2 may transmit data to the UE3 using a PC5 interface or may receive data from a UE.

For example, a Tx pool 1 allocated by an eNB may be a common resource used by the UE1 and the UE2 in the RRC-idle state, and a Tx pool 2 may be a resource used by the UE3 in the RRC-connected state. Furthermore, an RX resource pool may be a resource that may be received by the UE1, the UE2 and the UE3 in common. The V2X UEs may receive data in the RRC-connected state or the RRC-idle state using the RX resource pool.

Figure 21:
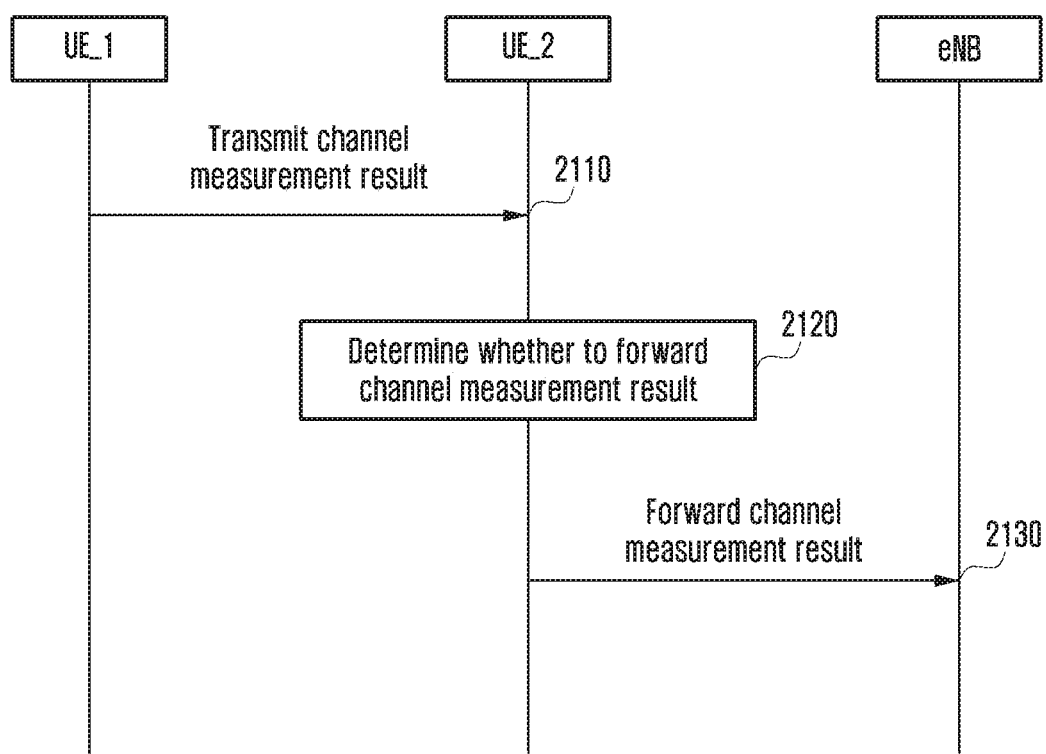
FIG. 21 shows a method for an idle UE to transmit channel measurement results to a surrounding connected UE and for the surrounding connected UE to directly forward a channel measurement report to a base station.

FIG. 21 shows a method for an idle UE to transmit channel measurement results to a surrounding connected UE and for the surrounding connected UE to directly forward a channel measurement report to an eNB.

In the embodiment of FIG. 21, a UE_1 is a V2X UE in an RRC-idle state, and a UE_2 is a V2X UE in an RRC-connected state.

As shown in FIGS. 3 to 15, after the UE_1 measures a channel (resource) state, it may report a measurement result. The UE_1 may transmit the measurement result to surrounding UEs using a channel for V2X (e.g., PC5 interface). UEs in the periphery of the UE_1 may receive the measurement result transmitted by the UE_1. The measurement result transmitted by the UE_1 may be included in an application signal, MAC sub-header or MAC CE and transmitted.

The UEs may identify whether the channel measurement result is included in the application signal, the MAC sub-header or the MAC CE.

When the channel measurement result is received from the UE_1 (2110), the UE_2 determines whether to forward the channel measurement result to an eNB (2120). If a channel measurement result forwarding condition is satisfied, the UE_2 may forward the channel measurement result, received from the UE_1, to the eNB (2130).

The channel measurement result forwarding condition may include at least one of a case where the UE_2 is a connected state, a case where a measured resource pool is owned by the UE_2, a case where the channel measurement result has been received from the UE_1 by a given number or more, a case where the UE_2 is a V-UE (vehicle UE), or a case where the UE_2 is a P-UE (pedestrian UE) capable of partial sensing.

If the forwarding of the channel measurement result is determined, the UE_2 may transmit the channel measurement result of the UE_1 to the eNB (2130). The UE_2 may transmit the channel measurement result of the UE_1 through an RRC message or MAC CE message, such as a measurement report message.

FIG. 22 shows an example of a MAC CE configuration between a UE_1 and a UE_2 for being used in the embodiment of FIG. 21.

Referring to FIG. 22, the MAC CE configuration, for example, a V2X channel state reporting MAC CE may include a resource ID and a channel busy ratio, and corresponding contents may be configured solely or in plurality. When a V2X channel state reporting MAC CE is received from another UE (UE_1), a corresponding UE (UE_2) may determine whether to forward a channel measurement result, received in the V2X channel state reporting MAC CE, to an eNB. A channel measurement result forwarding condition may include at least one of a case where the UE (UE_2) owns a resource pool, a case where a channel measurement result has been received from a different UE (UE_1) by a given number or more, a case where the UE (UE_2) is a V-UE, or a case where the UE (UE_2) is a P-UE capable of partial sensing.

Furthermore, a logical channel ID (LCID) for V2X channel state reporting may be configured in an MAC for a V2X channel state reporting MAC CE.

FIG. 23 shows an example of a MAC sub-header configuration for being used in the embodiment of FIG. 21.

In a V2X MAC sub-header of FIG. 23, V indicates a version, and R indicates a reserved bit. For example, if V of 4 bits and R of 1 bit are 11111, a corresponding message may be a V2X channel state reporting message that needs to be forwarded to an eNB. For example, if the version and the reserved bit are 11111, channel state reporting information may have been included in a MAC service data unit (SDU). Alternatively, the version and the reserved bit may indicate whether the MAC SDU includes a cooperative awareness message (CAM) or a decentralized environmental notification message (DENM) as channel state reporting. For example, a cause for channel state reporting use may be defined as a DENM message format. In this case, the DENM message may include channel state reporting in the cause, and may include a channel state result in a sub-cause. Alternatively, data may be configured with a MAC SDU, and a sub-header may indicate that a configured MAC SDU is a channel measurement result.

In another embodiment, if the reserved bit is 11110, a channel busy ratio, that is, a measured result of a channel (resource) by a UE, and a measured resource ID may have been included in a V2X MAC sub-header.

Figure 24:
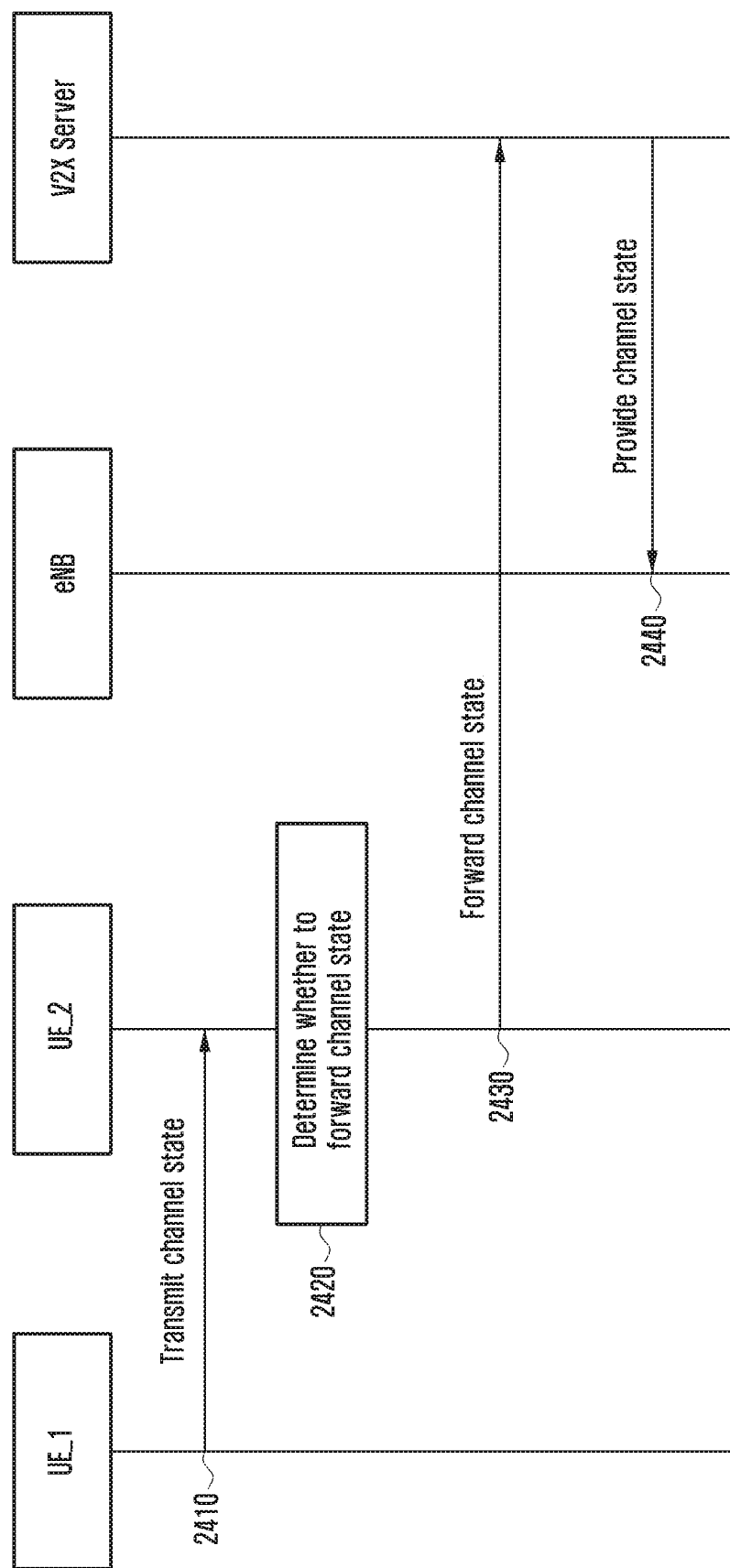
FIG. 24 shows a method for an idle UE to transmit channel measurement results to a surrounding connected UE and for the surrounding connected UE to forward a channel measurement report to a base station through a V2X server.

FIG. 24 shows a method for an idle UE to transmit a channel measurement result to a surrounding connected UE and for the surrounding connected UE to forward a channel measurement report to an eNB through a V2X server.

In the embodiment of FIG. 24, a UE_1 is a V2X UE of an RRC-idle state, and a UE_2 is a V2X UE of an RRC-connected state.

As shown in FIGS. 3 to 15, the UE_1 may report a measurement result of a channel (resource) state. The UE_1 may transmit the measurement result to surrounding UEs using a channel for V2X (e.g., PC5 interface) (2410). The UEs in the periphery of the UE_1 may receive the measurement result transmitted by the UE_1 (2410). The measurement result transmitted by the UE_1 may be transmitted as a V2X control message or a user data format.

As an embodiment of the user data format, the measurement result may be transmitted as a CAM or DENM used in an intelligent transportation system (ITS). A cause for channel state reporting use may be defined as a DENM message format. In this case, the DENM message may include channel state reporting in the cause, and may include the channel state result in a sub-cause. Alternatively, data may be configured with a MAC SDU, and a sub-header may indicate that the configured MAC SDU is the channel measurement result.

For example, if a MAC sub-header includes information indicating that a channel measurement result has been included in a MAC SDU, a surrounding UE (UE_2) that has received the channel measurement result from a UE (UE_1) in an idle state may be aware of whether a corresponding message should be forwarded to a V2X server based on the MAC sub-header.

A channel measurement result forwarding condition may include at least one of a case where the UE_2 is a connected state, a case where a measured resource pool is owned by the UE_2, a case where a channel measurement result has been received from the UE_1 by a given number or more, a case where the UE_2 is a V-UE, or a case where the UE_2 is a P-UE capable of partial sensing.

After the UE_2 determines to forward the channel measurement result to a V2X server (2420), the UE_2 may transmit an eNB ID to which the UE_2 is connected to the V2X server along with the channel measurement result (2430).

When the channel measurement result and eNB ID transmitted by the UE_2 are received (2430), the V2X server may transmit channel measurement result information to the eNB to which the UE_2 is connected based on the eNB ID (2440).

Embodiment 2

Figure 25:
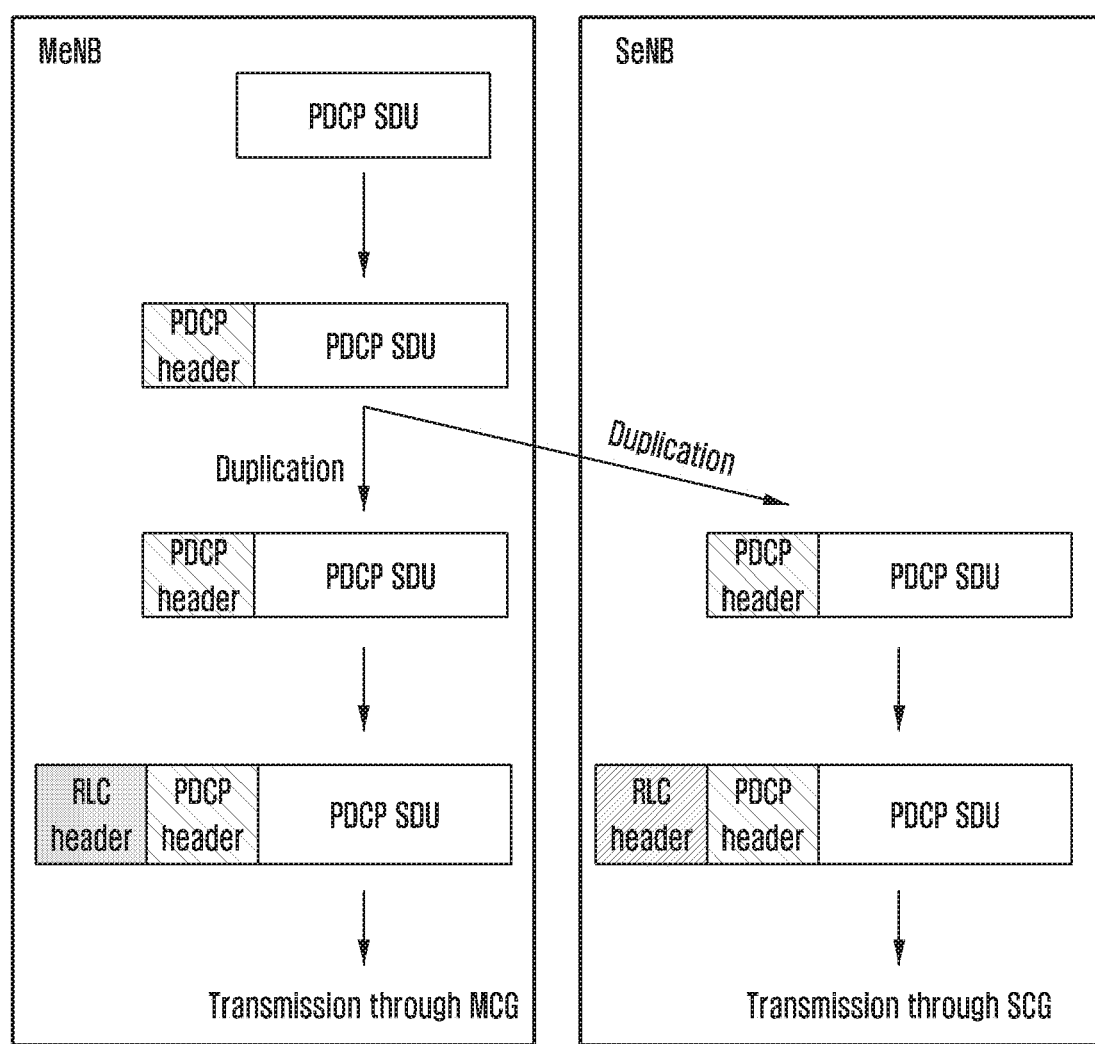
FIG. 25 shows a method for a transmission stage to perform duplication transmission.

FIG. 25 shows a method for a transmission stage to perform duplication transmission.

Referring to FIG. 25, a packet data convergence protocol (PDCP) protocol data unit (PDU) may be duplicated and transmitted based on long term evolution (LTE) dual connectivity. A transmitter may insert a PDCP header, arrived at the transmitter, into a PDCP service data unit (SDU) to be transmitted, and then may transmit a packet to a master cell group (MCG) and a secondary cell group (SCG) by duplicating the packet. Thereafter, in each radio link control (RLC) sub-layer, an RLC header is independently inserted, and a transmission procedure may be performed.

Figure 26:
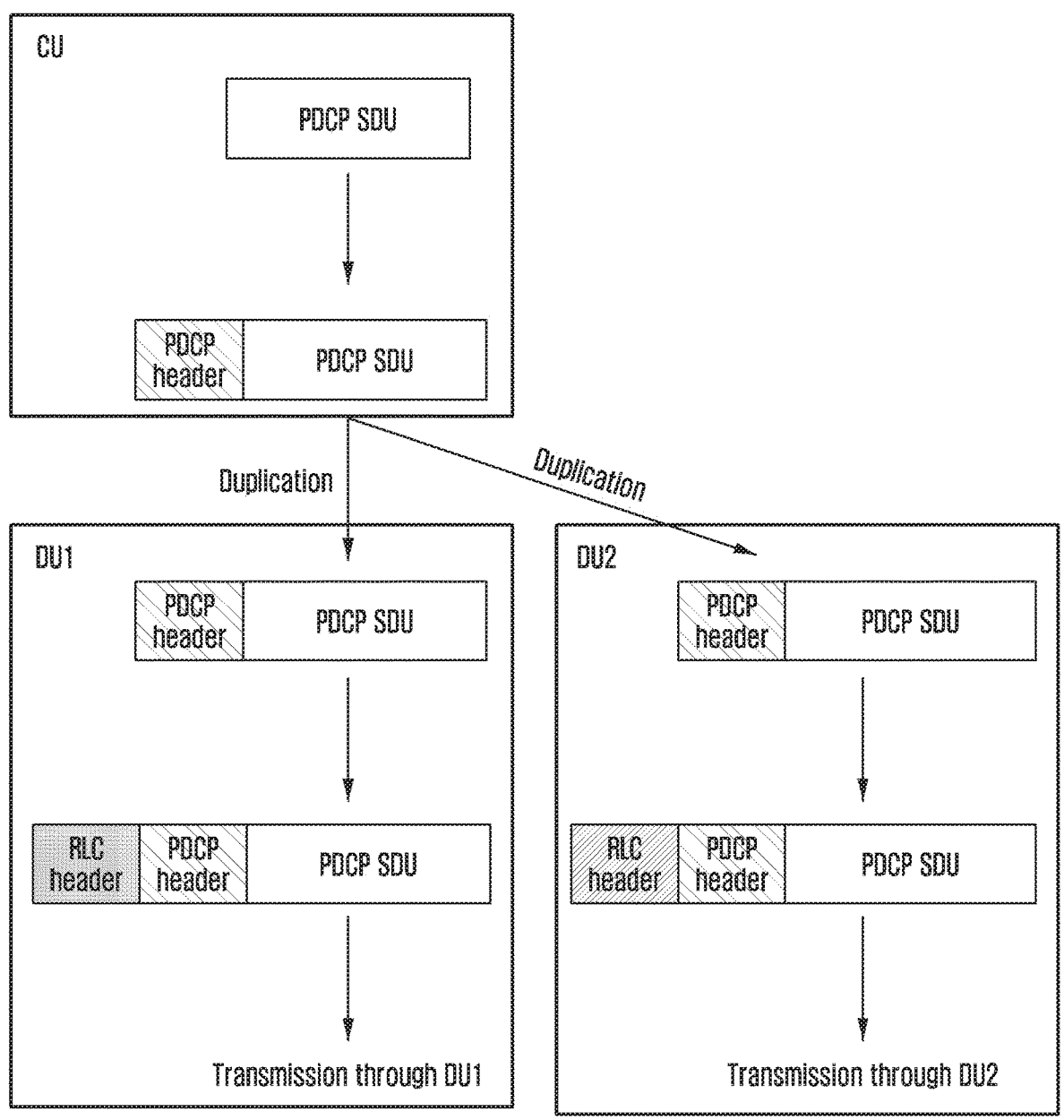
FIG. 26 shows a method for a transmission stage of a base station split structure to perform duplication transmission.

FIG. 26 shows a method for a transmission stage of an eNB split structure to perform duplication transmission.

Referring to FIG. 26, an eNB function has been divided into a central unit (CU) and a distributed unit (DU) and implemented. Specifically, a PDCP is implemented in the CU, and an RLC is implemented in the DU. A PDCP PDU may be duplicated and transmitted. A transmitter may insert a PDCP header, arrived at the transmitter, into a PDCP SDU to be transmitted, and then may transmit a packet through a plurality of DUs (DU1 and DU2) by duplicating the packet. Thereafter, in each radio link control (RLC) sub-layer, an RLC header is independently inserted, and a transmission procedure may be performed.

Figure 27:
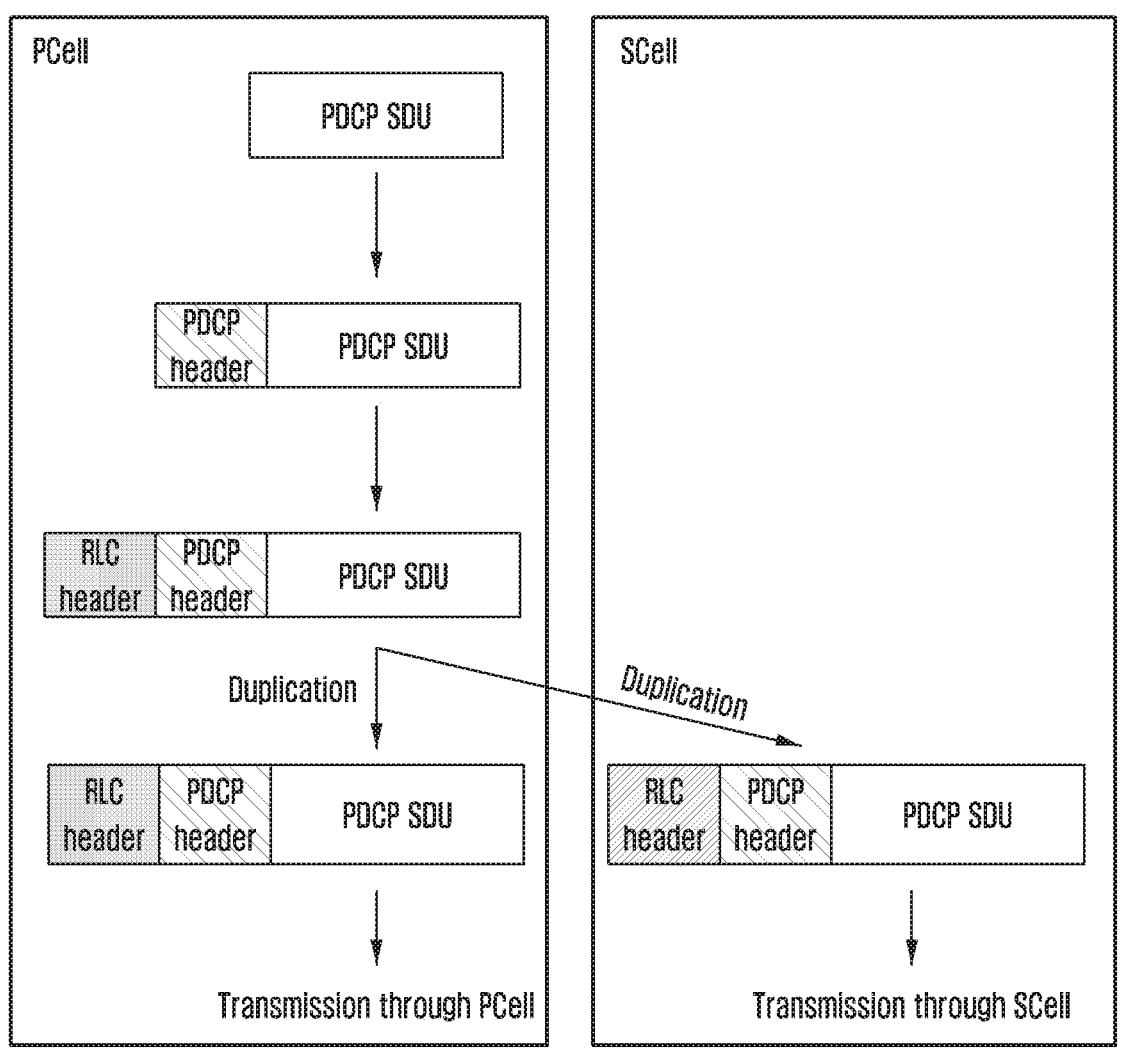
FIG. 27 shows a method for a transmission stage to perform lower layer duplication transmission.

FIG. 27 shows a method for a transmission stage to perform lower layer duplication transmission.

Referring to FIG. 27, an RLC PDU may be duplicated and transmitted based on an LTE carrier aggregation (CA). After a transmitter inserts a PDCP header, arrived at the transmitter, into a PDCP SDU to be transmitted and inserts some of or all RLC headers, the transmitter may transmit a packet to through each carrier (two or more of a PCell or an SCell) by duplicating the packet. In this case, some of or all the RLC headers of the transmitted packet are the same.

Figure 28:
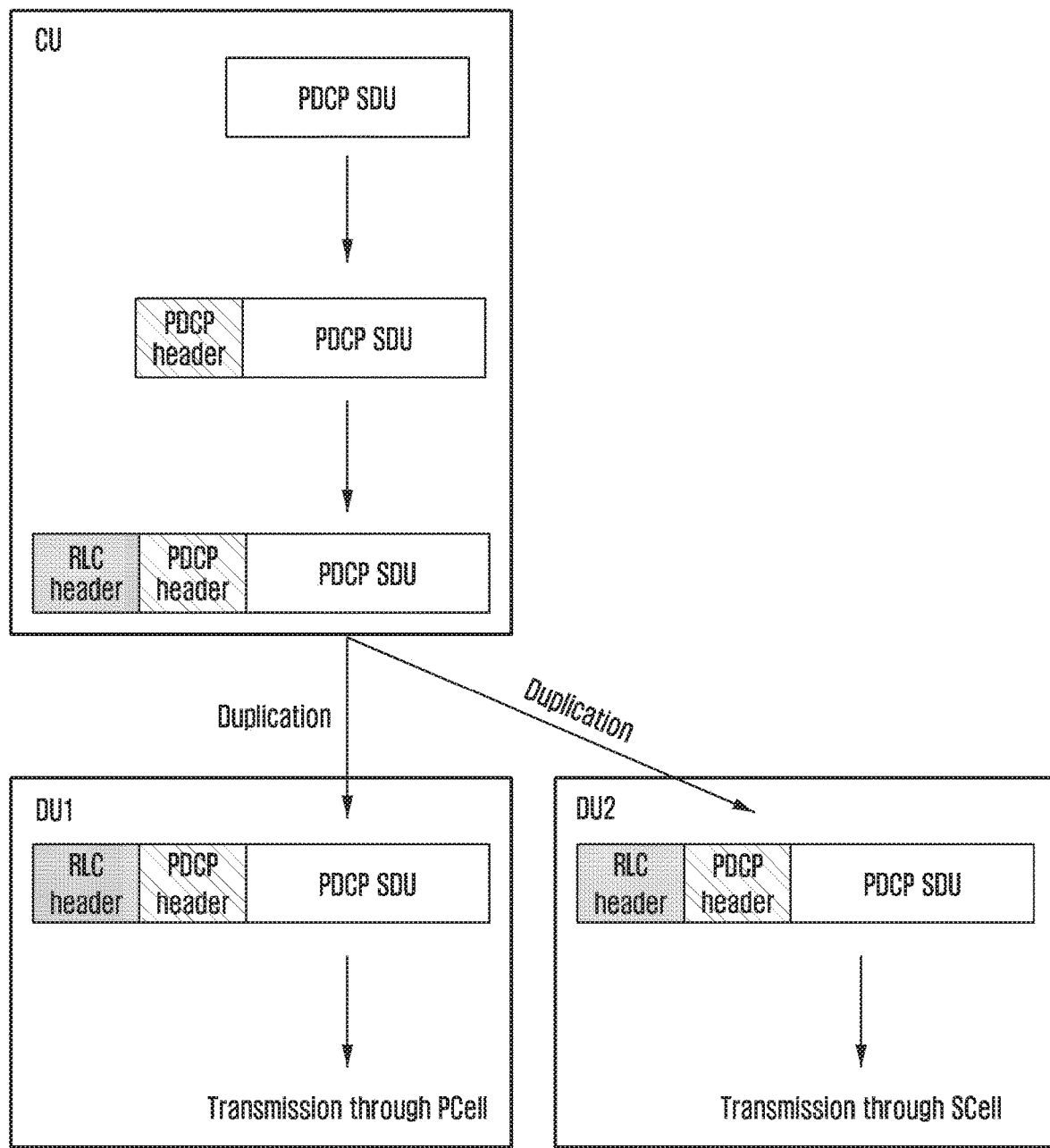
FIG. 28 shows a method for a transmission stage of a base station split structure to perform lower layer duplication transmission.

FIG. 28 shows a method for a transmission stage of an eNB split structure to perform lower layer duplication transmission.

Referring to FIG. 28, an eNB function has been divided into a CU and a DU and implemented. Specifically, a function for attaching a fixed header of a PDCP and RLC is implemented in the CU, and the remaining some function is implemented in the DU. An RLC PDU may be duplicated and transmitted. After a transmitter inserts a PDCP header, arrived at the transmitter, into a PDCP SDU to be transmitted and inserts some of or all RLC headers, the transmitter may transmit a packet through a plurality of DUs (DU1 and DU2) by duplicating the packet. Some of or all the RLC headers of the transmitted packet are the same.

Figure 29:
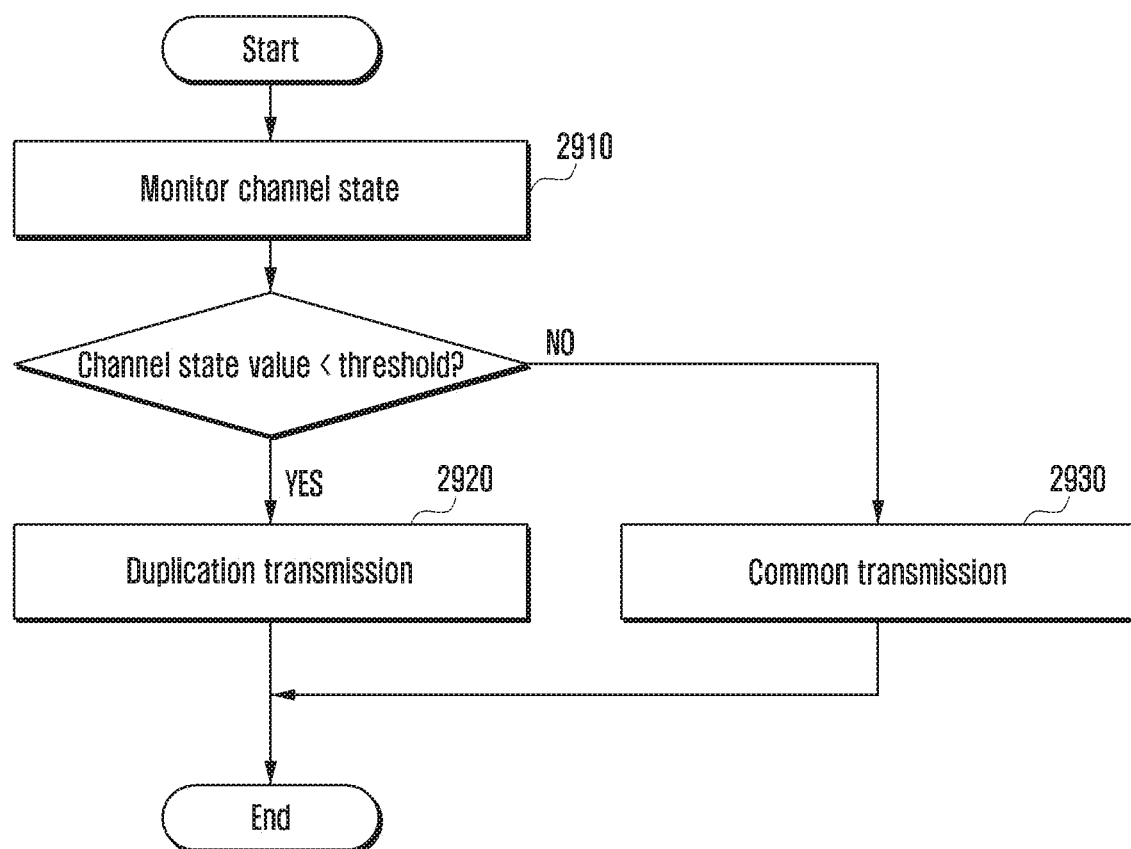
FIG. 29 shows a condition in which duplication transmission is performed.

FIG. 29 shows a condition in which duplication transmission is performed.

In general, if a channel state is excellent, a need to perform duplication transmission may be low. Accordingly, in the embodiment of FIG. 29, it is assumed that duplication transmission is performed when a channel state is smaller a given threshold. A transmitter performs duplication transmission only when a channel state value is smaller than a given threshold (2920) while monitoring a channel state (2910). If not, the transmitter does not perform duplication transmission (2930). The channel state value may be any one of a received power value, such as received signal strength indication (RSSI), reference signal received power (RSRP), or reference signal received quality (RSRQ) used in a communication network, or a channel state value, such as a channel quality indicator (CQI) or a rank indicator (RI). The threshold may be previously agreed or may be configured in a communication network (eNB, etc.).

If two or more links performing duplication transmission have different channel states, a representative value of the channel state may be set as a minimum value or maximum value of the channel state or a combination of the two values. Whether to perform duplication transmission may be determined based on the representative value.

Figure 30:
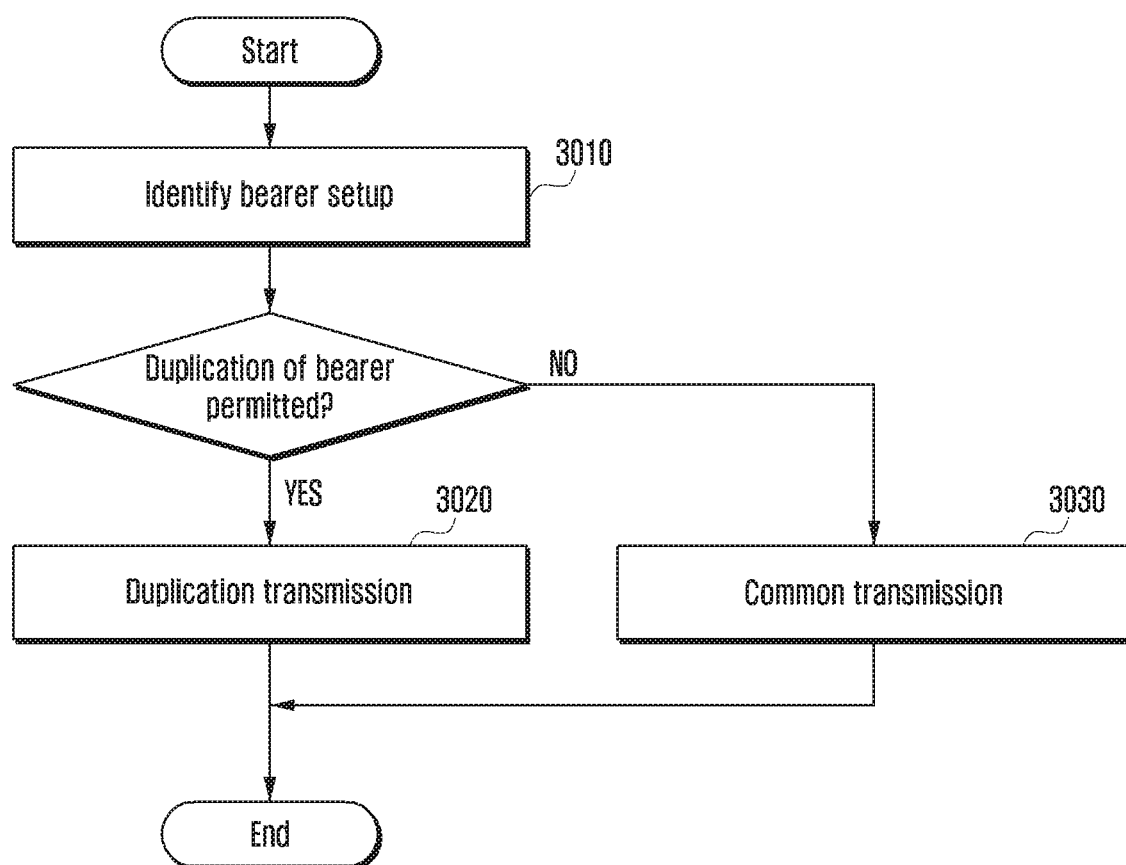
FIG. 30 shows a method of configuring duplication transmission in a bearer unit.

FIG. 30 shows a method of configuring duplication transmission in a bearer unit.

Referring to the embodiment of FIG. 30, a UE identifies whether duplication transmission is permitted for a corresponding bearer by identifying a bearer setup (3010). In this case, the bearer may be any one of various bearers, such as a data radio bearer (DRB), a signaling radio bearer (SRB), and an EPS bearer, based on LTE. The bearer setup may be identified based on the contents of a corresponding message when an RRC connection setup message, an RRC connection reestablishment message or an RRC connection reconfiguration message is transmitted. If duplication transmission is permitted for the corresponding bearer, the transmitter may transmit the corresponding bearer by duplicating the corresponding bearer (3020). If not, the transmitter cannot randomly perform duplication transmission, may select only one path, and may perform transmission (3030).

Furthermore, in some embodiments, duplication transmission may be performed only when a channel state value smaller than a threshold is satisfied with respect to only a bearer configured to activate duplication transmission based on a bearer setup as in the embodiment of FIG. 30, but to not always perform duplication transmission and to permit duplication transmission in combination with the embodiment of FIG. 29.

Figure 31:
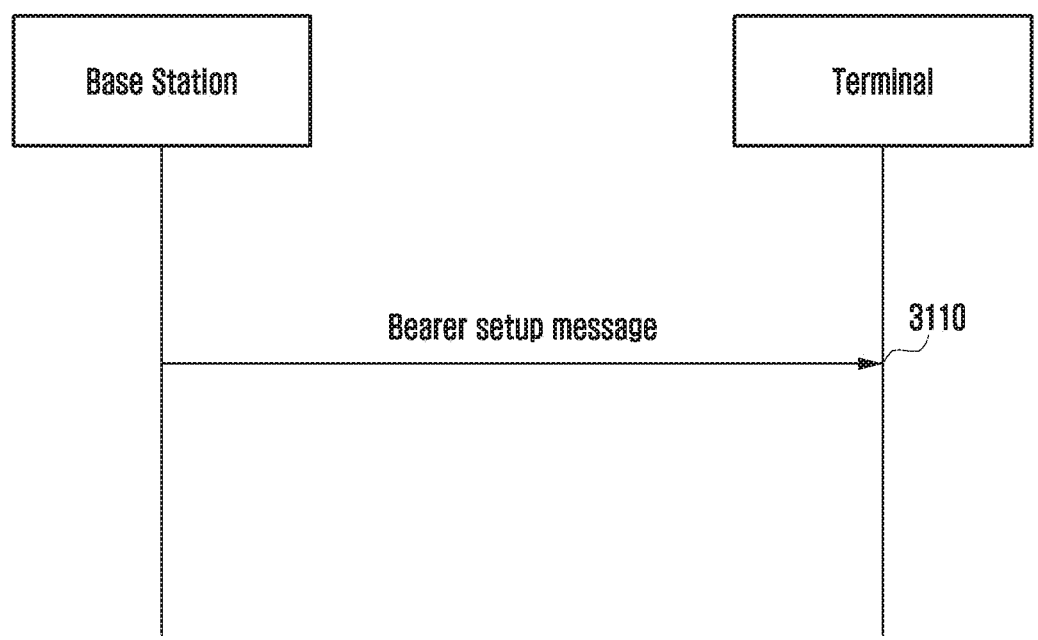
FIG. 31 shows a method of transmitting a message that configures a bearer.

FIG. 31 shows a method of transmitting a message that configures a bearer.

Referring to FIG. 31, a base station transmits a bearer setup message to a terminal (3110).

The bearer setup message may include at least one of information indicating whether duplication transmission is permitted for a corresponding bearer, information (e.g., PDCP or RLC) regarding that duplication transmission is permitted in which layer or sublayer, information on the threshold of a channel state in which duplication transmission is permitted, information on a duplication discard timer, information on channel state quantity for duplication transmission, information on a maximum PDU (or SDU) size of a bearer or information on a retransmission number when duplication transmission is performed.

The information indicating whether duplication transmission is permitted may indicate whether duplication transmission should be always performed, whether duplication transmission will be performed can be determined if necessary, or whether duplication transmission is prohibited. Furthermore, the information indicating whether duplication transmission is permitted may indicate whether duplication transmission is permitted upon automatic repeat request (ARQ) or hybrid ARQ (HARQ) initial transmission or whether duplication transmission is permitted upon ARQ or HARQ retransmission.

The information on the channel state quantity for duplication transmission may include an RSRP, RSRQ, RSSI or modulation and coding scheme (MCS) index. Furthermore, the information on the channel state quantity for duplication transmission may indicate which value of a minimum (min), a maximum (max) or the mean of several links will be used.

The information on the retransmission number when duplication transmission is performed may indicate each retransmission number or a total retransmission number.

The terminal and the base station may determine how duplication transmission will be performed based on the bearer setup message of FIG. 31. The bearer setup message may be transmitted through an RRC connection setup, RRC connection reestablishment or RRC connection reconfiguration message.

Figure 32:
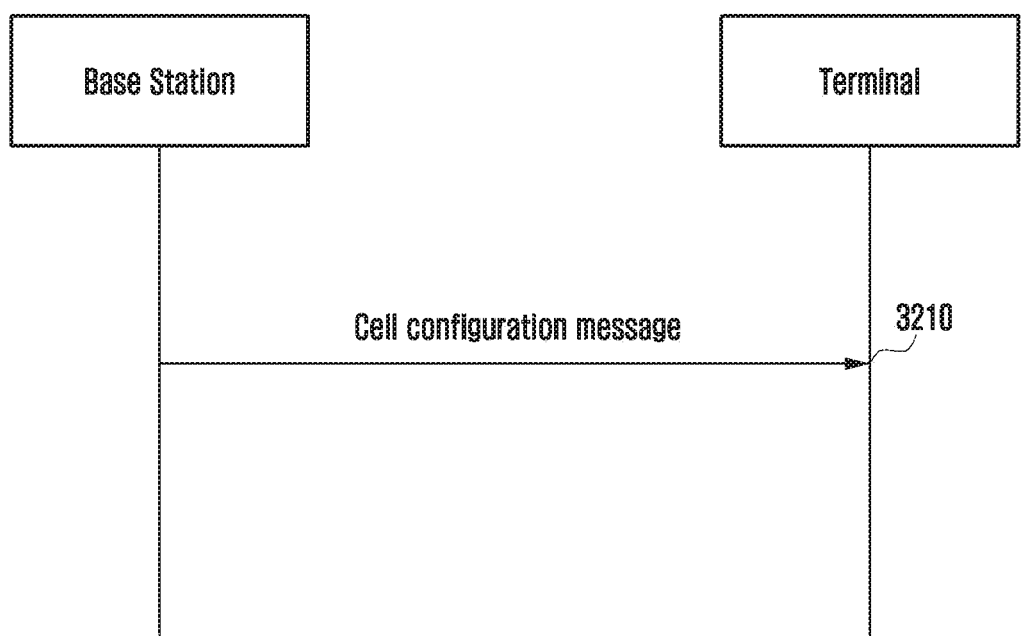
FIG. 32 shows a method of transmitting a message to configure a cell for duplication transmission.

FIG. 32 shows a method of transmitting a message to configure a cell for duplication transmission.

Referring to FIG. 32, a base station transmits a cell configuration message to a terminal (3210). In this case, the cell may be a cell concept of LTE, a PCell, an SCell, etc.

The cell configuration message may include at least one of information indicating whether duplication transmission is permitted, information on the threshold of a channel state in which duplication transmission is permitted, information on a duplication discard timer, information on channel state quantity for duplication transmission, information on a maximum PDU (or SDU) size of a cell or information on a retransmission number when duplication transmission is performed.

The information indicating whether duplication transmission is permitted may indicate whether duplication transmission should be always performed, whether duplication transmission will be performed can be determined if necessary, or whether duplication transmission is prohibited. Furthermore, the information indicating whether duplication transmission is permitted may indicate whether duplication transmission is permitted upon ARQ or HARQ initial transmission or whether duplication transmission is permitted upon ARQ or HARQ retransmission.

The information on the channel state quantity for duplication transmission may include an RSRP, RSRQ, RSSI or MCS index. Furthermore, the information on the channel state quantity for duplication transmission may indicate which value of a minimum, a maximum or the mean of several links will be used.

The information on the retransmission number when duplication transmission is performed may indicate each retransmission number or a total retransmission number.

The terminal and the base station may determine how duplication transmission will be performed based on the cell configuration message of FIG. 31. The cell configuration message may be transmitted through an RRC connection setup, RRC connection reestablishment or RRC connection reconfiguration message.

Figure 33:
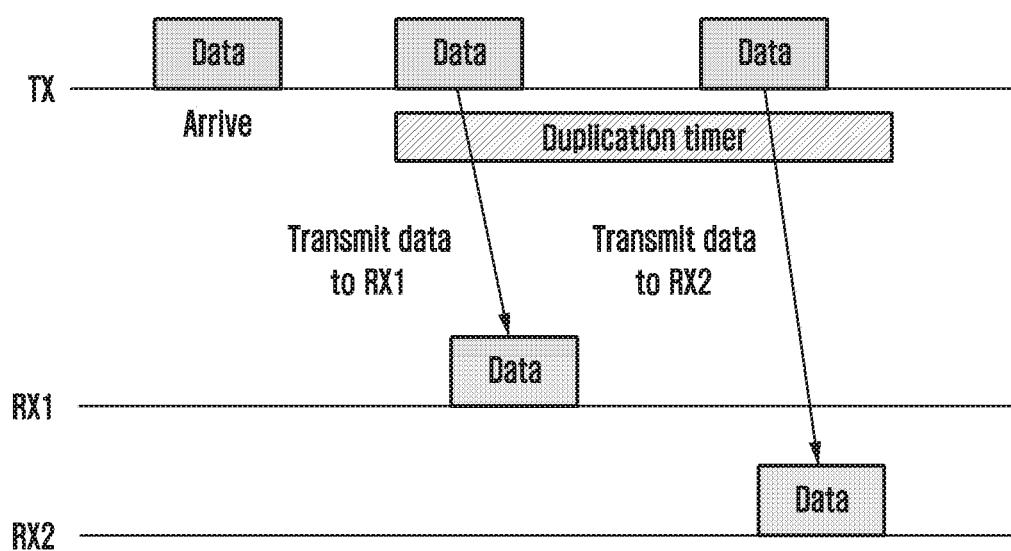
FIG. 33 shows an embodiment of duplication transmission using a duplication timer.
Figure 34:
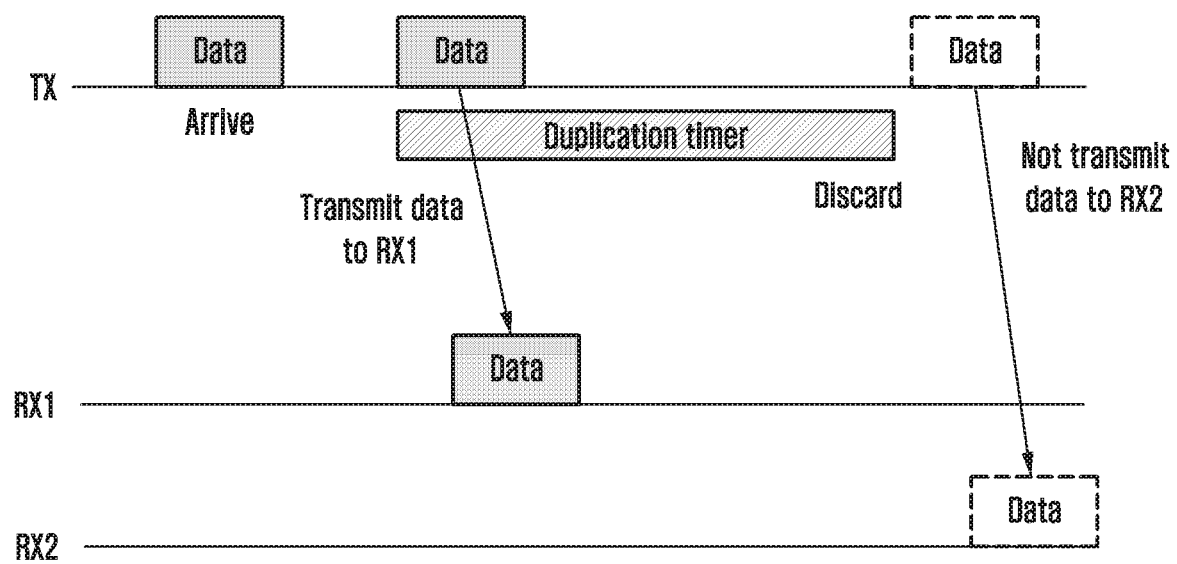
FIG. 34 shows an embodiment of duplication transmission using a duplication timer.

FIG. 33 shows an embodiment of duplication transmission using a duplication timer. FIG. 34 shows an embodiment of duplication transmission using a duplication timer.

When duplication transmission is performed, the time taken to transmit data may be different due to a difference between times when physical resources (e.g., physical resource blocks (PRBs)) are allocated. When such a time difference occurs, if the transmission of the corresponding data is not performed through another path until a duplication timer expires after the timer operates at transmission timing of first transmitted data, the data transmission may be configured to be not performed. If the transmission of the data does not satisfy a latency requirement after the duplication timer expires, unnecessary transmission may be prevented. In the example of FIG. 33, after data is transmitted to RX1, data is transmitted to RX2 before a duplication timer expires. In contrast, in the example of FIG. 34, data is not transmitted to RX2 because a duplication timer has expired before data is transmitted to the RX2.

In the case of retransmission, retransmission is performed before a duplication timer expires, but retransmission may not be performed after the duplication timer expires.

Figure 35:
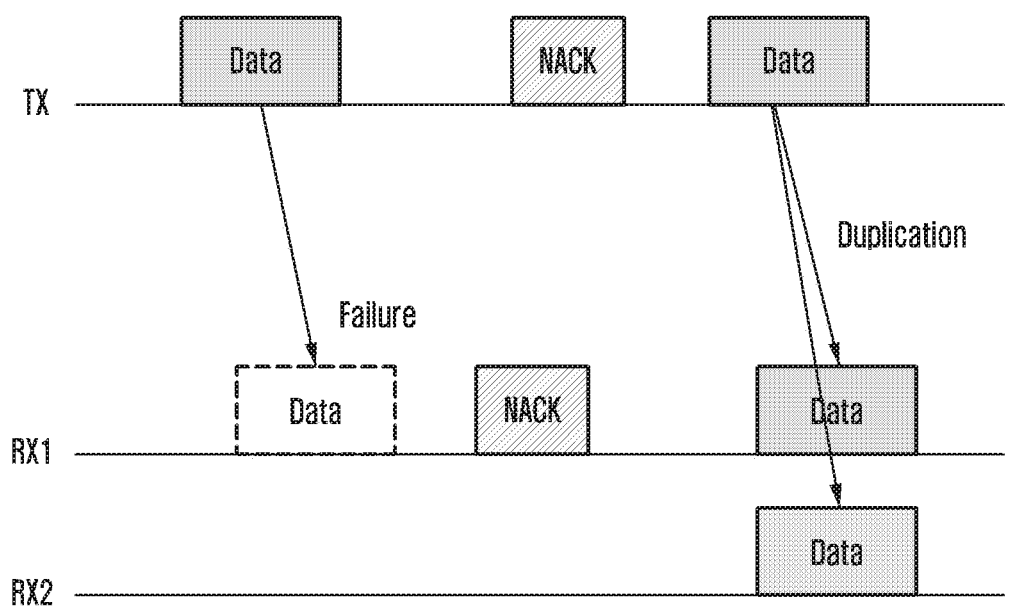
FIG. 35 shows an example in which duplication transmission is performed in retransmission.

FIG. 35 shows an example in which duplication transmission is performed in retransmission.

Retransmission in an ARQ or HARQ is performed based on the reception of negative acknowledge (NACK) (including that NACK is considered to have been received although ACK is not received for a given time). As shown in FIG. 35, if NACK is received with respect to initially transmitted data, duplication transmission may be performed on the corresponding data upon retransmission.

Figure 36:
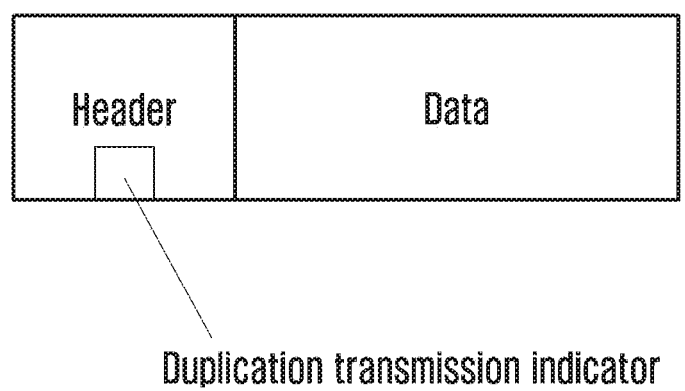
FIG. 36 shows a method for a transmitter to transmit data, including information indicating whether duplication transmission is to be performed, when the transmitter transmits the data.

FIG. 36 shows a method for a transmitter to transmit data, including information indicating whether duplication transmission is to be performed, when the transmitter transmits the data.

If a transmitter performs duplication transmission in a given situation, it may be difficult for a receiver to be aware of whether the duplication transmission is currently performed. In such a case, the transmitter may transmit a header including data, including an indicator or index indicating that duplication transmission is performed. The indicator may be an indicator of 1 bit that distinguishes between a packet indicating that duplication transmission is performed and a packet indicating that duplication transmission is not performed, and may be information indicating how many duplication transmissions are performed or which place is duplication transmission.

Figure 37:
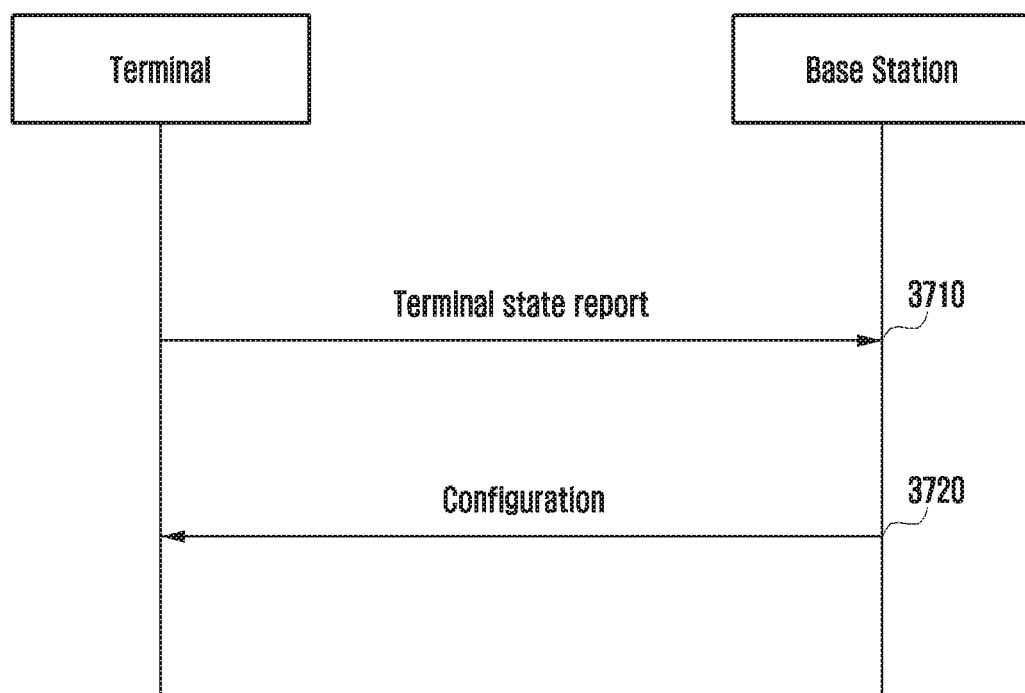
FIG. 37 shows that a terminal transmits information on the state of the terminal to a base station and the base station configures a communication method based on the information.

FIG. 37 shows that a terminal transmits information on the state of the terminal to a base station and the base station configures a communication method based on the information.

The size of data that may be transmitted and received by a terminal to a maximum extent may be limited due to an implementation method. A base station may set up a link connection taking into consideration the state of the terminal (3720) only when the terminal transmits information on the state (e.g., capability) of the terminal to the base station (3710). A message for the state report of the terminal may be an RRC message. The message may include the buffer capacity of the terminal or information (e.g., indicator) on a maximum size of data that may be processed by the terminal. The base station may set up a connection with the terminal based on such a message (3720), and may configure a maximum PDU (or SDU) size of the bearer setup message of FIG. 31 or the cell configuration message of FIG. 32. Furthermore, the base station may generate a downlink data packet by limiting a maximum PDU (or SDU) size based on the state of the terminal, and may transmit the downlink data packet to the terminal.

In new radio (NR), in order to improve reliability of data transmission, a technology for duplicating and transmitting a packet is discussed. Accordingly, each entity of the access stratum (AS) duplicates a packet and transmits duplicated packets using the same radio interface or different radio interfaces. The side that receives the duplicated packets identifies that the received packets have been duplicated according to a duplicated method, removes the remaining duplicated packets except only one packet of the duplicated packets, and transmits the one packet to a higher layer.

Figure 38:
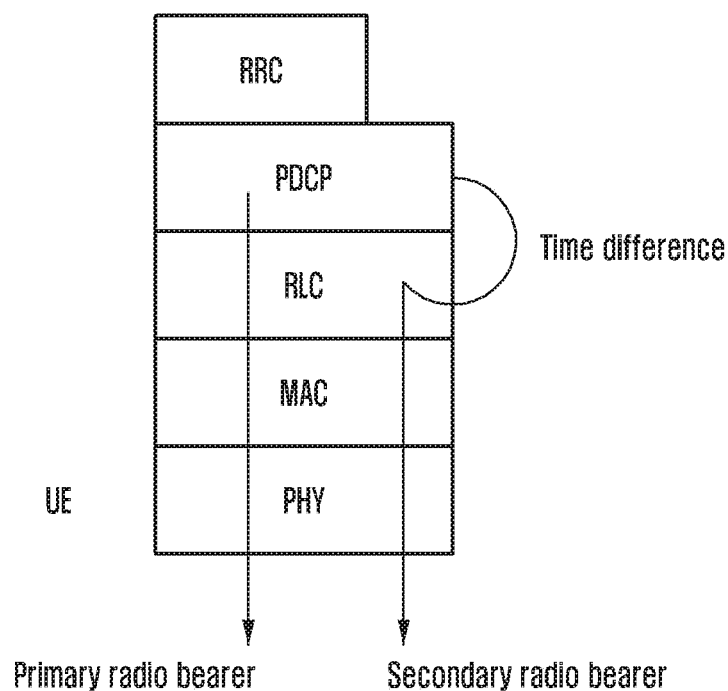
FIG. 38 shows a method for a transmission stage to perform duplication transmission when a radio bearer in which the original packet is forwarded and a radio bearer in which a duplicated packet is forwarded use the same radio interface.

FIG. 38 shows a method for a transmission stage to perform duplication transmission when a radio bearer in which the original packet is forwarded and a radio bearer in which a duplicated packet is forwarded use the same radio interface.

A radio bearer in which the original packet is forwarded may be called a primary radio bearer, and a radio bearer in which a duplicated packet is forwarded may be called a secondary radio bearer. The primary radio bearer and the secondary radio bearer may be called a primary RLC bearer and a secondary RLC bearer. Furthermore, packet transmission may be performed regardless of whether duplication transmission is performed with respect to the primary radio bearer.

Referring to the embodiment of FIG. 38, duplication is performed in a PDCP. The original packet and a duplicated packet may be transmitted to an eNB through the same radio interface. Furthermore, given time delay may be applied between a packet forwarded as the primary radio bearer and a packet forwarded as the secondary radio bearer may be reduced with respect to a UE. eNBs that receive the duplicated packets are the same, and the duplicated packets may pass through the same L1/L2 stack.

Figure 39:
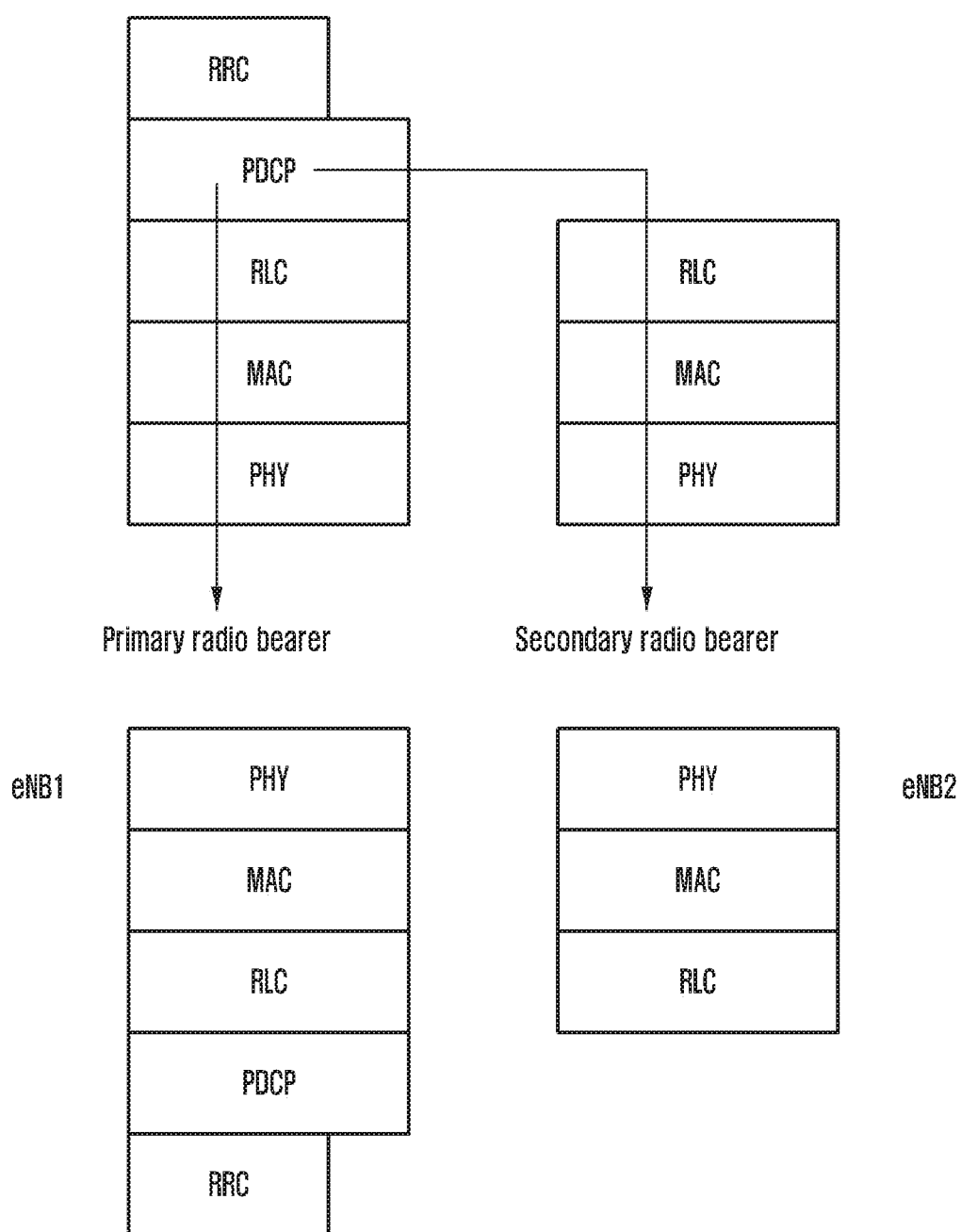
FIG. 39 shows a method for a transmission stage to perform duplication transmission when a radio bearer in which the original packet is forwarded and a radio bearer in which a duplicated packet is forwarded use different radio interfaces.
Figure 40:
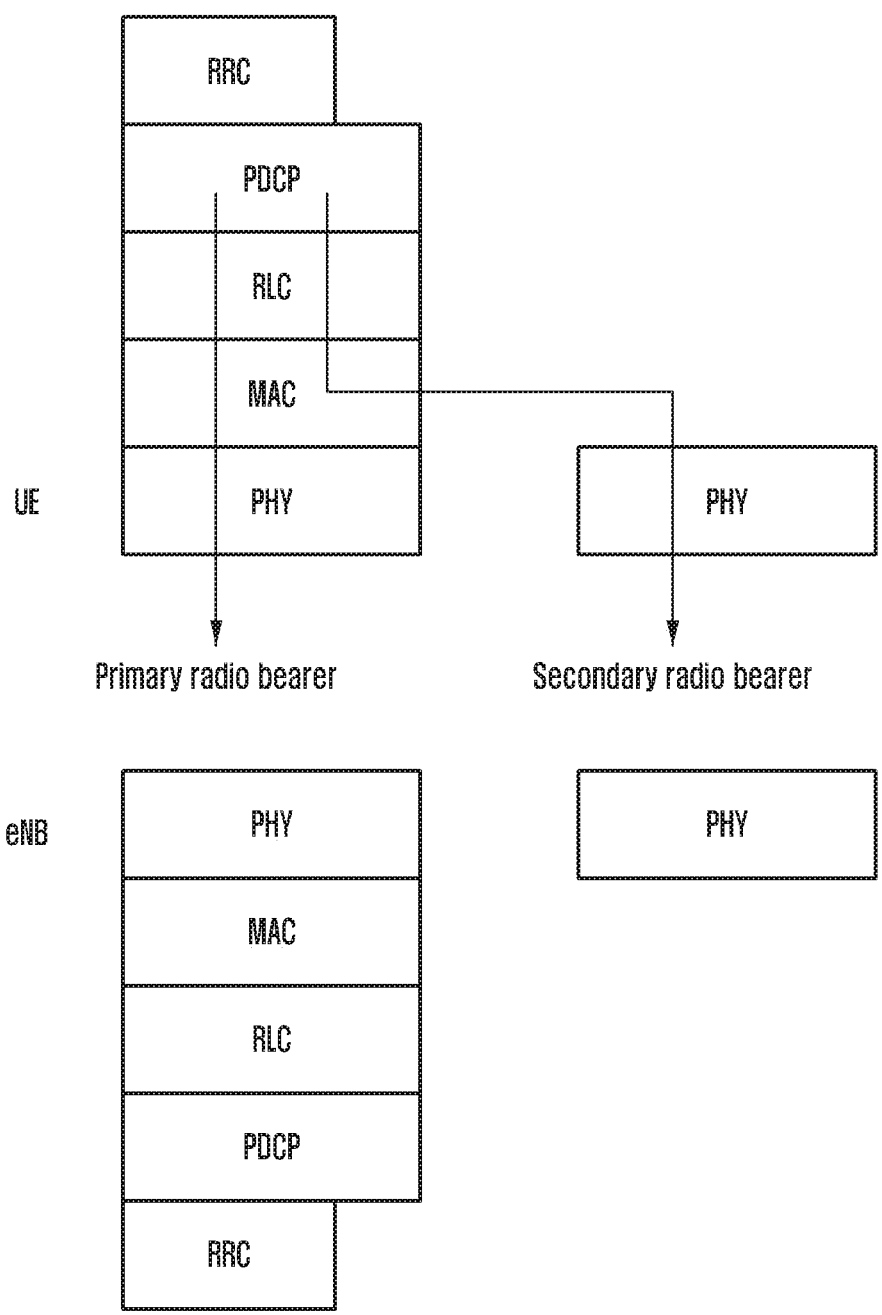
FIG. 40 shows a method for a transmission stage to perform duplication transmission when a radio bearer in which the original packet is forwarded and a radio bearer in which a duplicated packet is forwarded use different radio interfaces.

FIG. 39 shows a method for a transmission stage to perform duplication transmission when a radio bearer in which the original packet is forwarded and a radio bearer in which a duplicated packet is forwarded use different radio interfaces. FIG. 40 shows a method for a transmission stage to perform duplication transmission when a radio bearer in which the original packet is forwarded and a radio bearer in which a duplicated packet is forwarded use different radio interfaces.

Referring to the embodiments of FIGS. 39 and 40, a primary radio bearer and a secondary radio bearer may use different radio interfaces. Specifically, FIG. 39 shows a DC style having different L1/L2 stacks except a PDCP, and FIG. 40 shows a CA style in which an L2 stack is shared except PHY. In a DC style, such as FIG. 39, the original and duplicated packets may be transmitted for each cell group. In a CA style, such as FIG. 40, the original packet and a duplicated packet may be transmitted for each component carrier (CC).

In the case of FIG. 40, a primary radio bearer and a secondary radio bearer may be transmitted in different CCs. L2 packets transmitted in each CC are the same, but the redundancy version of an HARQ may be different for each CC. If the redundancy version of the HARQ is different, a reception stage needs to aggregate received transport blocks (TBs) through an HARQ algorithm.

When an eNB transmits a duplication transmission activation signal or deactivation signal to a UE, the UE may perform duplication transmission or stop duplication transmission by taking the corresponding signal into consideration. The duplication transmission activation signal and deactivation signal may be transmitted using an MAC CE, an RLC control PDU, a PDCP control PDU, an RRC connection reconfiguration message or DCI of a DL control channel.

The eNB may transmit the duplication transmission activation signal or deactivation signal according to the following conditions.

First, this is a case where duplication transmission is necessary to satisfy ultra-reliable and low latency communications (URLLC) requirements. An eNB transmits a duplication transmission activation signal when a service characteristic of a given UE is URLLC, and transmits a duplication transmission deactivation signal when URLLC service is ended.

Second, if the size of a packet is large, quality of a signal is not good, there is a margin in another radio interface, that is, CC resource, or there is a margin in a cell group resource, an eNB may transmit a duplication activation signal.

Figure 41:
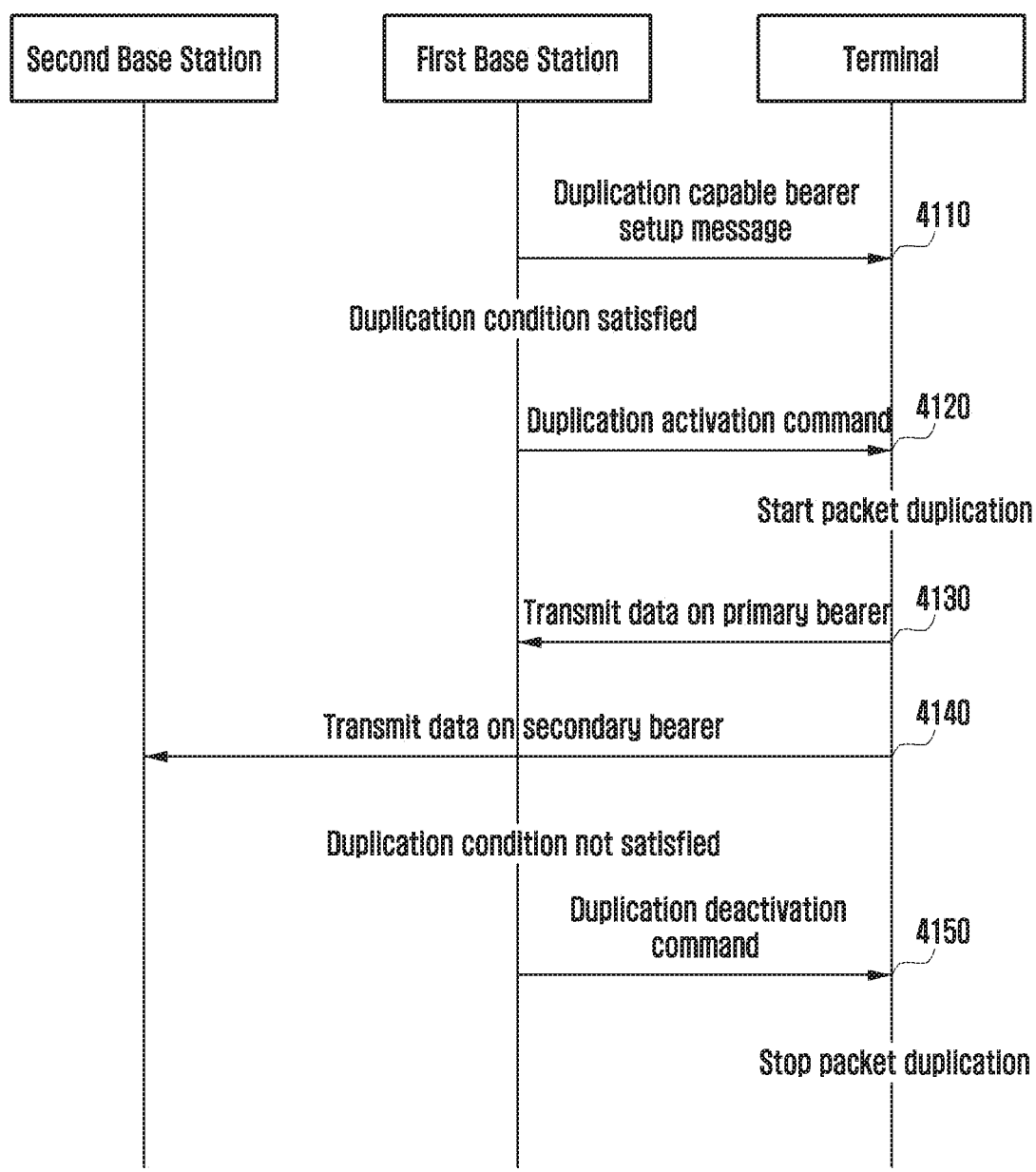
FIG. 41 shows a method in which duplication transmission is configured and performed.
Figure 42:
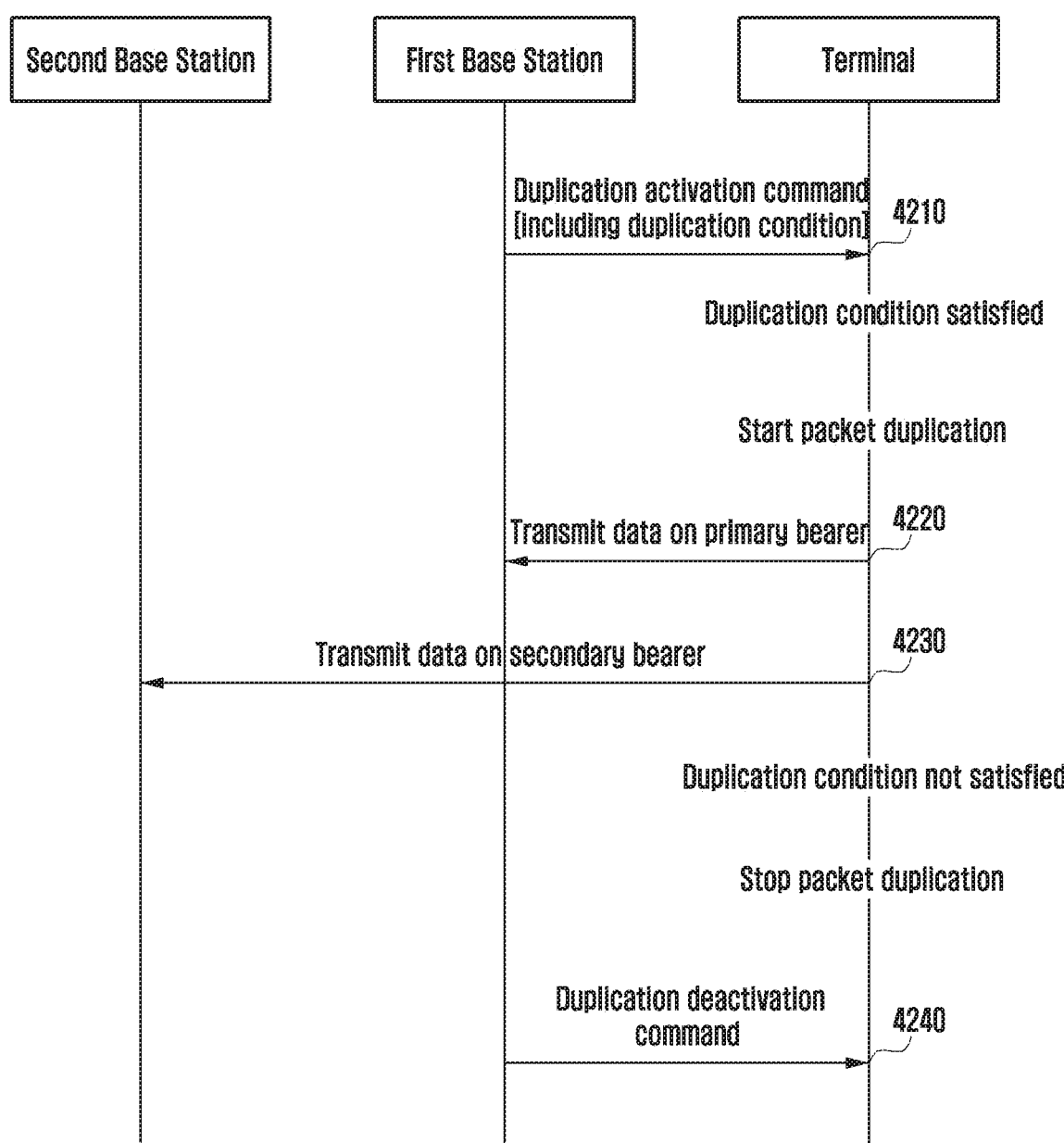
FIG. 42 shows a method in which duplication transmission is configured and performed.

FIG. 41 shows a method in which duplication transmission is configured and performed. FIG. 42 shows a method in which duplication transmission is configured and performed.

FIG. 41 shows a case where a base station controls duplication timing using an activation command Referring to FIG. 41, a first base station transmits a duplication capable bearer setup message to a terminal (4110). If it is identified that a duplication condition is satisfied, the first base station transmits a duplication activation command message to the terminal (4120). When the duplication activation command message is received, the terminal may start duplication transmission. The terminal transmits data to the first base station on a primary bearer (4130), and transmits the data to a second base station on a secondary bearer (4140). If the duplication condition is not satisfied during the duplication transmission is performed, the first base station transmits a duplication deactivation command message to the terminal (4150). When the duplication deactivation command message is received, the terminal stops the execution of the duplication transmission. What a terminal performs packet duplication transmission may mean that a packet is transmitted from the PDCP layer of the terminal to two or more RLC or MAC layers. What a terminal stops the execution of duplication transmission may mean that a packet is transmitted from the PDCP layer of the terminal to one RLC or MAC layer. The one RLC or MAC layer may be the RLC or MAC layer of a primary bearer.

FIG. 42 shows a case where a base station transmits an activation command, including information on a duplication condition or duplication, to a terminal and the terminal performs or stops duplication transmission based on the information on the duplication condition or duplication. Referring to FIG. 42, a first base station transmits a duplication activation command message, including information on a duplication condition or duplication, to a terminal (4210). When a duplication condition is satisfied, the terminal may start duplication transmission. The terminal transmits data to the first base station on a primary bearer (4220), and transmits the data to a second base station on a secondary bearer (4230). If the duplication condition is not satisfied while the duplication transmission is performed, the terminal stops the execution of the packet transmission. The first base station transmits a duplication deactivation command message to the terminal (4240). What the terminal performs the packet duplication transmission may mean that a packet is transmitted from the PDCP layer of the terminal to two or more RLC or MAC layers. What the terminal stops the execution of the duplication transmission may mean that a packet is transmitted from the PDCP layer of the terminal to one RLC or MAC layer. The one RLC or MAC layer may be the RLC or MAC layer of a primary bearer.

Information on the duplication condition identified by the base station in the embodiment of FIG. 41 or the duplication condition or duplication transmitted from the base station to the terminal in the embodiment of FIG. 42 may include the following things. The duplication condition may include contents regarding a duplication transmission execution time indicating whether duplication transmission will now be started or whether duplication transmission will be started after a given time. The duplication condition may include contents regarding a resource indicating where is a resource for duplication transmission located (time and frequency-based location). The duplication condition may include a target on which duplication will be performed, indicating that duplication transmission will be performed on which bearer or logical channel. The duplication condition may include information that limits an available resource, indicating which CC will be used. For example, the information that limits an available resource may indicate a given carrier of CCs now included as a carrier indicator field (CIF), such as a CA, or may include a PCell or an SCell ID. The information that limits an available resource may include information indicating which SCG will be used, for example, an ID corresponding to an SCG. The duplication condition may include information on a layer in which duplication is performed. For example, the duplication condition may include information, providing notification of high level duplication using an SCG, low level duplication using a CC, duplication performed in the MAC, or duplication performed in the PHY. Furthermore, the PHY may transmit an HARQ by retransmitting a duplication packet without the feedback of an NACK packet. The duplication condition may include the threshold of a packet size so that duplication transmission is performed only when the packet size is the threshold or more. The duplication condition may include the threshold of a channel state so that duplication transmission is performed only when the channel state with a serving cell is threshold or less.

A base station may perform a reception operation suitable for capability or support optimal resource scheduling only when it is aware of the capability regarding duplication transmission of a terminal. A UECapabilityInformation message including information on the duplication transmission capability of a terminal may include at least one of information on the size of a packet to be duplicated, information on the uplink bandwidth or simultaneous reception bandwidth of a terminal capable of simultaneous transmission when a different radio interface is used, a value of transmission power that may be radiated to each radio interface upon simultaneous transmission, or service information that may be accommodated by a corresponding terminal. For example, a terminal that requires URLLC service may transmit, to a base station, service information that may be accommodated by the corresponding terminal. The base station may determine whether packet duplication is necessary or not based on the information.

When a terminal sets up a bearer with a base station, it may separate set up a primary radio bearer and a secondary radio bearer. Alternatively, a terminal may set up a radio link that will be primarily transmitted and a radio link that will be secondarily transmitted on one radio bearer. In the disclosure, the terms of a primary radio bearer and a secondary radio bearer are used, for convenience of description.

After a duplication deactivation command is received, a terminal continues to transmit data on a primary radio bearer, identifies a buffer for a secondary radio bearer with respect to the secondary radio bearer, and may immediately discard duplicated packets within the buffer if a small amount of data is present in the buffer, or may transmit a packet now being transmitted and discard the remaining packet if a large amount of data is present in the buffer. Alternatively, the UE may transmit an already duplicated packet with respect to both the primary bearer and the secondary bearer, and may transmit the original packet through a single radio interface without duplicating the packet after timing in which a deactivation command is received.

In the embodiment of FIGS. 41 and 42, whether duplication transmission is possible may be configured when a bearer is set up. After a bearer is set up, the terminal may immediately perform duplication, and may perform duplication after it receives a duplication activation command. However, after the duplication activation command is received, duplication is performed on a corresponding bearer or logical channel. If a preparation time is necessary to perform the duplication transmission, duplication may be performed after a given time. When a duplication deactivation command is received, the terminal does not perform duplication.

In the embodiment of FIGS. 41 and 42, the duplication activation command and the duplication condition may be combined and applied. Furthermore, the duplication condition may be included and configured in a bearer setup or duplication activation command.

Embodiment 3

The disclosure proposes a handover method capable of reducing a handover (HO) failure and ping-pong in a system that requires high reliability. An embodiment of the disclosure may be used as a handover method for solving link instability in a high frequency system. The disclosure may provide an event and timing in which a UE determines to perform handover when it satisfies a network handover and handover condition attached to a target cell and a UE determines which type of handover will be performed when UE handover attached to a target cell coexist based on a handover command from a network.

For example, the disclosure may provide a method of first generating an event of a handover type that is necessary depending on the situation of a UE by introducing a new measurement configuration factor (e.g., slope) unlike in the existing handover method of staring handover based on only a current value of a received signal. According to the method proposed in the disclosure, unnecessary measurement reporting that may occur due to the execution of unnecessary handover and handover signaling overhead attributable to the unnecessary measurement reporting can be prevented.

There is a good possibility that network handover uses an event A3 based on a relative value and UE handover uses an event A5 based on an absolute value. The event A3 and the event A5 are the same as a handover event used in the LTE system. When sudden signal quality degradation with the serving cell of a UE occurs in a high frequency system, the events A3 and A5 occur almost at the same time. Accordingly, there is a good possibility that the event A3 using a relative value may occur earlier than the event A5 based on a minimum value. Accordingly, if signal intensity drops to minimum quality or less due to the sudden occurrence of signal degradation, the UE handover using the event A5 may occur, but the network handover using the event A3 may be first triggered. In this case, there are problems in that a measurement report for performing the network handover and handover-related signaling of a serving eNB and a target eNB may be unnecessarily performed.

Figure 43:
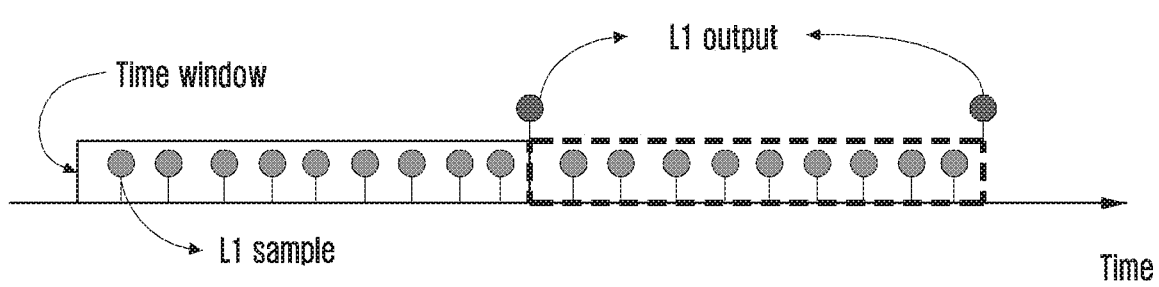
FIG. 43 shows a correlation between a layer 1 (L1) sample, an L1 output, and a time window.

FIG. 43 shows a correlation between a layer 1 (L1) sample, an L1 output, and a time window.

A time window of FIG. 43 is temporally disjoint. Each L1 sample may be a value for each beam or may be the mean or linear sum of values of given beams. The values may be measured based on a reference signal for each beam or may be measured based on a UE-specific reference signal. A UE may derive one value by averaging or linearly summing L1 sample values during a time window. The derived value may be defined as an L1 output. In this case, the time windows may be temporally jointed or may not be temporally disjoint. In the case of a disjoint time window, an L1 output occurs in a time window period. In the case of L3 filtering, a UE may derive one L3 output by weight-summing two continuous L1 outputs, and may take into consideration the L3 output in the determination of a handover event.

Figure 44:
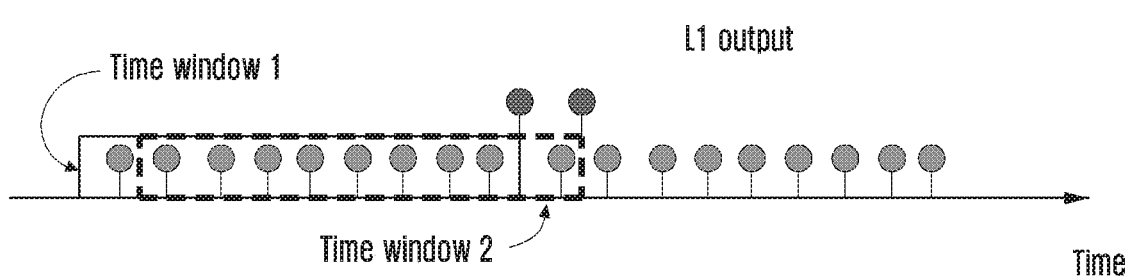
FIG. 44 shows a sliding time window for layer 1 filtering.

FIG. 44 shows a sliding time window for layer 1 filtering.

The time window of FIG. 44 is configured in a partially jointed sliding window form. In this case, an L1 output occurs in the same period as an L1 sample. The L1 output may occur in a given period. An L3 filtered value is generated every L1 output by L3 filtering. A measured value may be an L1 output or an L3 filtered value according to a radio resource management (RRM) method.

In an embodiment of the disclosure, a method for a serving eNB to set a slope value to be applied in performing handover is as follows.

A serving eNB may configure an event for type 1 handover, a slope value, and two time-to-trigger (TTI) values. The type 1 handover may include one of network handover or UE handover. The slope value may be used as a condition in which a UE determines TTT values to be used. Each of the two TTT values may be applied when a difference between two measured values (may be an L1 output value or L3 output value according to the RRM method) that are measured by a UE and that are temporally contiguous is greater than a slope value or smaller than a slope value. A parameter set configured in a UE by a serving eNB may be {a, TTT1, TTT2}. In this case, "a" is a slope value and may be a dBm/ms unit or a W/ms or mW/ms unit. A UE may determine whether the slope in which received signal intensity is decreased is greater than the slope value "a" based on how much has intensity of the received signal been reduced by comparing a current L3 value with a previous L3 value.

According to an embodiment of the disclosure, an entering condition in which a UE starts to perform handover may satisfy the following two conditions. If a type 1 handover event (event for network handover or event for UE handover) is triggered and an L3 output value increased or decreased during an L3 output period is greater than a threshold "a" by comparing t0 (L3 output value one step prior to the current step) and t1 (current L3 output value), the UE may perform a type 2 handover event by applying a TTT2. If a type 1 handover event (event for network handover or event for UE handover) is triggered and an L3 output value is smaller than a threshold "a" by comparing t0 (L3 output value one step prior to the current step) and t1 (current L3 output value), a UE may perform the type 1 handover event by applying a TTT1. The L3 output value may be a value converted in a ms unit.

An event used in the LTE system may be applied to the type 1 handover event. In the LTE system, a UE may use a measurement report triggering event in order to a measurement report to an eNB. For example, if an eNB has configured that a UE should a measurement report triggering event as A1, the UE may configure that a difference between the measured signal of a serving eNB and a given offset needs to be greater than a given threshold as an entering condition. Furthermore, the UE may configure that the sum of the measured signal of a serving eNB and a given offset is smaller than a given threshold as a leaving condition. The given offset value may include a hysteresis offset, etc.

In yet another embodiment, if an eNB has configured that a UE should use a measurement report triggering event as A2, the UE may configure that the sum of the measured signal of a serving eNB and a given offset needs to be smaller than a given threshold as an entering condition. Furthermore, the UE may include that a difference between the measured signal of a serving eNB and a given offset is greater than a given threshold as a leaving condition. The given offset value may include a hysteresis offset, etc.

In yet another embodiment, if an eNB has configured that a UE should use a measurement report triggering event as A3, the UE may configure that the sum of the measured signal of a neighboring eNB and a given offset Of_1 needs to be greater than the sum of the measured signal of a serving eNB and a given offset Of_2 as an entering condition. Furthermore, the UE may configure that the sum of the measured signal of a neighboring eNB and a given offset Of_1 needs to be smaller than the sum of the measured signal of a serving eNB and a given offset Of_2 as a leaving condition. The given offset Of_1 and the given offset Of_2 may include a frequency-related offset, a cell-related offset or a hysteresis offset.

In yet another embodiment, if an eNB has configured that a UE uses a measurement report triggering event as A4, the UE may configure that the sum of the measured signal of a neighboring eNB and a given offset Of_1 needs to be greater than a given threshold as an entering condition. Furthermore, the UE may configure that the sum of the measured signal of a neighboring eNB and a given offset Of_2 needs to be smaller than a given threshold as a leaving condition. The given offset Of_1 and the given offset Of_2 may include a frequency-related offset, a cell-related offset or a hysteresis offset.

In yet another embodiment, if an eNB has configured that a UE should use a measurement report triggering event as A5, the UE may configure that the sum of the measured signal of a serving eNB and a given offset Of_1 needs to be smaller than a given threshold Th1 and the sum of the measured signal of a neighboring eNB and a given offset Of_2 needs to be greater than a given threshold Th2 as an entering condition. Furthermore, the UE may configure that a difference between the measured signal of a serving eNB and a given offset Of_1 needs to be greater than a given threshold Th1 and the sum of the measured signal of a neighboring eNB and a given offset Of_3 needs to be smaller than a given threshold Th2 as a leaving condition. The given offset Of_1 may include a hysteresis offset, and the given offset Of_2 and the given offset Of_3 may include a frequency-related offset, a cell-related offset or a hysteresis offset.

Figure 45:
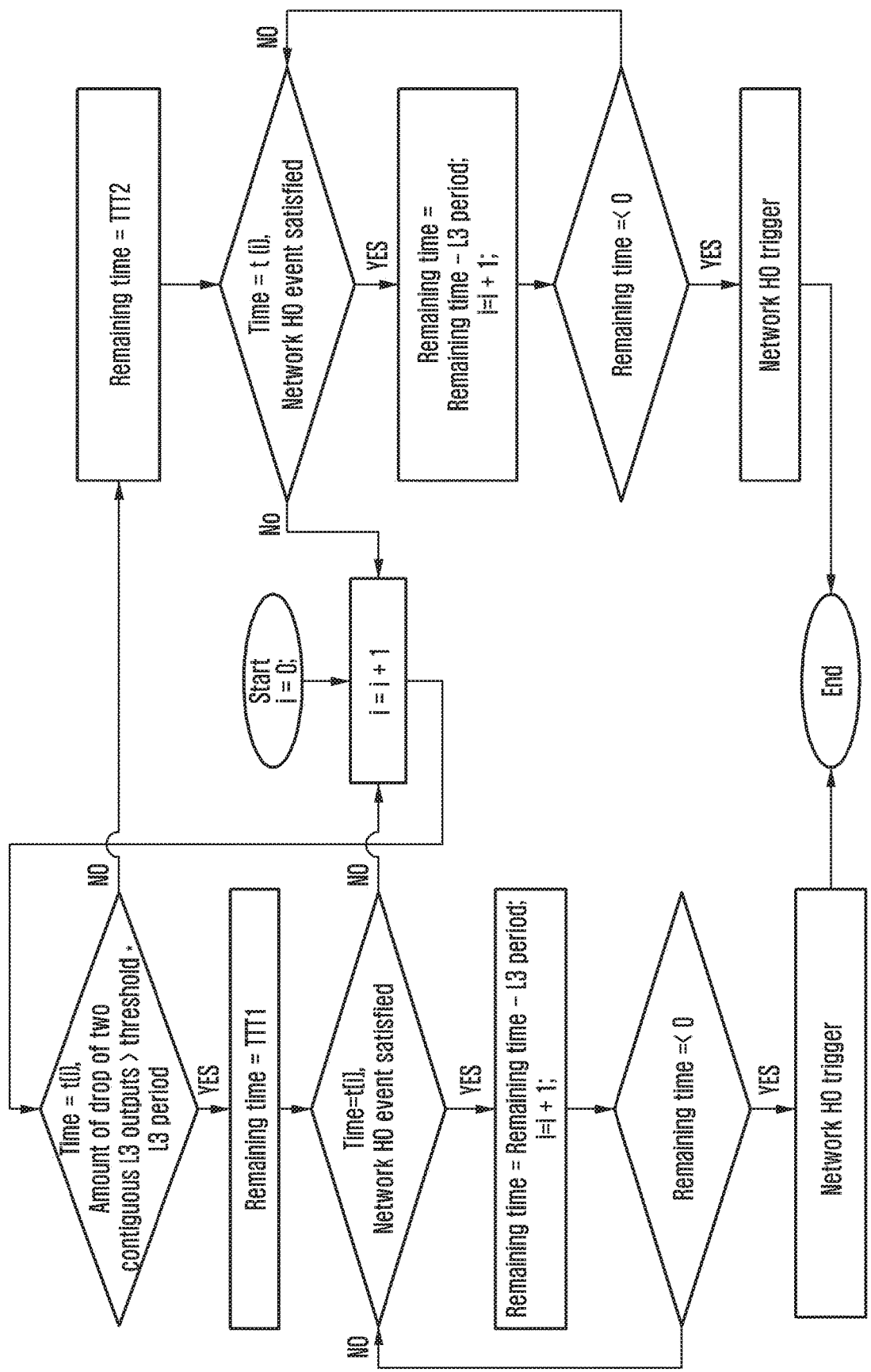
FIG. 45 shows an initial signal drop slope determination method for the network handover trigger of a UE.

FIG. 45 shows an initial signal drop slope determination method for the network handover trigger of a UE.

In the embodiment of FIG. 45, a type 1 handover may mean network handover. A UE identifies an event for the type 1 handover and each L3 output moment slope. That is, the UE identifies whether a decrement of L3 output values contiguous to a type 1 handover event is greater than or smaller than a given threshold. For example, when a type 1 handover event condition satisfies the entering condition, the UE identifies whether a decrement from an L3 output value prior to one step to an L3 output value at corresponding timing is greater than or smaller than the product of the threshold and an L3 output period.

When the decrement of the L3 output values is greater than the product of a given threshold "a" and the L3 output period, the UE sets a TTT as a TTT1. If the type 1 handover event condition satisfies the entering condition and the type 1 handover event condition is maintained during the TTT1, the UE may determine that a type 1 handover event has occurred. If the type 1 handover event condition does not satisfy the entering condition during the TTT1, the UE may continuously perform an operation of comparing a decrement of two contiguous L3 output values with the product of the given threshold "a" and the L3 output period. When the decrement of the L3 output values is smaller than the product of the given threshold "a" and the L3 output period, the UE sets a TTT as a TTT2. The UE identifies whether the type 1 handover event condition continues to satisfy the entering condition during the TTT2. If the type 1 handover event condition continues to satisfy the entering condition, the UE may perform the type 1 handover event after the TTT2 is terminated. According to the embodiment of FIG. 45, a UE may identify a slope of a contiguous signal intensity change at timing in which the type 1 handover condition is satisfied, and may selectively apply a TTI based on the slope. If the type 1 handover condition is not satisfied during the selected TTT, the UE may initialize the TTT and return to the start step.

The TTT1 may be set to have a greater value than the TTT2, and thus there is an effect in that a TTT value at which the type 1 handover event occurs is increased when the degradation of signal intensity is sudden. If the UE identifies that a type 2 handover event has occurred while applying the TTI to the type 1 handover event, the UE does not perform a handover procedure according to the type 1 handover event, and may perform a handover procedure according to the type 2 handover event. In this case, the type 1 handover may mean network handover, and the type 2 handover may mean UE handover. TTT values (TTT1, TTT2) to be applied to the type 1 handover and a slope value "a" may be determined depending on that priority will be given to which type of handover. The TTT values (TTT1, TTT2) and the slope value "a" may be set based on eNB operation values or provider operation values. The set TTT values (TTT 1, TTT2) and the slope value "a" may be transmitted to a UE through a UE-specific message, such as a system information broadcasting message, an RRC configuration message or a measurement configuration message, or using a method previously configured in a UE.

Figure 46:
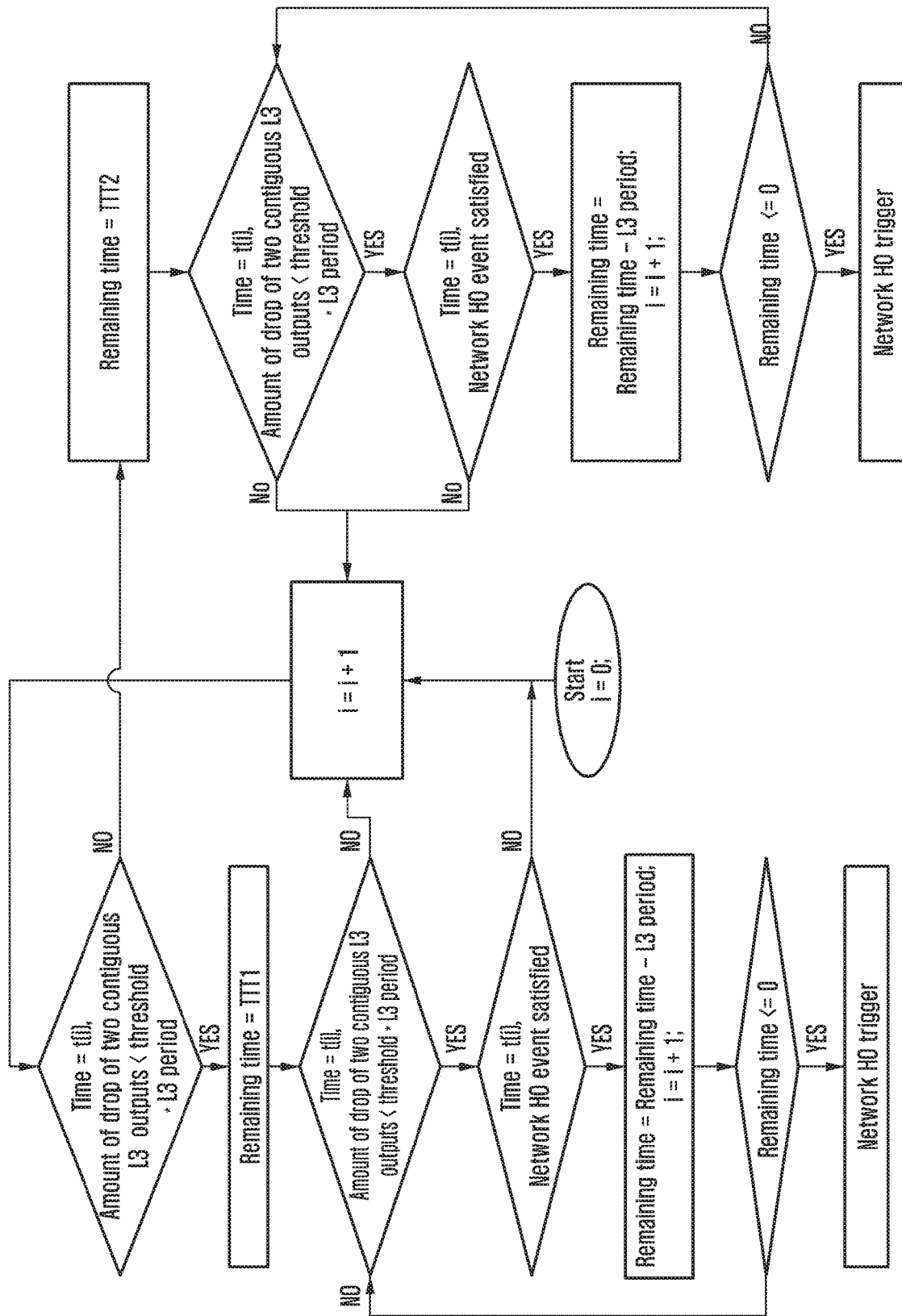
FIG. 46 shows a continuous signal drop slope determination for the network handover trigger of a UE.

FIG. 46 shows a continuous signal drop slope determination for the network handover trigger of a UE.

In the embodiment of FIG. 46, a UE identifies whether a difference between a value prior to each L3 output moment and a current value is greater than or smaller than the product of a given threshold "a" and an L3 output period. When the difference between the previous value and the current value is greater than the product, the UE may set the TTI of type 1 handover as a TTT1. When the difference between the L3-previous value and the L3 current value is smaller than the product of the given threshold "a" and the L3 output period, the UE may set the TTI of the type 1 handover as a TTT2. The UE may measure a slope using contiguous values of each moment L3 output. When the slope is changed, the UE may set the TTI of the type 1 handover as a new value (TTT1 or TTT2) based on the above-described condition from changed timing. By setting a TTT value based on a slope, the execution of a handover procedure according to the type 1 handover and a handover procedure according to type 2 handover may be executed.

In another embodiment, a UE may identify a slope value of the L3 output from the moment when the entering condition of a type 1 handover event condition is satisfied to given timing. When a slope in the change of the L3 output value is greater than a given threshold, the UE may set a TTT as a TTT1. When a slope in the change of the L3 output value is smaller than a given threshold, the UE may set a TTT as a TTT2. That is, if the great or small of a slope value continues for a given time, the UE does not identify the slope value for the remaining TTT duration, and may determine whether a type 1 handover entering condition is satisfied for the remaining duration of the TTT. If it is determined that the type 1 handover entering condition is satisfied for the remaining TTT duration, the UE may perform a type 1 handover procedure after the TTT expires.

In this case, the given time may be set based on a time period or the number of two contiguous L3 output pairs or may be a value received from an eNB. For example, when the two contiguous L3 output pairs are 1, the UE may identify whether a decrement of the L3 output is greater than or smaller than the product of the threshold "a" and the L3 period based on the first one determination, and may determine whether the type 1 handover event condition satisfies the entering condition. The UE may perform the operation of FIG. 45.

If a type 2 handover event condition satisfies the entering condition during the time for which the TTT operates, the UE does not perform the type 1 handover operation, and may perform a type 2 handover operation. The type 1 handover event and the type 2 handover event may use at least one of A1, A2, A3, A4, and A5 of an LTE system. Furthermore, the TT1 and the TTT2 may be set as eNB operation values or provider operation values, and may be transmitted to a UE through a UE-specific message, such as a system information broadcasting message, an RRC configuration message or a measurement configuration message, or using a method previously configured in a UE.

The operations of the embodiments of FIGS. 45 and 46 may be used to perform type 1 handover. An event and parameter that determine the execution of type 2 handover may operate independently. For example, a UE may determine the execution of type 2 handover during an operation of determining the execution of type 1 handover, and may perform a handover procedure along with a serving eNB and a target eNB based on a handover type whose handover execution starts.

According to an embodiment of the disclosure, a UE may apply the type 1 handover event and parameter to network handover, and may apply the type 2 handover event and parameter to UE handover. A UE may apply a UE handover event and parameter while applying a network handover event and parameter. If UE handover is first performed, a UE may perform a procedure of performing access using one of candidate target cells and setting up an RRC connection through the corresponding target cell.

Alternatively, a UE may apply a UE handover event and parameter while applying a network handover event and parameter. If network handover is first performed, a UE may perform a procedure of transmitting a measurement report to a current serving cell, performing access to a target cell after receiving a handover command from a serving cell, and setting up an RRC connection through the corresponding target cell.

Figure 47:
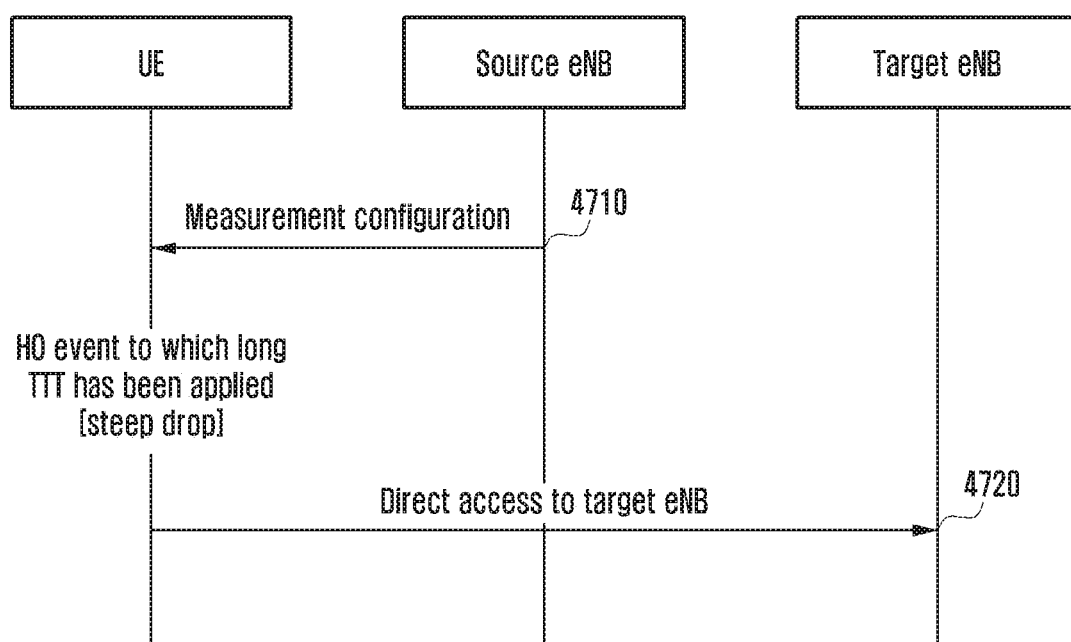
FIG. 47 shows an example in which a serving base station transmits a measurement configuration to a UE and the UE performs UE handover.

FIG. 47 shows an example in which a serving eNB transmits a measurement configuration to a UE and the UE performs UE handover.

Referring to FIG. 47, the serving eNB transmits a measurement configuration (measurement config.) message to the UE (4710). The measurement configuration message provides parameters, including an event associated with type 1 handover (e.g., network handover (NW HO)), a slope value, and TTTs (TTT1, TTT2), and parameters including an event associated with type 2 handover (e.g., UE handover (UE HO)) and a TTT. The TTT1 may be set as a longer TTI value than the TTT2.

The UE that has received the measurement configuration message may identify the generation of a type 1 handover event or the generation of a type 2 handover event by performing the algorithms according to the embodiments of FIGS. 45 and 46. When a decreased size of measured signal intensity is greater than a slope value by comparing the decreased size of the measured signal intensity and the slope value (i.e., in the case of a steep drop), the US may apply a TTT as the TTT1 (long TTT). The UE may monitor whether a type 1 handover event occurs during the TTT1. Furthermore, while the TTT1 operates, the UE may apply the TTI to a type 2 handover event. When a type 2 handover event occurs during the TTT, the UE may perform type 2 handover.

If a UE handover (type 2 handover) event has occurred while the UE monitors a network handover (type 1 handover) event, the UE does not receive a measurement report and handover command with a serving cell, and may directly perform a connection procedure with a target cell (4720).

In the embodiment of FIG. 47, a type 1 handover-related parameter may include an event, a slope value for each event, a TTT1 value for each event, and a TTT2 value for each event. In another embodiment of FIG. 47, the type 1 handover-related parameter may include an event, a slope value for each event, a TTT1 value, and a TTT2 value. In yet another embodiment of FIG. 47, the type 1 handover-related parameter may include an event, a slope value, a TTT1 value and a TTT2 value. In yet another embodiment of FIG. 47, a type 2 handover-related parameter may include an event and a TTT value for each event. In yet another embodiment of FIG. 47, the type 2 handover-related parameter may include an event and TTT value.

Figure 48:
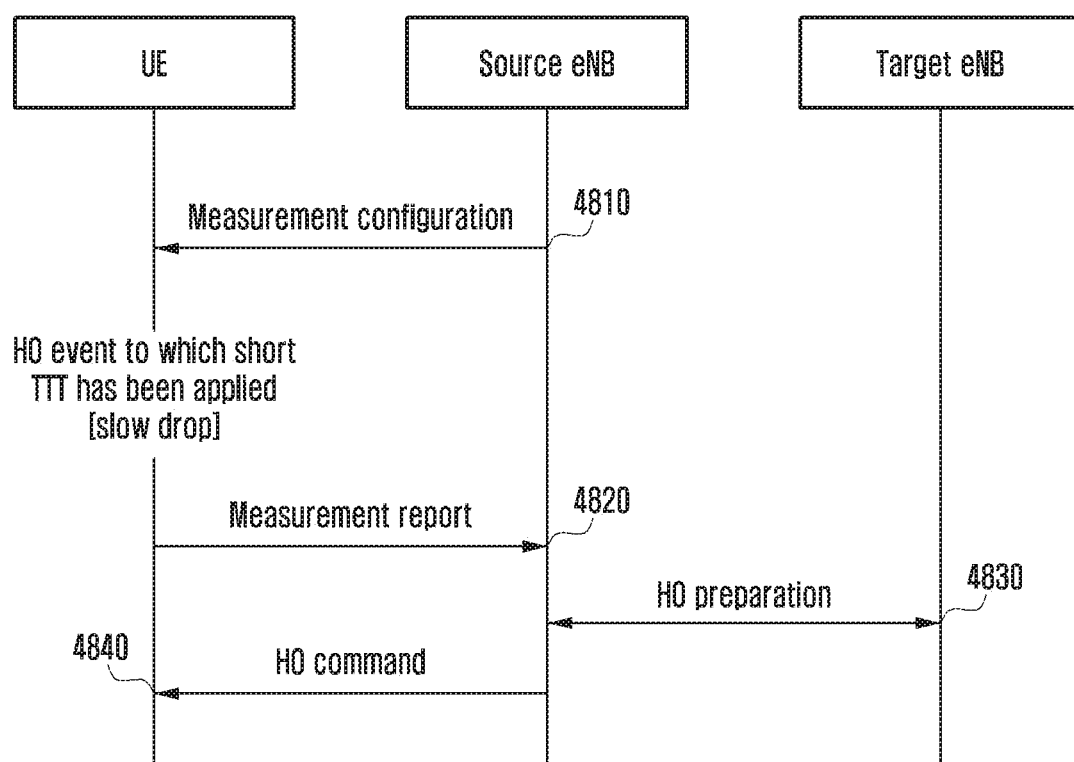
FIG. 48 shows an example in which a serving base station transmits a measurement configuration to a UE and the UE performs network handover.

FIG. 48 shows an example in which a serving eNB transmits a measurement configuration to a UE and the UE performs network handover.

Referring to FIG. 48, the serving eNB transmits a measurement configuration (measurement config.) message to the UE (4810). The measurement configuration message may include the event and parameter of type 1 handover, and the event and parameter of type 2 handover. In one embodiment, the type 1 handover may include network handover, and the type 2 handover may include UE handover. The measurement configuration may include the event of network handover, a slope value, a long TTT (TTT1) and a short TTT (TTT2), and a UE handover event and TTT.

The UE that has received the measurement configuration message may apply the algorithms of FIGS. 45 and 46. If a decreased size of measured signal intensity is smaller than a slope value (i.e., in the case of a slow drop) by comparing the decreased size of the measured signal intensity and the slope value, the UE may apply a TTT2 (short TTT) to a type 1 handover event.

If a type 2 handover event does not occur although the type 1 handover event has occurred until a TTT2 expires, the UE performs type 1 handover. For example, the UE may determine that a network handover event has occurred, and may transmit a measurement report (MR) to the serving eNB (4820). The serving cell performs a handover preparation procedure along with a target cell (4830), and transmits a handover command to the UE (4840). The UE may perform a procedure of setting up a connection to the target cell based on the handover command.

According to another embodiment, when a type 1 handover event occurs and thus a UE transmits a measurement report to a serving eNB, the UE may drive a timer. When the UE receives a handover command from the serving cell while the timer operates, the UE may perform network handover based on configuration information of the handover command. If a handover command is not received from the serving cell until the timer expires, the UE may select one of candidate target cells, identified through measurement, as a target cell, and may perform connection setup with the corresponding cell. The UE may previously obtain radio interface configuration values for attaching to a new target cell through a handover preparation procedure. The UE may access the new target cell based on previously obtained information, and may perform an additional radio resource configuration.

If a cell/eNB has its central unit (CU) function and distributed unit (DU) function separated and installed, the CU may store resource configuration information for a UE. If a UE performs handover between other DUs associated with the same CU, the UE may select a target DU cell if it does not receive a handover command until a timer expires after a measurement report, and may use a resource used in a serving DU cell while performing connection setup with the selected target DU cell.

In the above description, a UE handover event configuration method for a serving eNB to notify a UE of a plurality of TTT values for each slope when a handover operation is performed has been described above. Hereinafter, a method of performing network handover or UE handover, wherein a serving eNB configures a slope value and a network handover event or a serving eNB configures information, such as a slope value, a network handover event and a slope measurement time/the number of samples, is described.

If a serving cell transmits a slope value "a" to be applied to a network handover event through a measurement configuration message and a network handover event satisfies an entering condition during a TTT, the UE compares a slope in which intensity of a signal drops and the value "a." When the slope in which intensity of a signal drops is greater than the value "a", the UE may perform UE handover. When the slope in which intensity of a signal drops is smaller than the value "a", the UE may transmit a measurement report to an eNB and driver a timer. When the UE receives a handover command from the serving cell before the timer expires, the UE may perform network handover. If a handover command is not received from the serving cell before the timer expires, the UE may perform UE handover. If the UE handover is performed, the UE may select one of candidate target cells, determined based on a previous measurement report, as a target cell. A UE handover event may not be configured by the serving eNB. The serving eNB and the UE may previously determine candidate target cells in preparation for a case where UE handover is performed, and may previously perform a measurement configuration for performing handover and a corresponding measurement report. A random access channel (RACH) configuration, information on a beam used upon access, information on an RLC or PDCP configuration, access information on a candidate target cell, such as security key information in a target cell, etc. may be previously configured for a UE.

When a network handover event is triggered, a UE may perform network handover or UE handover based on a slope. A comparison between the slope and the threshold "a" may be performed in a period unit of L3 output.

In the embodiment of FIGS. 49 to 52, the type 1 handover is assumed to be network handover, and the type 2 handover is assumed to be UE handover. However, a different handover algorithm may be applied to the type 1 handover or the type 2 handover.

Figure 49:
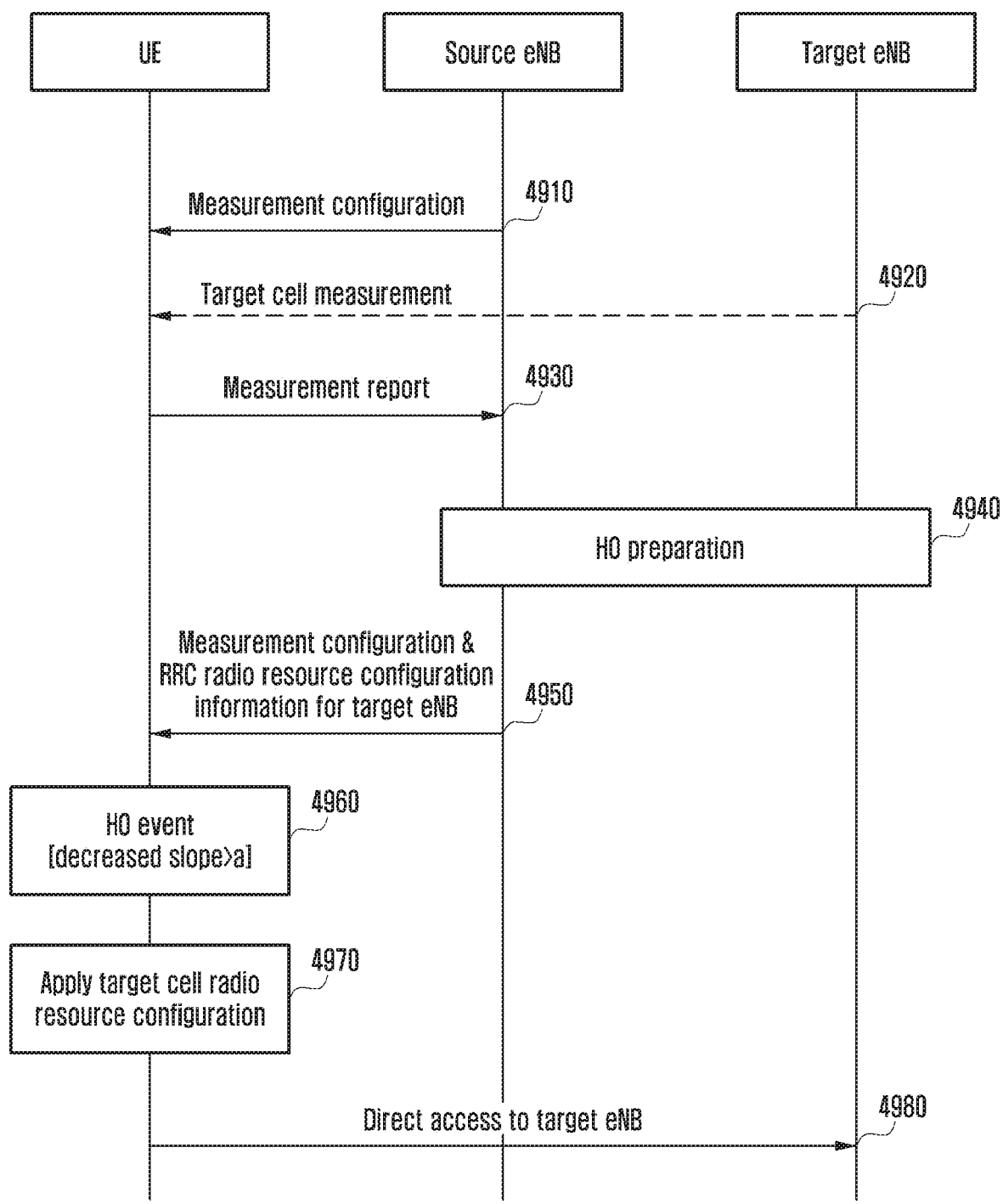
FIG. 49 shows an example in which a UE detects an event for handover and performs handover when the drop of a signal is identified.

FIG. 49 shows an example in which a UE detects an event for handover and performs handover when the drop of a signal is identified.

Referring to FIG. 49, a serving eNB may transmit measurement configuration information for discovering a candidate target cell to a UE (4910). The measurement configuration information may include an event for each handover type and parameters necessary for handover. For example, the serving eNB may transmit configuration information so that the UE can use a signal intensity-based A1, A3 or A5 event for type 1 handover. After the UE measures signal intensity of a surrounding eNB, the UE may discover an eNB/cell that satisfies a configured event (4920). The UE may report the measurement result of the signal intensity to the serving eNB (4930). The serving eNB may select a candidate target eNB based on the measurement result. The serving eNB may obtain resource and configuration information necessary for the UE to perform handover and re-connection for the selected candidate target eNB (4940). The serving eNB may transmit the information necessary for handover and re-connection to the candidate target eNB (4950). Furthermore, the serving eNB may transmit event configuration information for performing type 1 handover to the candidate target eNB. The event configuration information includes at least one of an event, a slope value "a" or an evaluation time T for a slope comparison. Furthermore, the event configuration information may include parameters necessary for respective events, regarding whether a report will be made periodically or for each event, which value for a TTT will be used, and what kind of event will be used. The UE may perform type 1 handover based on the event configuration information. When an event for type 1 handover occurs during a TTT and the slope in which signal intensity is decreased, measured for a given T interval or for a given sample number, is greater than the value "a" (4960), the UE may select one of the candidate target cells received in step 4950. Metric for selecting one target cell may be previously configured in the UE. For example, the UE may select a cell that belongs to the candidate target cells and that has the best signal intensity. The UE may perform a connection setup procedure with the target cell (4980) using radio resource configuration information of the selected target cell (4970). For example, the UE may perform an RRC connection reconfiguration or RRC connection reestablishment procedure along with the target cell.

Meanwhile, in the embodiment of FIG. 49, the event configuration information necessary for measurement and execution for type 1 handover has been illustrated as being transmitted in each of step 4910 and step 4950, but the event configuration information necessary for measurement and execution for type 1 handover may be together transmitted in step 4910 or step 4950. Furthermore, the configuration information may include a candidate target cell list configured by a serving eNB.

Figure 50:
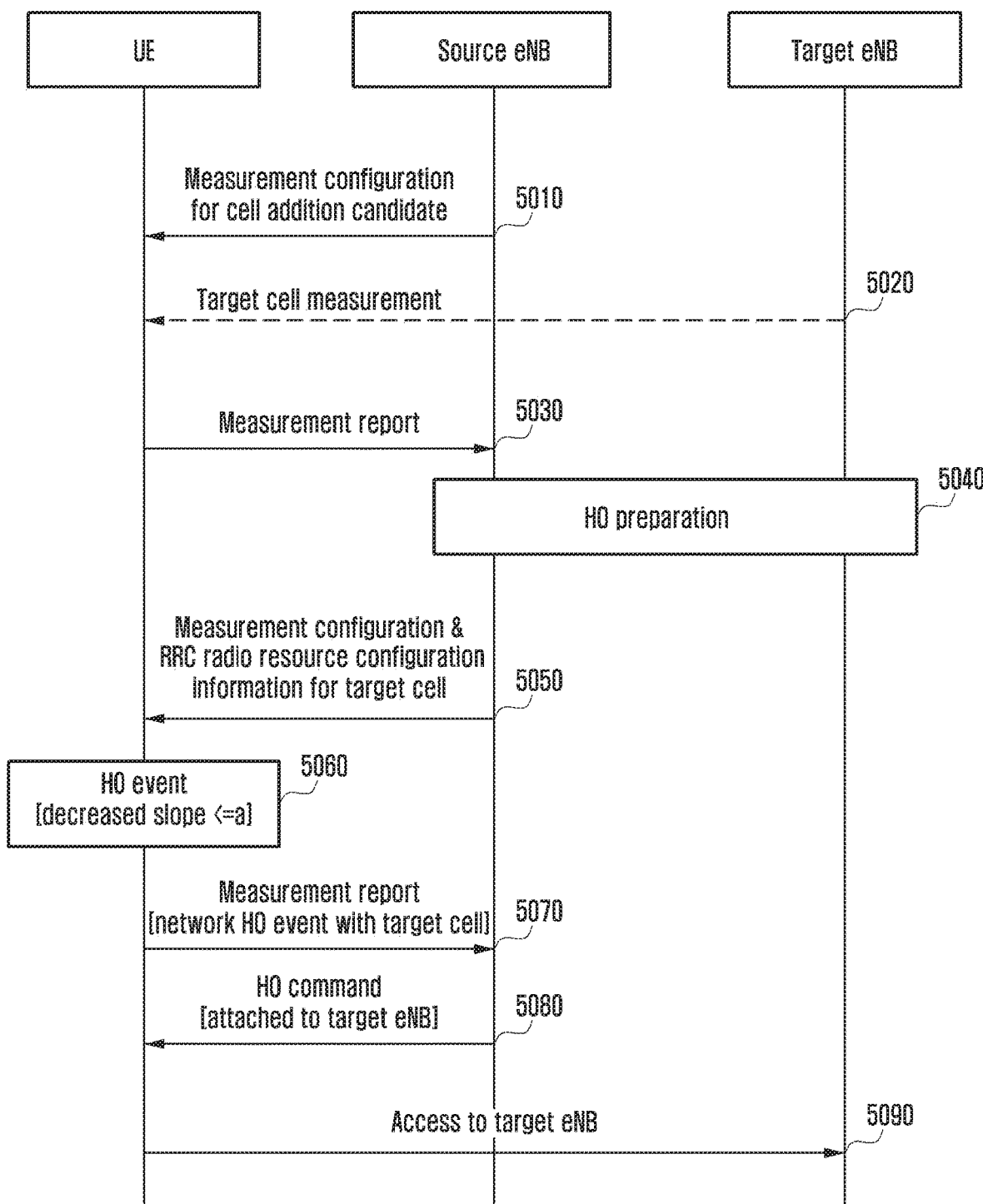
FIG. 50 shows an example in which a UE detects an event for handover and performs handover when there is no drop of a signal.

FIG. 50 shows an example in which a UE detects an event for handover and performs handover when there is no drop of a signal.

In the embodiment of FIG. 50, an eNB and a UE may identically perform the operations of step 4910 to step 4950 of FIG. 49. That is, step 5010 to step 5050 of FIG. 50 correspond to step 4910 to step 4950 of FIG. 49. If a type 1 handover event is triggered, an entering condition is satisfied during a TTT, and a drop slope of a received signal during a given evaluation time T is smaller than a given threshold "a" (5060), the UE may transmit a measurement report for the triggered event to the serving eNB (5070). The serving eNB may perform a handover preparation procedure along with the target eNB based on the measurement report of the UE. The serving eNB may determine a target eNB based on the handover preparation procedure, and may transmit a handover command including information on the target eNB, to the UE (5080). The UE may perform connection setup with the target eNB based on the information included in the handover command (5090). The UE may use radio resource configuration information included in the handover command.

Meanwhile, in the embodiment of FIG. 50, the event configuration information necessary for measurement and execution for type 1 handover has been illustrated as being transmitted in each of step 5010 and step 5050, but the event configuration information necessary for measurement and execution for type 1 handover may be together transmitted in step 5010 or step 5050. Furthermore, the configuration information may include a candidate target cell list configured by the serving eNB.

Figure 51:
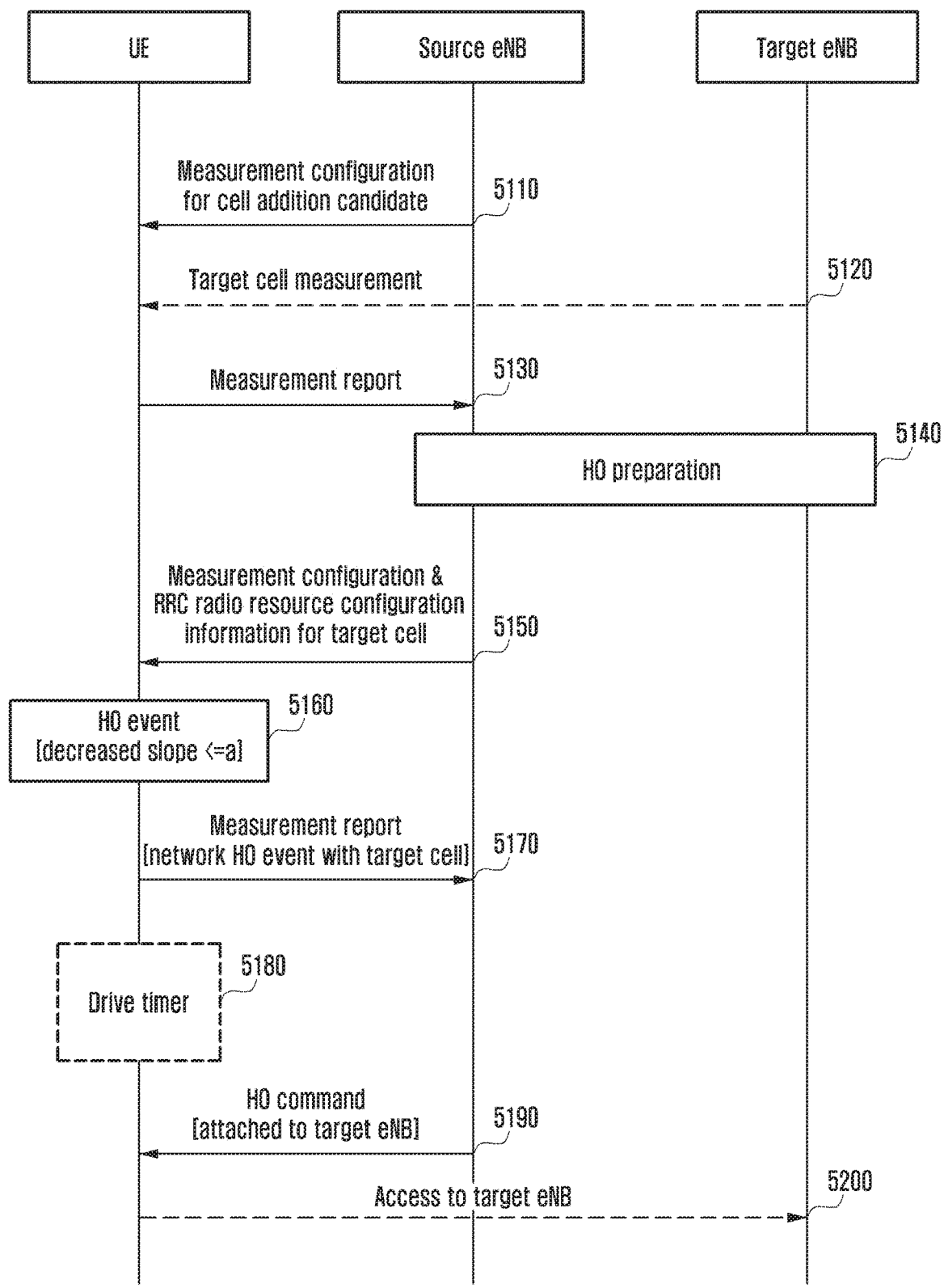
FIG. 51 shows an example of an operation of a UE when the UE receives a handover command in a method for the UE to detect an event for handover and to perform handover using a timer.

FIG. 51 shows an example of an operation of a UE when the UE receives a handover command in a method for the UE to detect an event for handover and to perform handover using a timer.

In the embodiment of FIG. 51, an eNB and a UE may identically perform the operations of step 4910 to step 4950 of FIG. 49. That is, step 5110 to step 5150 of FIG. 51 correspond to step 4910 to step 4950 of FIG. 49. If a network handover event is triggered, an entering condition is satisfied during a TTT, and a drop slope of a received signal during a given evaluation time T is smaller than a given threshold "a" (5160), the UE may transmit a measurement report for the triggered event to the serving eNB (5170). The UE may drive a timer for the measurement report from timing in which the measurement report is transmitted (5180). The serving eNB may perform a handover preparation procedure along with a target eNB based on the measurement report of the UE. The serving eNB may determine the target eNB based on the handover preparation procedure, and may transmit a handover command, including information on the target eNB, to the UE (5190). When the handover command is received from the serving eNB before the timer for the measurement report expires, the UE may perform connection setup with the target eNB based on information included in the handover command (5200). The UE may use radio resource configuration information included in the handover command.

Meanwhile, in the embodiment of FIG. 51, the event configuration information necessary for measurement and execution for type 1 handover has been illustrated as being transmitted in each of step 5110 and step 5150, but the event configuration information necessary for measurement and execution for type 1 handover may be together transmitted in step 5110 or step 5150. Furthermore, the configuration information may include a candidate target cell list configured by the serving eNB.

Figure 52:
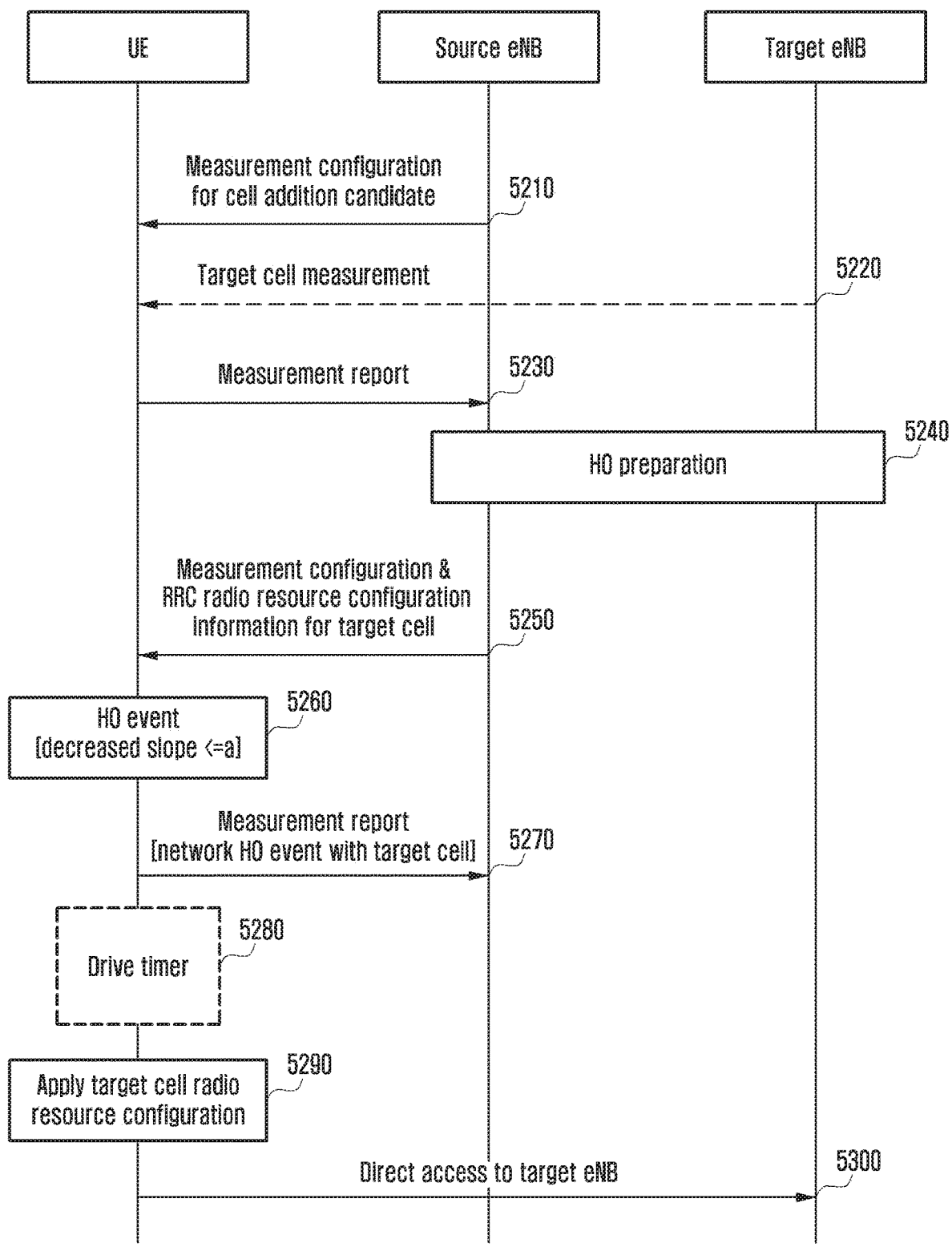
FIG. 52 shows an example of an operation of a UE when the UE does not receive a handover command in a method for the UE to detect an event for handover and to perform handover using a timer.

FIG. 52 shows an example of an operation of a UE when the UE does not receive a handover command in a method for the UE to detect an event for handover and to perform handover using a timer.

In the embodiment of FIG. 52, an eNB and a UE may identically perform the operations of step 5110 to step 5180 of FIG. 51. That is, step 5210 to step 5280 of FIG. 52 are the same as step 5110 to step 5180 of FIG. 51. If a handover command is not received from the serving eNB until the timer for the measurement report driven in step 5280 expires, the UE may select one of candidate target eNBs (5290). As an example of metric for selecting one of the candidate target eNBs, the UE may select a cell that belongs to the candidate target cells and that has the best signal intensity. The UE may perform connection setup with the selected target eNB using radio resource configuration information previously obtained with respect to the target eNB (5300).

Meanwhile, in the embodiment of FIG. 52, the event configuration information necessary for measurement and execution for type 1 handover has been illustrated as being transmitted in each of step 5210 and step 5250, but the event configuration information necessary for measurement and execution for type 1 handover may be together transmitted in step 5210 or step 5250. Furthermore, the configuration information may include a candidate target cell list configured by the serving eNB.

Meanwhile, a separate event may be defined for UE handover. For example, an eNB may configure the following UE handover event configuration factors.

S1: when a drop ratio of a serving cell (beam) is "a" or more during a TTT (parameter: a, TTT)

S2: when a drop ratio of a neighbor cell (beam) is "a" or more during a TTT (parameter: a, TTT)

S3: when a drop ratio of a serving cell (beam) is "a" or more during a TTT and a drop ratio of a neighbor cell (beam) is "b" or more during a TTT (parameter: a, b, TTT)

A serving eNB may configure the event as UE handover use. For example, an entering condition may be a signal value (L3 output) in a serving cell t0–a signal value (L3 output) in a serving cell t1>a threshold "a"×L3 output period. If the entering condition is satisfied during a TTT, a UE may perform UE handover. If the entering condition for a UE handover event is satisfied, a UE may postpone the application of a network handover event until for a TTI for the UE handover event expires.

Figure 53:
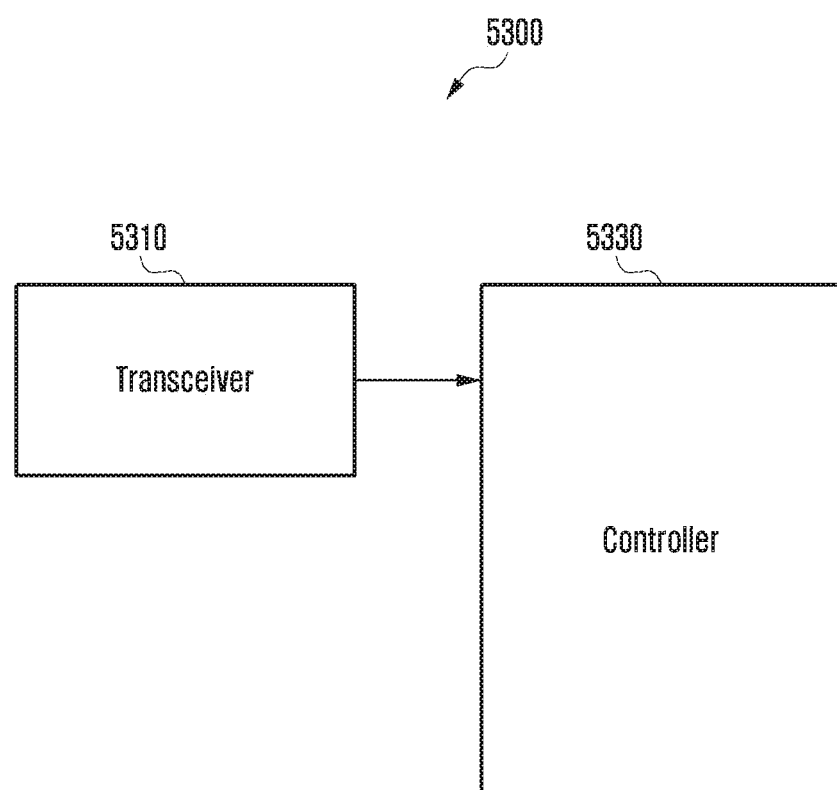
FIG. 53 is a diagram showing a UE according to an embodiment of the disclosure.

FIG. 53 is a diagram showing a UE according to an embodiment of the disclosure.

Referring to FIG. 53, the UE 5300 may include a transceiver 5310 and a controller 5330. The controller 5330 may include at least one processor. The transceiver 5310 and the controller 5330 may be electrically connected. The controller 5330 may control the transceiver 5310 to transmit and receive signals. What the controller 5330 transmits and/or receives a signal, information, a message, etc. may be interpreted to mean that the controller 5330 controls the transceiver 5310 to transmit and/or receive a signal, information, a message, etc.

The UE 5300 may transmit and/or receive a signal through the transceiver 5310. The controller 5330 may control an overall operation of the UE 5300. Furthermore, the controller 5330 may control the operations of the UE described through FIGS. 1 to 52.

Figure 54:
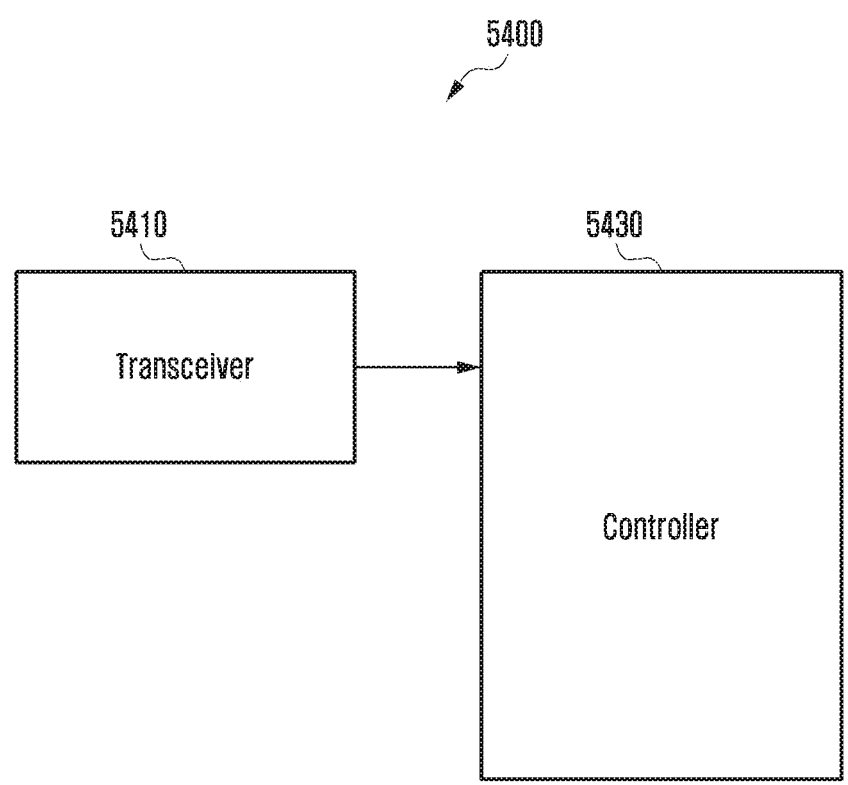
FIG. 54 is a diagram showing a base station according to an embodiment of the disclosure.

FIG. 54 is a diagram showing an eNB according to an embodiment of the disclosure.

Referring to FIG. 54, the eNB 5400 may include a transceiver 5410 and a controller 5430. The controller 5430 may include at least one processor. The transceiver 5410 and the controller 5430 may be electrically connected. The controller 5430 may control the transceiver 5410 to transmit and receive signals. What the controller 5430 transmits and/or receives a signal, information, a message, etc. may be interpreted to mean that the controller 5430 controls the transceiver 5410 to transmit and/or receive a signal, information, a message, etc.

The base station 5400 may transmit and/or receive a signal through the transceiver 5410. The controller 5430 may control an overall operation of the base station 5400. Furthermore, the controller 5430 may control the operations of the eNB described through FIGS. 1 to 52.

Furthermore, the embodiments disclosed in the specification and drawings have proposed only specific examples in order to easily describe the contents of the disclosure and help understanding of the disclosure, and are not intended to restrict the scope of the disclosure. Accordingly, the scope of the disclosure should be construed as including all changes or modified forms derived based on the technical spirit of the disclosure in addition to the disclosed embodiments.

The invention claimed is:

1. A method performed by a terminal in a wireless communication system, the method comprising:
receiving, from a first base station, a radio resource control (RRC) message including at least one packet data convergence protocol (PDCP) configuration information each of which corresponds to each data radio bearer (DRB), wherein the PDCP configuration information includes PDCP duplication information indicating whether a corresponding DRB is configured with PDCP duplication;
receiving, from the first base station, a medium access control (MAC) control element (CE) activating the PDCP duplication for a DRB configured with the PDCP duplication; generating, at a PDCP entity, a first PDCP protocol data unit (PDU) for the DRB and a second PDCP PDU which is a duplicate of the first PDCP PDU;
submitting the first PDCP PDU to a primary radio link control (RLC) entity and the second PDCP PDU to a secondary RLC entity; and
transmitting the first PDCP PDU to the first base station and the second PDCP PDU to a second base station.

2. The method of claim 1, further comprising:
receiving, from the first base station, a MAC CE indicating a deactivation of the PDCP duplication configured for the DRB,
wherein a PDCP PDU for the DRB is submitted to one RLC entity which is the primary RLC entity.

3. The method of claim 2, further comprising:
indicating to the secondary RLC entity to discard a PDCP PDU for the DRB.

4. A terminal in a wireless communication system, the terminal comprising:
a transceiver transmitting and receiving signals; and
a controller coupled with the transceiver and configured to:
receive, from a first base station, a radio resource control (RRC) message including at least one packet data convergence protocol (PDCP) configuration information each of which corresponds to each data radio bearer (DRB), wherein the PDCP configuration information includes PDCP duplication information indicating whether a corresponding DRB is configured with PDCP duplication,
receive, from the first base station, a medium access control (MAC) control element (CE) activating the PDCP duplication for a DRB configured with the PDCP duplication,
generate, at a PDCP entity, a first PDCP protocol data unit (PDU) for the DRB and a second PDCP PDU which is a duplicate of the first PDCP PDU,
submit the first PDCP PDU to a primary radio link control (RLC) entity and the second PDCP PDU to a secondary RLC entity, and
transmit the first PDCP PDU to the first base station and the second PDCP PDU to a second base station.

5. The terminal of claim 4,
wherein the controller is further configured to receive, from the first base station, a MAC CE indicating a deactivation of the PDCP duplication configured for the DRB, and
wherein a PDCP PDU for the DRB is submitted to one RLC entity which is the primary RLC entity.

6. The terminal of claim 5, wherein the controller is further configured to indicate to the secondary RLC entity to discard a PDCP PDU for the DRB.

7. A method performed by a first base station in a wireless communication system, the method comprising:
transmitting, to a terminal, a radio resource control (RRC) message including at least one packet data convergence protocol (PDCP) configuration information each of which corresponds to each data radio bearer (DRB), wherein the PDCP configuration information includes PDCP duplication information indicating whether a corresponding DRB is configured with PDCP duplication;
transmitting, to the terminal, a medium access control (MAC) control element (CE) activating the PDCP duplication for a DRB configured with the PDCP duplication; and
receiving, from the terminal, a first PDCP protocol data unit (PDU) via a primary radio link control (RLC) entity of the terminal,
wherein a second PDCP PDU is duplicated from the first PDCP PDU by the terminal, and
wherein the second PDCP PDU is transmitted via a secondary RLC entity of the terminal to a second base station.

8. The method of claim 7, further comprising:
transmitting, to the terminal, a MAC CE indicating a deactivation of the PDCP duplication configured for the DRB,
wherein a PDCP PDU for the DRB is submitted to one RLC entity of the terminal, which is the primary RLC entity.

9. The method of claim 8, wherein the terminal indicates to the secondary RLC entity to discard a PDCP PDU for the DRB.

10. A first base station in a wireless communication system, the first base station comprising:
a transceiver transmitting and receiving signals; and
a controller coupled with the transceiver and configured to:
transmit, to a terminal, a radio resource control (RRC) message including at least one packet data convergence protocol (PDCP) configuration information each of which corresponds to each data radio bearer (DRB), wherein the PDCP configuration information includes PDCP duplication information indicating whether a corresponding DRB is configured with PDCP duplication,
transmit, to the terminal, a medium access control (MAC) control element (CE) activating the PDCP duplication for a DRB configured with the PDCP duplication, and
receive, from the terminal, a first PDCP protocol data unit (PDU) via a primary radio link control (RLC) entity of the terminal,
wherein a second PDCP PDU is duplicated from the first PDCP PDU by the terminal, and
wherein the second PDCP PDU is transmitted via a secondary RLC entity of the terminal to a second base station.

11. The first base station of claim 10,
wherein the controller is further configured to transmit, to the terminal, a MAC CE indicating a deactivation of the PDCP duplication configured for the DRB,
wherein a PDCP PDU for the DRB is submitted to one RLC entity of the terminal, which is the primary RLC entity.

12. The first base station of claim 11, wherein the terminal indicates to the secondary RLC entity to discard a PDCP PDU for the DRB.

* * * * *